US008416186B2

(12) United States Patent
Yamamoto et al.

(10) Patent No.: US 8,416,186 B2
(45) Date of Patent: Apr. 9, 2013

(54) INPUT APPARATUS, CONTROL APPARATUS, CONTROL SYSTEM, CONTROL METHOD, AND HANDHELD APPARATUS

(76) Inventors: Kazuyuki Yamamoto, Tokyo (JP); Toshio Mamiya, Tokyo (JP); Hidetoshi Kabasawa, Tokyo (JP); Katsuhiko Yamada, Tokyo (JP); Takashi Yamada, Tokyo (JP); Hideaki Kumagai, Tokyo (JP)

( * ) Notice: Subject to any disclaimer, the term of this patent is extended or adjusted under 35 U.S.C. 154(b) by 0 days.

(21) Appl. No.: 12/522,137

(22) PCT Filed: Jul. 4, 2008

(86) PCT No.: PCT/JP2008/062190
§ 371 (c)(1),
(2), (4) Date: Jul. 2, 2009

(87) PCT Pub. No.: WO2009/008372
PCT Pub. Date: Jan. 15, 2009

(65) Prior Publication Data
US 2010/0103096 A1    Apr. 29, 2010

(30) Foreign Application Priority Data

Jul. 6, 2007  (JP) .................................. 2007-178731
Oct. 12, 2007  (JP) .................................. 2007-267045

(51) Int. Cl.
*G06F 3/033*  (2006.01)
(52) U.S. Cl. ........ 345/157; 345/156; 345/158; 345/169; 348/734; 463/37; 463/38; 273/148 B
(58) Field of Classification Search .......... 345/156–158, 345/169; 348/734; 463/37–38; 273/148 B
See application file for complete search history.

(56) References Cited

U.S. PATENT DOCUMENTS 4,839,838 A * 6/1989 LaBiche et al. ............... 708/141
5,453,758 A * 9/1995 Sato ............................. 345/158
(Continued)

FOREIGN PATENT DOCUMENTS

JP  09-319510  12/1997
JP  11-045150  2/1999
(Continued)

OTHER PUBLICATIONS

International Search Report dated Oct. 7, 2008, for corresponding Patent Application PCT/JP2008/062190.
(Continued)

*Primary Examiner* — Lun-Yi Lao
*Assistant Examiner* — Sosina Abebe
(74) *Attorney, Agent, or Firm* — K&L Gates LLP

(57) ABSTRACT

An input apparatus, a control apparatus, a control system, and a control method therefor, that are capable of solving a problem on gravity that affects an acceleration sensor of an input apparatus when tilted from its original position, and reducing a calculation amount are provided. An MPU of an input apparatus corrects angular velocity values by rotational coordinate conversion corresponding to a calculated roll angle to obtain correction angular velocity values (second and first correction angular velocity values) as correction values. Accordingly, even when a user moves the input apparatus in a state where the input apparatus is tilted with respect to an axis in a gravity direction (vertical axis) about a Z axis, effects of gravity acceleration components in X'- and Y'-axis directions that are generated by the tilt can be removed.

20 Claims, 49 Drawing Sheets

U.S. PATENT DOCUMENTS

| | | | | |
|---|---|---|---|---|
| 5,587,558 | A * | 12/1996 | Matsushima | 178/18.01 |
| 6,047,132 | A * | 4/2000 | Maeda | 396/53 |
| 8,199,031 | B2 * | 6/2012 | Yamamoto | 341/20 |
| 8,259,072 | B2 * | 9/2012 | Hsieh et al. | 345/169 |
| 8,300,012 | B2 * | 10/2012 | Yamamoto | 345/158 |
| 2002/0148655 | A1 * | 10/2002 | Cho et al. | 178/18.09 |
| 2005/0065728 | A1 * | 3/2005 | Yang et al. | 701/220 |
| 2005/0243062 | A1 * | 11/2005 | Liberty | 345/158 |
| 2007/0072674 | A1 * | 3/2007 | Ohta et al. | 463/37 |
| 2007/0273645 | A1 * | 11/2007 | Bang et al. | 345/157 |
| 2009/0058829 | A1 * | 3/2009 | Kim et al. | 345/173 |

FOREIGN PATENT DOCUMENTS

| | | |
|---|---|---|
| JP | 2001-056743 | 2/2001 |
| JP | 2003-170806 | 6/2003 |
| JP | 3748483 | 12/2005 |
| JP | 2006-072516 | 3/2006 |
| JP | 2007-509448 | 4/2007 |

OTHER PUBLICATIONS

European Search Report issued Feb. 1, 2012, for corresponding European Appln. No. 08777905.4.

* cited by examiner

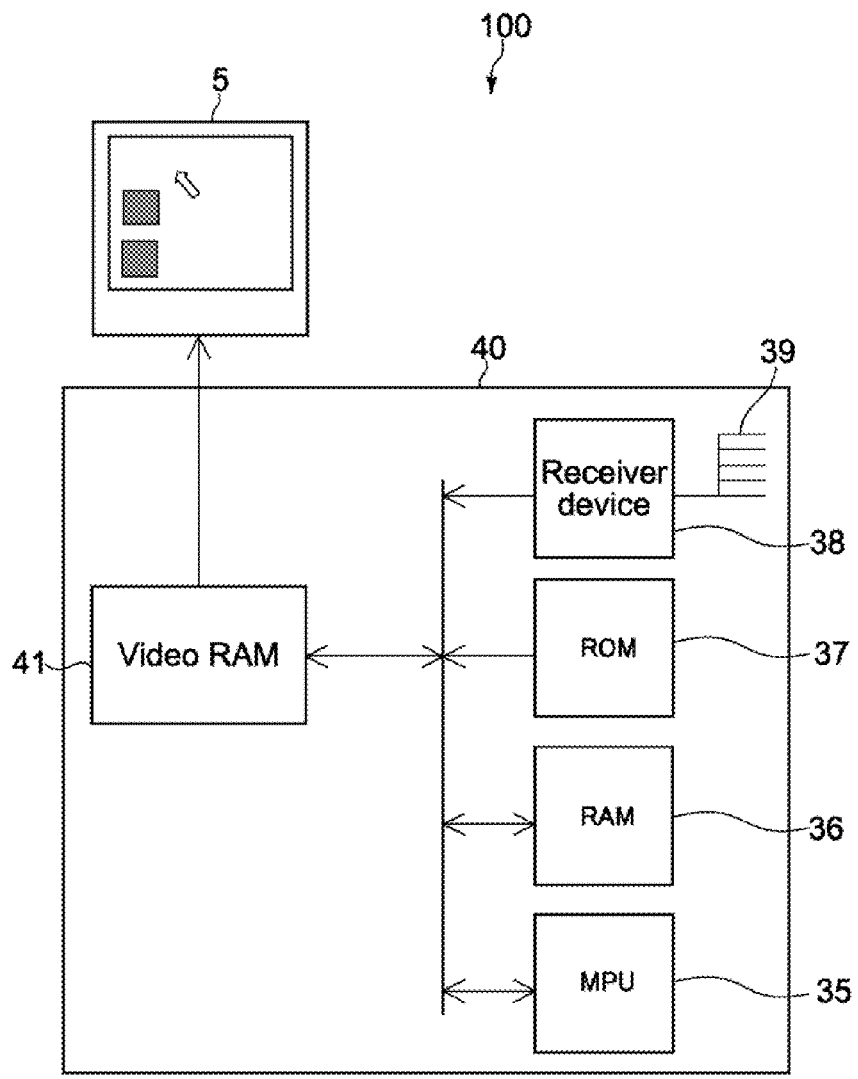
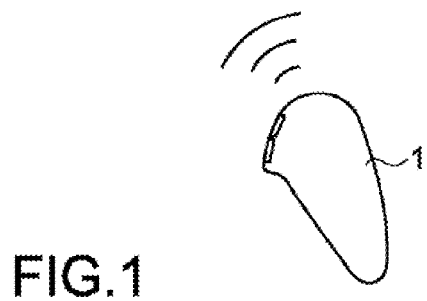
FIG.1

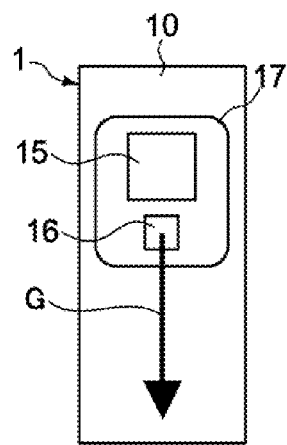
FIG.9A
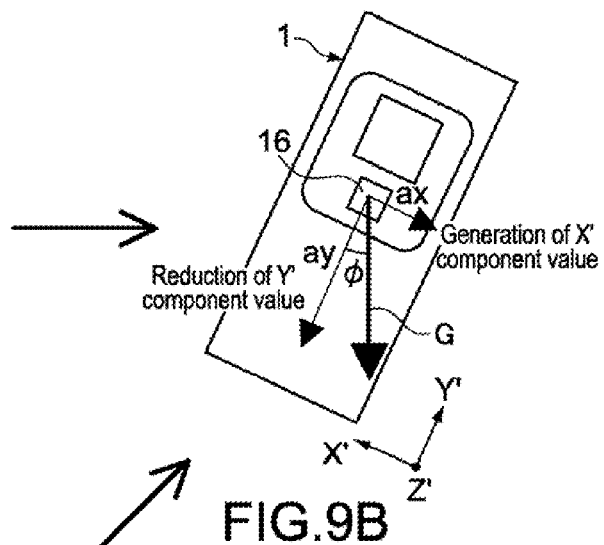
FIG.9B
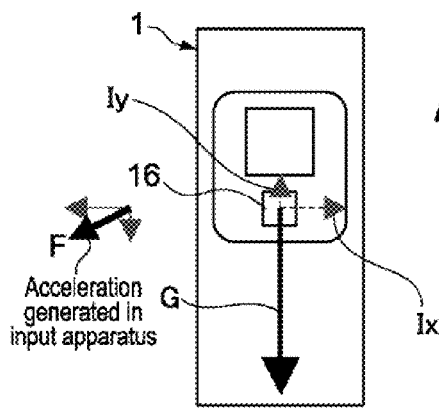
FIG.9C
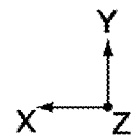

$$\begin{pmatrix} \omega_{\psi'} \\ \omega_{\theta'} \end{pmatrix} = \begin{pmatrix} \cos\phi & -\sin\phi \\ \sin\phi & \cos\phi \end{pmatrix} \begin{pmatrix} \omega_{\psi} \\ \omega_{\theta} \end{pmatrix} \quad \cdots (3)$$

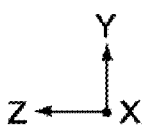
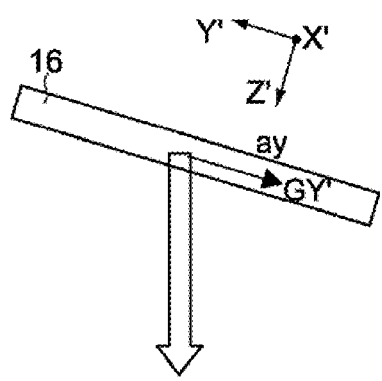
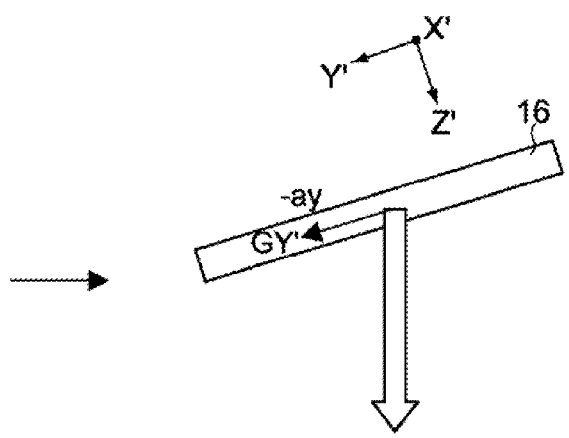
FIG.15A    FIG.15B $$\begin{pmatrix} V_x' \\ V_y' \end{pmatrix} = \begin{pmatrix} \cos\phi & -\sin\phi \\ \sin\phi & \cos\phi \end{pmatrix} \begin{pmatrix} V_x \\ V_y \end{pmatrix} \quad \cdots (5)$$

INPUT APPARATUS, CONTROL APPARATUS, CONTROL SYSTEM, CONTROL METHOD, AND HANDHELD APPARATUS

CROSS REFERENCE TO RELATED APPLICATIONS

The present application is a National Stage of International Application No. PCT/JP2008/062190 filed on Jul. 4, 2008 and which claims priority to Japanese Patent Application No. 2007-178731 filed on Jul. 6, 2007, and to Japanese Patent Application No. 2007-267045 filed on Oct. 12, 2007, the entire contents of which are being incorporated herein by reference.

BACKGROUND

The present disclosure relates to a 3-dimensional operation input apparatus for operating a pointer on a screen, a control apparatus for controlling the pointer in accordance with operational information, a control system including those apparatuses, a control method, and a handheld apparatus.

Pointing devices, particularly a mouse and a touchpad, are used as controllers for GUIs (Graphical User Interfaces) widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Patent Documents 1 and 2).

Patent Document 1 discloses an input apparatus including angular velocity gyroscopes of two axes, that is, two angular velocity sensors. Each angular velocity sensor is a vibration-type angular velocity sensor. For example, upon application of an angular velocity with respect to a vibrating body piezo-electrically vibrating at a resonance frequency, Coriolis force is generated in a direction orthogonal to a vibration direction of the vibrating body. The Coriolis force is in proportion to the angular velocity, so detection of the Coriolis force leads to detection of the angular velocity. The input apparatus of Patent Document 1 detects angular velocities about two orthogonal axes by the angular velocity sensors, generates, in accordance with the angular velocities, a command signal as positional information of a cursor or the like displayed by a display means, and transmits it to the control apparatus.

Patent Document 2 discloses a pen-type input apparatus including three acceleration sensors (of three axes) and three angular velocity sensors (of three axes) (gyro). The pen-type input apparatus executes various operations based on signals obtained by the three acceleration sensors and the three angular velocity sensors, to thus calculate a positional angle of the pen-type input apparatus.

Generally, each of the acceleration sensors detects not only an acceleration at a time the input apparatus is operated by the user, but also a gravity acceleration. Because gravity that acts on the input apparatus and an inertial force of the input apparatus generated when the input apparatus is moved are of the same physical amount, it is impossible for the input apparatus to make a distinction therebetween. When the user holds the input apparatus while tilting it from its original position, for example, a component force of the gravity acceleration corresponding to the tilt acts on the acceleration sensors corresponding to respective axes, and the acceleration sensors inadvertently detect the force.

However, the pen-type input apparatus of Patent Document 2 above detects triaxial angular velocities and accelerations in triaxial directions, that is, detects amounts in all 6 degrees of freedom, thus solving the problems on the inertial force and the gravity.

Patent Document 1: Japanese Patent Application Laid-open No. 2001-56743 (paragraphs [0030] and [0031], FIG. 3)

Patent Document 2: Japanese Patent No. 3,748,483 (paragraphs [0033] and [0041], FIG. 1)

Patent Document 3: Japanese Patent Translation Publication No. 2007-509448 (paragraphs [0019], [0021], [0029], and [0034], FIG. 5)

Because three acceleration sensors and three angular velocity sensors are used in the pen-type input apparatus of Patent Document 2, a structure thereof is complex and a calculation amount becomes large, thus resulting in a fear that a delay time may occur. As a result, a temporal deviation occurs between an operation timing of the user and an operation timing of the GUI, thus making the user feel awkward. Moreover, an increase in the calculation amount leads to an increase in power consumption. For a built-in-battery-type input apparatus, for example, the problem on power consumption is important.

When a high-speed CPU or MPU is used for eliminating the delay time above, there is a problem that power consumption and costs additionally increase.

Further, since the pen-type input apparatus of Patent Document 2 includes six sensors, a CPU or an A/D converter that includes six A/D (Analog/Digital) ports becomes necessary, thus resulting in a problem that a circuit structure becomes complex and costs are further increased.

Furthermore, because the pen-type input apparatus of Patent Document 2 requires integration terms of accelerations in operations, there is also a problem that integration errors are accumulated. For solving this problem, resetting integration values under a specific condition has been proposed, but there is also a problem that there is no guarantee that a reset condition can be obtained at time intervals necessary for suppressing integration errors within a level non-influential for practical use.

SUMMARY

In view of the circumstances as described above, an object of the present embodiments is to provide an input apparatus, a control apparatus, a control system, a control method therefor, and a handheld apparatus that are capable of solving the problem on gravity that acts on the acceleration sensors when the input apparatus is tilted from its original position, and reducing a calculation amount.

Another object is to provide an input apparatus, a control apparatus, a control system, a control method therefor, and a handheld apparatus that are capable of suppressing, when calculating a tilt angle by using the acceleration sensors of the input apparatus that is tilted from its original position, an effect of inertial acceleration components contained in detection values detected by the acceleration sensors when the user moves the input apparatus.

According to an embodiment, there is provided an input apparatus including: a first acceleration sensor to detect a first acceleration in a direction along a first axis; a second acceleration sensor to detect a second acceleration in a direction along a second axis different from the direction along the first axis; a first angular velocity sensor to detect a first angular velocity about the second axis; a second angular velocity sensor to detect a second angular velocity about the first axis; an angle calculation means for calculating, based on the first acceleration and the second acceleration, an angle about a third axis that has a predetermined angle with respect to an acceleration detection surface including the first axis and the second axis, the angle being formed between a combined acceleration vector of the first acceleration and the second acceleration and the second axis; and an information output means for correcting the first angular velocity and the second angular velocity by rotational coordinate conversion corresponding to the calculated angle, and outputting information on a first correction angular velocity and a second correction angular velocity obtained by the correction.

In the present embodiment, the angle of the input apparatus is calculated based on the first and second accelerations, and the first and second angular velocities are corrected by the rotational coordinate conversion corresponding to that angle. In other words, even when the user moves the input apparatus while the input apparatus is tilted with respect to a vertical axis about the third axis, an effect of gravity acceleration components in the first and second-axis directions generated by the tilt can be removed. Therefore, display of a GUI is controlled such that the GUI moves appropriately.

"Calculating" means both cases where a value is calculated by an operation and where a value is read out from various to-be-obtained values that are stored in a memory or the like as a correspondence table.

According to an embodiment, there is provided a control apparatus controlling a UI displayed on a screen in accordance with input information output from an input apparatus including a first acceleration sensor to detect a first acceleration in a direction along a first axis, a second acceleration sensor to detect a second acceleration in a direction along a second axis different from the direction along the first axis, a first angular velocity sensor to detect a first angular velocity about the second axis, and a second angular velocity sensor to detect a second angular velocity about the first axis, the control apparatus including: a reception means for receiving, as the input information, information on the first acceleration, the second acceleration, the first angular velocity, and the second angular velocity; an angle calculation means for calculating, based on the received first acceleration and second acceleration, an angle about a third axis that has a predetermined angle with respect to an acceleration detection surface including the first axis and the second axis, the angle being formed between a combined acceleration vector of the first acceleration and the second acceleration and the second axis; an information output means for correcting the received first angular velocity and second angular velocity by rotational coordinate conversion corresponding to the calculated angle, and outputting information on a first correction angular velocity and a second correction angular velocity obtained by the correction; and a coordinate information generation means for generating coordinate information of the UI on the screen that corresponds to the first correction angular velocity and the second correction angular velocity.

According to an embodiment, there is provided a control system including an input apparatus to output input information and a control apparatus to control a UI displayed on a screen in accordance with the input information output from the input apparatus. The input apparatus includes a first acceleration sensor to detect a first acceleration in a direction along a first axis, a second acceleration sensor to detect a second acceleration in a direction along a second axis different from the direction along the first axis, a first angular velocity sensor to detect a first angular velocity about the second axis, a second angular velocity sensor to detect a second angular velocity about the first axis, an angle calculation means for calculating, based on the first acceleration and the second acceleration, an angle about a third axis that has a predetermined angle with respect to an acceleration detection surface including the first axis and the second axis, the angle being formed between a combined acceleration vector of the first acceleration and the second acceleration and the second axis, and an information output means for correcting the first angular velocity and the second angular velocity by rotational coordinate conversion corresponding to the angle, and outputting information on a first correction angular velocity and a second correction angular velocity obtained by the correction. The control apparatus includes a reception means for receiving, as the input information, the information on the first correction angular velocity and the second correction angular velocity, and a coordinate information generation means for generating coordinate information of the UI on the screen that corresponds to the received first correction angular velocity and second correction angular velocity.

According to an embodiment, there is provided a control system including an input apparatus to output input information and a control apparatus to control a UI displayed on a screen in accordance with the input information output from the input apparatus. The input apparatus includes a first acceleration sensor to detect a first acceleration in a direction along a first axis, a second acceleration sensor to detect a second acceleration in a direction along a second axis different from the direction along the first axis, a first angular velocity sensor to detect a first angular velocity about the second axis, a second angular velocity sensor to detect a second angular velocity about the first axis, and an output means for outputting, as the input information, information on the first acceleration, the first acceleration, the second acceleration, the first angular velocity, and the second angular velocity. The control apparatus includes a reception means for receiving the input information, an angle calculation means for calculating, based on the received first acceleration and second acceleration, an angle about a third axis that has a predetermined angle with respect to an acceleration detection surface including the first axis and the second axis, the angle being formed between a combined acceleration vector of the first acceleration and the second acceleration and the second axis, an information output means for correcting the received first angular velocity and second angular velocity by rotational coordinate conversion corresponding to the angle, and outputting information on a first correction angular velocity and a second correction angular velocity obtained by the correction, and a coordinate information generation means for generating coordinate information of the UI on the screen that corresponds to the first correction angular velocity and the second correction angular velocity.

According to an embodiment, there is provided a control method for controlling a UI on a screen in accordance with a movement of an input apparatus, including: detecting a first acceleration of the input apparatus in a direction along a first axis; detecting a second acceleration of the input apparatus in a direction along a second axis different from the direction along the first axis; detecting a first angular velocity of the input apparatus about the second axis; detecting a second angular velocity of the input apparatus about the first axis; calculating, based on the first acceleration and the second acceleration, an angle about a third axis that has a predetermined angle with respect to an acceleration detection surface including the first axis and the second axis, the angle being formed between a combined acceleration vector of the first acceleration and the second acceleration and the second axis; correcting the first angular velocity and the second angular velocity by rotational coordinate conversion corresponding to the angle, and outputting information on a first correction angular velocity and a second correction angular velocity obtained by the correction; and generating coordinate information of the UI on the screen that corresponds to the first correction angular velocity and the second correction angular velocity.

According to an embodiment, there is provided an input apparatus including: a first acceleration sensor to detect a first acceleration in a direction along a first axis; a second acceleration sensor to detect a second acceleration in a direction along a second axis different from the direction along the first axis; a first angular velocity sensor to detect a first angular velocity about the second axis; a second angular velocity sensor to detect a second angular velocity about the first axis; a velocity calculation means for calculating, based on the first acceleration value, the second acceleration value, the first angular velocity value, and the second angular velocity value, a first velocity value in the direction along the first axis and a second velocity value in the direction along the second axis; a differential operation means for calculating a first operational acceleration value and a second operational acceleration value by differentiating the first velocity value and the second velocity value, respectively; an angle calculation means for calculating, based on a value obtained by subtracting the first operational acceleration value from the first acceleration value and a value obtained by subtracting the second operational acceleration value from the second acceleration value, an angle about a third axis that has a predetermined angle with respect to an acceleration detection surface including the first axis and the second axis, the angle being formed between a combined acceleration vector of the first acceleration and the second acceleration and the second axis; and an information output means for correcting the first velocity value and the second velocity value by rotational coordinate conversion corresponding to the calculated angle, and outputting information on a first correction velocity value and a second correction velocity value obtained by the correction.

In descriptions below, the first acceleration sensor or the second acceleration sensor may simply be referred to as acceleration sensor. Similarly, the first angular velocity sensor or the second angular velocity sensor may simply be referred to as angular velocity sensor. Similarly, the first acceleration value or the second acceleration value may simply be referred to as acceleration value, and the first angular velocity value or the second angular velocity value may simply be referred to as angular velocity value. Similarly, the first velocity value or the second velocity value may simply be referred to as velocity value, and the first correction velocity value or the second correction velocity value may simply be referred to as correction velocity value.

The time the angular velocity values are calculated by the angular velocity sensors is when the user moves the input apparatus naturally and operates it. Specifically, this is because, when a human being moves the input apparatus, the user moves the input apparatus rotationally about at least one of a shoulder, an elbow, and a wrist. Therefore, in the present embodiment, not only the acceleration values but also the angular velocity values are used to obtain the velocity values of the input apparatus in the operation, and the acceleration values (operational acceleration values) are obtained by performing a differential operation on those velocity values. Accordingly, velocity values and operational acceleration values that practically match the movement of the input apparatus can be obtained.

Meanwhile, the angle about the third axis, that is, a tilt angle about the third axis with respect to an ideal position of the input apparatus is calculated. The velocity values are corrected by the rotational coordinate conversion corresponding to the calculated angle. Accordingly, even when the user moves the input apparatus while the input apparatus is tilted with respect to the vertical axis about the third axis, the effect of gravity acceleration components in the first and second-axis directions generated by the tilt can be removed.

Even in a case where the velocity values are corrected, it is not always the case that the calculated angle does not fluctuate when the user consciously moves and operates the input apparatus. This is because, when the user moves the input apparatus, the acceleration sensor detects a value obtained by combining the gravity acceleration component value in, for example, the first-axis direction generated by the tilt of the input apparatus and the acceleration value in, for example, the first-axis direction generated by the movement of the input apparatus, as the first acceleration value.

For preventing such a fluctuation of the calculated angle, the operational acceleration value is subtracted from the acceleration value detected by the acceleration sensor when calculating the tilt angle. As described above, the operational acceleration value is calculated in consideration of the angular velocity value and is thus an acceleration value obtained when the user is consciously moving the input apparatus. In other words, by subtracting the operational acceleration values from the acceleration values detected by the acceleration sensors, practically the gravity acceleration component values in the first and second-axis directions remain. Therefore, the angle calculation means can calculate the angle that is essentially based only on the gravitational effect even when the calculated angle fluctuates by the user's operation to the input apparatus. Accordingly, the correction velocity values that match the movement of the input apparatus made by the user can be obtained.

Further, because two acceleration sensors and two angular velocity sensors are used, the calculation amount can be reduced and costs can be lowered as compared to the case where triaxial acceleration sensors and triaxial angular velocity sensors are used.

According to an embodiment, there is provided a control apparatus controlling a UI displayed on a screen in accordance with input information transmitted from an input apparatus including a first acceleration sensor to detect a first acceleration in a direction along a first axis, a second acceleration sensor to detect a second acceleration in a direction along a second axis different from the direction along the first axis, a first angular velocity sensor to detect a first angular velocity about the second axis, and a second angular velocity sensor to detect a second angular velocity about the first axis. The control apparatus includes: a reception means for receiving, as the input information, information on the first acceleration value, the second acceleration value, the first angular velocity value, and the second angular velocity value; a velocity calculation means for calculating, based on the first acceleration value, the second acceleration value, the first angular velocity value, and the second angular velocity value that have been received, a first velocity value in the direction along the first axis and a second velocity value in the direction along the second axis; a differential operation means for calculating a first operational acceleration value and a second operational acceleration value by differentiating the first velocity value and the second velocity value, respectively; an angle calculation means for calculating, based on a value obtained by subtracting the first operational acceleration value from the first acceleration value and a value obtained by subtracting the second operational acceleration value from the second acceleration value, an angle about a third axis that has a predetermined angle with respect to an acceleration detection surface including the first axis and the second axis, the angle being formed between a combined acceleration vector of the first acceleration and the second acceleration and the second axis; an information output means for correcting the first velocity value and the second velocity value by rotational coordinate conversion corresponding to the calculated angle, and outputting information on a first correction velocity value and a second correction velocity value obtained by the correction; and a coordinate information generation means for generating coordinate information of the UI on the screen that corresponds to the first correction velocity value and the second correction velocity value.

According to an embodiment, there is provided a control system controlling a UI displayed on a screen, including an input apparatus and a control apparatus. The input apparatus includes a first acceleration sensor to detect a first acceleration in a direction along a first axis, a second acceleration sensor to detect a second acceleration in a direction along a second axis different from the direction along the first axis, a first angular velocity sensor to detect a first angular velocity about the second axis, a second angular velocity sensor to detect a second angular velocity about the first axis, a velocity calculation means for calculating, based on the first acceleration value, the second acceleration value, the first angular velocity value, and the second angular velocity value, a first velocity value in the direction along the first axis and a second velocity value in the direction along the second axis, a differential operation means for calculating a first operational acceleration value and a second operational acceleration value by differentiating the first velocity value and the second velocity value, respectively, an angle calculation means for calculating, based on a value obtained by subtracting the first operational acceleration value from the first acceleration value and a value obtained by subtracting the second operational acceleration value from the second acceleration value, an angle about a third axis that has a predetermined angle with respect to an acceleration detection surface including the first axis and the second axis, the angle being formed between a combined acceleration vector of the first acceleration and the second acceleration and the second axis, an information output means for correcting the first velocity value and the second velocity value by rotational coordinate conversion corresponding to the calculated angle, and outputting information on a first correction velocity value and a second correction velocity value obtained by the correction, and a transmission means for transmitting the information on the first correction velocity value and the second correction velocity value as input information. The control apparatus includes a reception means for receiving the input information, and a coordinate information generation means for generating coordinate information of the UI on the screen that corresponds to the first correction velocity value and the second correction velocity value received as the input information.

According to an embodiment, there is provided a control system controlling a UI displayed on a screen, including an input apparatus and a control apparatus. The input apparatus includes a first acceleration sensor to detect a first acceleration in a direction along a first axis, a second acceleration sensor to detect a second acceleration in a direction along a second axis different from the direction along the first axis, a first angular velocity sensor to detect a first angular velocity about the second axis, a second angular velocity sensor to detect a second angular velocity about the first axis, and a transmission means for transmitting, as the input information, information on the first acceleration value, the first angular velocity value, and the second angular velocity value. The control apparatus includes a reception means for receiving as the input information, a velocity calculation means for calculating, based on the first acceleration value, the second acceleration value, the first angular velocity value, and the second angular velocity value that have been received as the input information, a first velocity value in the direction along the first axis and a second velocity value in the direction along the second axis, a differential operation means for calculating a first operational acceleration value and a second operational acceleration value by differentiating the first velocity value and the second velocity value, respectively, an angle calculation means for calculating, based on a value obtained by subtracting the first operational acceleration value from the first acceleration value and a value obtained by subtracting the second operational acceleration value from the second acceleration value, an angle about a third axis that has a predetermined angle with respect to an acceleration detection surface including the first axis and the second axis, the angle being formed between a combined acceleration vector of the first acceleration and the second acceleration and the second axis, an information output means for correcting the first velocity value and the second velocity value by rotational coordinate conversion corresponding to the calculated angle, and outputting information on a first correction velocity value and a second correction velocity value obtained by the correction, and a coordinate information generation means for generating coordinate information of the UI on the screen that corresponds to the first correction velocity value and the second correction velocity value.

According to an embodiment, there is provided a control method including: detecting a first acceleration of an input apparatus in a direction along a first axis; detecting a second acceleration of the input apparatus in a direction along a second axis different from the direction along the first axis; detecting a first angular velocity of the input apparatus about the second axis; detecting a second angular velocity of the input apparatus about the first axis; calculating, based on the first acceleration value, the second acceleration value, the first angular velocity value, and the second angular velocity value, a first velocity value in the direction along the first axis and a second velocity value in the direction along the second axis; calculating a first operational acceleration value and a second operational acceleration value by differentiating the first velocity value and the second velocity value, respectively; calculating, based on a value obtained by subtracting the first operational acceleration value from the first acceleration value and a value obtained by subtracting the second operational acceleration value from the second acceleration value, an angle about a third axis that has a predetermined angle with respect to an acceleration detection surface including the first axis and the second axis, the angle being formed between a combined acceleration vector of the first acceleration and the second acceleration and the second axis; correcting the first velocity value and the second velocity value by rotational coordinate conversion corresponding to the calculated angle; outputting information on a first correction velocity value and a second correction velocity value obtained by the correction; and generating coordinate information of a UI on a screen that corresponds to the first correction velocity value and the second correction velocity value.

According to an embodiment, there is provided an input apparatus including an acceleration output means, an angular velocity output means, an information output means, and a suppression means.

The acceleration output means includes an acceleration sensor and outputs a first acceleration of the input apparatus in a direction along a first axis and a second acceleration of the input apparatus in a direction along a second axis different from the direction along the first axis using the acceleration sensor.

The angular velocity output means outputs a first angular velocity of the input apparatus about a third axis and a second angular velocity of the input apparatus about a fourth axis different from the third axis.

The information output means calculates, based on the first acceleration and the second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, corrects the first angular velocity and the second angular velocity by rotational coordinate conversion corresponding to the calculated angle, and outputs at least first information containing a first correction angular velocity and a second correction angular velocity obtained by the correction.

The suppression means suppresses, when at least one of the first acceleration and the second acceleration includes a gravity acceleration component and an inertial acceleration component generated by a movement of the input apparatus, a fluctuation of the calculated angle attributable to the inertial acceleration component.

The angle of the input apparatus is calculated based on the first and second accelerations, and the first and second angular velocities are corrected by the rotational coordinate conversion corresponding to that angle. In other words, even when the user moves the input apparatus while the input apparatus is tilted with respect to the vertical axis about the fifth axis, the effect of gravity acceleration components in the first and second-axis directions generated by the tilt can be removed. Therefore, display of the pointer is controlled such that the pointer moves appropriately.

Even in a case where the angular velocity values are corrected, it is not always the case that the calculated angle does not fluctuate when the user consciously moves and operates the input apparatus. This is because, when the user moves the input apparatus, the acceleration sensor detects a value obtained by combining the gravity acceleration component in, for example, the first-axis direction generated by the tilt of the input apparatus and the inertial acceleration in, for example, the first-axis direction generated by the movement of the input apparatus, as the first acceleration.

In this regard, the suppression means suppresses the fluctuation of the calculated angle attributable to the inertial acceleration component. Accordingly, the angle that is essentially based only on the gravitational effect can be calculated, and the correction angular velocity values that match the movement of the input apparatus made by the user can be obtained.

"Calculating" means both cases where a value is calculated by an operation and where a value is read out from various to-be-obtained values that are stored in a memory or the like as a correspondence table.

Typically, the first and fourth axes coincide and the second and third axes coincide, though those axes do not necessarily need to coincide.

The angular velocity output means may include an angular velocity sensor, an angle sensor, or an angular acceleration sensor. When the angular velocity output means includes the angle sensor, the angular velocity obtained by differentiating the detected angle is output. When the angular velocity output means includes the angular acceleration sensor, the angular velocity obtained by integrating the detected angular acceleration is output.

The input apparatus may further include an update means for updating the first correction angular velocity and the second correction angular velocity obtained by the correction. In this case, the information output means may stop the update of the first correction angular velocity and the second correction angular velocity and output, as the second information, information on the first correction angular velocity and the second correction angular velocity that have been updated last.

The input apparatus may further include an update means for updating the first correction angular velocity and the second correction angular velocity obtained by the correction. In this case, the stop means may stop the update of the first correction angular velocity and the second correction angular velocity, and the information output means may output, as the second information, information on the first correction angular velocity and the second correction angular velocity that have been updated last.

The stop means may include a switch for a user to make a switch between stop and start of the predetermined processing carried out by the information output means. Examples of the switch include a mechanical DIP switch, a push-button-type switch, and a switch that uses a sensor. An electric sensor, a magnetic sensor, an optical sensor, and the like are conceivable. For example, when the switch is an ON/OFF-type push button, it is also possible that the processing carried out by the information output means is stopped when the user presses the button, and the processing is resumed when the user presses the button again. Alternatively, a form in which the processing is stopped (or the processing is executed) while the user is pressing the button is also possible.

The stop means may stop the predetermined processing when an amount of the combined acceleration vector of the first acceleration and the second acceleration at a time the acceleration detection surface is tilted from an absolute vertical surface is equal to or smaller than a threshold value. In this case, the start means may start the predetermined processing when the amount of the combined acceleration vector exceeds the threshold value. When the tilt angle of the acceleration detection surface from the vertical surface becomes too large, the combined acceleration vector amount may become small, with the result that an accurate angle cannot be calculated. Therefore, when the combined acceleration vector amount is equal to or smaller than the threshold value, it is only necessary that the predetermined processing be stopped, and a previous angle value be used for correcting the first angular velocity and the second angular velocity, or previous (last) first correction angular velocity and second angular velocity be output, for example.

The absolute vertical surface is a surface including an axis in the gravity direction, that is, an axis vertical to the ground. The vertical axis above as the axis in the gravity direction makes the calculation easier.

The stop means may stop the calculation of the angle as the predetermined processing, and the input apparatus may further include a judgment means for judging whether an angular difference between a first angle obtained when the calculation of the angle is stopped and a second angle obtained when the calculation of the angle is resumed is equal to or larger than a threshold value. In this case, the information output means may correct, when the angular difference is equal to or larger than the threshold value, the first angular velocity and the second angular velocity by rotational coordinate conversion corresponding to a third angle obtained by adding 180 deg to the second angle. There are cases where, when the user moves the input apparatus such that the angle becomes larger from when the calculation of the angle is stopped to when being resumed, a detection direction of the first acceleration or the second acceleration is inverted. In this case, according to the present embodiment, accuracy of the input apparatus in recognizing a position of the input apparatus is improved, and such display that the GUI moves in an appropriate direction becomes possible.

The input apparatus may further include an angular velocity direction judgment means for judging whether the first angular velocity obtained when the calculation of the angle is stopped and that obtained when the calculation of the angle is resumed are in the same direction. In this case, the information output means may correct, when the first angular velocities are in the same direction, the first angular velocity and the second angular velocity by the rotational coordinate conversion corresponding to the angle obtained by adding 180 deg to the second angle obtained when the calculation of the angle is resumed. By confirming the continuity of the direction of the first angular velocities, accuracy of the input apparatus in recognizing the position of the input apparatus is improved.

Instead of or in addition to the judgment on the direction of the first, angular velocities, the angular velocity direction judgment means may judge whether the second angular velocities are in the same direction.

Alternatively, the input apparatus may further include an angular velocity vector judgment means for judging whether a difference between a first combined angular velocity vector amount of the first angular velocity and the second angular velocity obtained when the calculation of the angle is stopped and a second combined angular velocity vector amount of the first angular velocity and the second angular velocity obtained when the calculation of the angle is resumed is equal to or larger than a threshold value. In this case, the information output means may correct, when the difference between the first combined angular velocity vector amount and the second combined angular velocity vector amount is equal to or larger than the threshold value, the first angular velocity and the second angular velocity by the rotational coordinate conversion corresponding to the angle obtained by adding 180 deg to the second angle obtained when the calculation of the angle is resumed.

The suppression means may include a lowpass filter to which a signal of at least one of the first acceleration and the second acceleration is input, and the information output means may calculate the angle based on the signal that has passed through the lowpass filter. It goes without saying that the signal of the acceleration generated when the user moves the input apparatus is a signal having a higher frequency than the constantly-acting gravity acceleration. Therefore, by removing the high-frequency component of the signal as described above using the lowpass filter, the effect of inertial accelerations generated when the user moves the input apparatus can be removed at the time the angle is calculated.

The suppression means may stop the calculation of the angle when at least one of a first angular acceleration about the third axis that is obtained based on the first angular velocity and a second angular acceleration about the fourth axis that is obtained based on the second angular velocity is equal to or larger than a threshold value. When the user operates the input apparatus naturally, the angular acceleration is generated in the input apparatus. The angle is calculated based on the first and second accelerations using a predetermined expression. Further, the first or second acceleration is calculated based on the angular acceleration using still another expression. Therefore, even when the accelerations are generated in the input apparatus when the user moves the input apparatus, desired first and second accelerations for suppressing the calculation error of the angle within an allowable range, for example, can be calculated based on the angular accelerations. In other words, by setting the threshold value of the angular accelerations, the calculation error of the angle can be suppressed within the allowable range.

The suppression means may stop the calculation of the angle when at least one of the first angular velocity and the second angular velocity is equal to or larger than a threshold value. It is known from an experiment that when the user operates the pointer at high speed, that is, when the angular velocities are high, not calculating the angle gives less awkwardness as a sense of human beings.

The suppression means may stop the calculation of the angle when at least one of the first acceleration and the second acceleration is equal to or larger than a threshold value.

The suppression means causes the information output means to calculate, based on the first acceleration, the second acceleration, the first angular velocity, and the second angular velocity, a first velocity in the direction along the first axis and a second velocity in the direction along the second axis, calculate a first operational acceleration and a second operational acceleration by differentiating the first velocity and the second velocity, respectively, and calculate the angle based on a value obtained by subtracting the first operational acceleration from the first acceleration and a value obtained by subtracting the second operational acceleration from the second acceleration.

The time the angular velocities are calculated by the angular velocity output means is when the user moves the input apparatus naturally and operates it. Specifically, this is because, when a human being moves the input apparatus, the user moves the input apparatus rotationally about at least one of a shoulder, an elbow, and a wrist. Therefore, not only the accelerations but also the angular velocities are used to obtain the velocities of the input apparatus in the operation, and the accelerations (operational accelerations) are obtained by performing the differential operation on those velocities. Accordingly, velocities and operational accelerations that practically match the movement of the input apparatus can be obtained.

The input apparatus may further include: a judgment means for judging whether at least one of the first operational acceleration and the second operational acceleration exceeds a threshold value; an update means for updating the angle when both the first operational acceleration and the second operational acceleration are equal to or smaller than the threshold value; and a control means for controlling the update means so that, when at least one of the first operational acceleration and the second operational acceleration exceeds the threshold value, the update of the angle by the update means is stopped. When the operational accelerations are extremely large, an operational error of the angle becomes large, whereby an accurate angle may not be calculated. By thus carrying out the threshold-value judgment, an appropriate tilt angle is calculated. In the present embodiment, when at least one of the first and second accelerations exceeds the threshold value, the rotational coordinate conversion corresponding to the second angle that has been previously updated and stored is carried out so that the velocity values are calculated accurately.

The input apparatus may further include: a judgment means for judging whether an operational value obtained based on the first operational acceleration and the second operational acceleration exceeds a threshold value; an update means for updating the angle when the operational value is equal to or smaller than the threshold value; and a control means for controlling the update means so that, when at least one of the first operational acceleration and the second operational acceleration exceeds the threshold value, the update of the angle by the update means is stopped.

The target of the threshold-value judgment is not limited to the operational accelerations. For example, the acceleration values (or operational values thereof) detected by the acceleration sensors, the angular velocities (or operational values thereof) detected by the angular velocity sensors, the angular accelerations (or operational values thereof) calculated by subjecting the angular velocities to the differential operation, or the like can be the target of the threshold-value judgment.

The operational value is an absolute value of the combined vector of the detection values regarding the respective axes, an additional value thereof, a mean value thereof, or a value calculated by other operational expressions.

The input apparatus may further include: a judgment means for judging whether at least one of the first acceleration and the second acceleration exceeds a threshold value; an update means for updating the angle when both the first acceleration and the second acceleration are equal to or smaller than the threshold value; and a control means for controlling the update means so that, when at least one of the first operational acceleration and the second operational acceleration exceeds the threshold value, the update of the angle by the update means is stopped.

The acceleration output means may output a third acceleration in a direction along the fifth axis. In this case, the input apparatus may further include: a judgment means for judging whether the third acceleration is equal to or larger than a threshold value; an update means for updating the stored angle when the third acceleration is smaller than the threshold value; and a control means for controlling the update means so that, when at least one of the first operational acceleration and the second operational acceleration exceeds the threshold value, the update of the angle by the update means is stopped. For example, when the angle of the fifth axis with respect to the acceleration detection surface is large (close to) 90°, (an absolute value of) the third acceleration substantively becomes closer to 0 as the acceleration detection surface becomes substantially parallel to the absolute vertical surface. In other words, the third acceleration increases as the tilt of the surface from the vertical surface increases. Therefore, the third acceleration may be set as the target of the threshold-value judgment. In this case, it is possible to set the threshold value within a range in which the third acceleration becomes a sufficiently large value. Accordingly, because the threshold-value judgment is carried out in a state where a relatively-low noise level occurs with respect to the third acceleration, that is, a state where a high S/N can be obtained, accuracy of the judgment can be improved.

According to an embodiment, there is provided a control apparatus controlling a pointer displayed on a screen in accordance with input information output from an input apparatus including an acceleration output means including an acceleration sensor, for outputting a first acceleration of the input apparatus in a direction along a first axis and a second acceleration of the input apparatus in a direction along a second axis different from the direction along the first axis using the acceleration sensor, and an angular velocity output means for outputting a first angular velocity of the input apparatus about a third axis and a second angular velocity of the input apparatus about a fourth axis different from the third axis.

The control apparatus includes a reception means, an information output means, a suppression means, and a coordinate information generation means.

The reception means receives, as the input information, information on the first acceleration, the second acceleration, the first angular velocity, and the second angular velocity.

The information output means calculates, based on the received first acceleration and second acceleration, an angle about the third axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, corrects the received first angular velocity and second angular velocity by rotational coordinate conversion corresponding to the calculated angle, and outputs information on a first correction angular velocity and a second correction angular velocity obtained by the correction.

The suppression means suppresses, when at least one of the first acceleration and the second acceleration includes a gravity acceleration component and an inertial acceleration component generated by a movement of the input apparatus, a fluctuation of the calculated angle attributable to the inertial acceleration component.

The coordinate information generation means generates coordinate information of the pointer on the screen that corresponds to the first correction angular velocity and the second correction angular velocity.

The control apparatus may further include a stop means for stopping predetermined processing carried out by the information output means. In this case, the information output means may output second information different from the first information when the predetermined processing is stopped. The control apparatus may further include a start means for causing the information output means to resume the predetermined processing.

The stop means may include a switch means for a user to make a switch between stop and start of the predetermined processing carried out by the information output means. The switch means may be the switches described above, or may be realized by means including software that uses a GUI.

According to an embodiment, there is provided a control system including an input apparatus and a control apparatus.

The input apparatus includes an acceleration output means, an angular velocity output means, an information output means, and a suppression means. The control apparatus includes a reception means and a coordinate information generation means. Those means are the same as those described above.

Alternatively, according to another embodiment, there is provided a control system including an input apparatus that includes an acceleration output means and an angular velocity output means, and a control apparatus that includes a reception means, an information output means, a suppression means, and a coordinate information generation means.

According to an embodiment, there is provided a handheld apparatus including the acceleration output means, the angular velocity output means, the information output means, the suppression means, and the coordinate information generation means described above.

According to an embodiment, there is provided a control method including outputting, using an acceleration sensor, a first acceleration of an input apparatus in a direction along a first axis and a second acceleration of the input apparatus in a direction along a second axis different from the direction along the first axis, and outputting a first angular velocity of the input apparatus about a third axis and a second angular velocity of the input apparatus about a fourth axis different from the third axis.

Based on the first acceleration and the second acceleration, an angle about a fifth axis that has a predetermined angle with respect to an acceleration detection surface of the acceleration sensor including the first axis and the second axis, the angle being formed between a combined acceleration vector of the received first acceleration and second acceleration and a reference axis within the acceleration detection surface, is calculated.

The first angular velocity and the second angular velocity are corrected by rotational coordinate conversion corresponding to the calculated angle.

When at least one of the first acceleration and the second acceleration includes a gravity acceleration component and an inertial acceleration component generated by a movement of the input apparatus, a fluctuation of the calculated angle attributable to the inertial acceleration component is suppressed.

Coordinate information of a pointer on a screen that corresponds to a first correction angular velocity and a second correction angular velocity obtained by the correction is generated.

According to another embodiment, there is provided an input apparatus including an acceleration output means, an angular velocity output means, a calculation means, an information output means, and a suppression means.

The calculation means calculates, based on the first acceleration, the second acceleration, the first angular velocity, and the second angular velocity, a first velocity of the input apparatus in the direction along the first axis and a second velocity of the input apparatus in the direction along the second axis.

The information output means calculates, based on the first acceleration and the second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, corrects the calculated first velocity and second velocity by rotational coordinate conversion corresponding to the calculated angle, and outputs at least first information containing a first correction velocity and a second correction velocity obtained by the correction.

The acceleration output means, the angular velocity output means, and the suppression means are the same as those described above.

Similarly, the control apparatus, the control system, the handheld apparatus, and the control method may also be provided with the calculation means described above.

The input apparatus may further include a stop means for causing the information output means to stop predetermined processing. In this case, the information output means may output second information different from the first information when the predetermined processing is stopped.

The stop means may stop the output of the first information as the predetermined processing. The stop means may stop the calculation of the angle as the predetermined processing. The stop means may stop the correction by the rotational coordinate conversion as the predetermined processing.

The input apparatus may further include a start means for causing the information output means to resume the predetermined processing.

The information output means may output, as the second information, information on the first angular velocity and the second angular velocity as values not corrected by the rotational coordinate conversion. In other words, when the output of the first information is stopped by the stop means, the information on the uncorrected first and second angular velocities is output. For example, if the correction by the rotational coordinate conversion is executed when the user who is used to operating the input apparatus moves and operates the input apparatus, the user may find the operability poor. In this case, if the user can manually stop the output of the first information by the stop means, such inconveniences can be eliminated.

As described above, according to the present embodiments, it is possible to solve the problem on gravity that affects the acceleration sensors when the input apparatus is tilted, and reduce the calculation amount.

According to the present embodiment, it is possible to suppress, when the input apparatus is tilted and the tilt angle is calculated using the acceleration sensors, the effect of inertial acceleration components contained in the detection values detected by the acceleration sensors when the user moves the input apparatus.

Additional features and advantages are described herein, and will be apparent from, the following Detailed Description and the figures.

BRIEF DESCRIPTION OF THE FIGURES

[FIG. 1] A diagram showing a control system according to an embodiment.

[FIG. 9] Diagrams for illustrating a gravitational effect with respect to an acceleration sensor unit.

[FIG. 15] (A) is a diagram showing a position of the acceleration sensor unit at an instant a calculation of a roll angle is stopped. (B) is a diagram showing the position of the acceleration sensor unit at an instant the calculation of the roll angle resumed.

DETAILED DESCRIPTION

Hereinafter, embodiments will be described with reference to the drawings.

FIG. 1 is a diagram showing a control system according to an embodiment. A control system 100 includes a display apparatus 5, a control apparatus 40, and an input apparatus 1.

Figure 2:
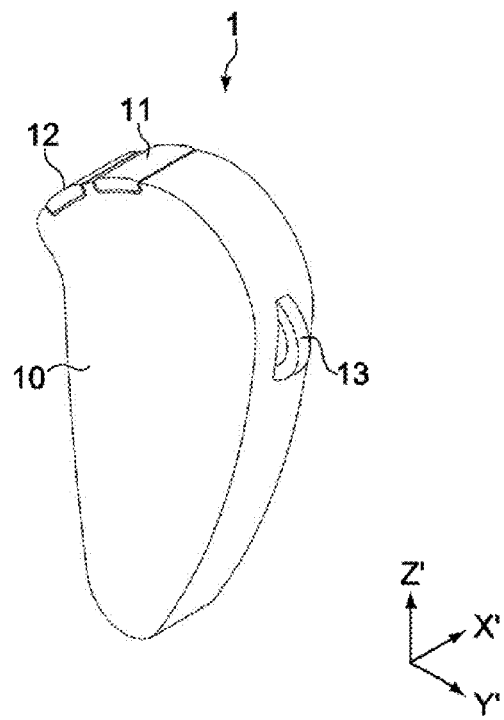
[FIG. 2] A perspective diagram showing an input apparatus.

FIG. 2 is a perspective diagram showing the input apparatus 1. The input apparatus 1 is of a size that a user is capable of holding. The input apparatus 1 includes a casing 10 and operation sections including two buttons 11 and 12 provided at an upper portion of the casing 10, a rotary wheel button 13, and the like, for example. The button 11 disposed closer to the center of the upper portion of the casing 10 functions as a left button of a mouse as an input device for a PC, for example, and the button 12 adjacent to the button 11 functions as a right button of the mouse.

For example, a "drag and drop" operation may be executed by moving the input apparatus 1 while pressing the button 11, a file may be opened by double-clicking the button 11, and a screen 3 may be scrolled by the wheel button 13. Locations of the buttons 11 and 12 and the wheel button 13, a content of a command issued, and the like can arbitrarily be changed.

Figure 3:
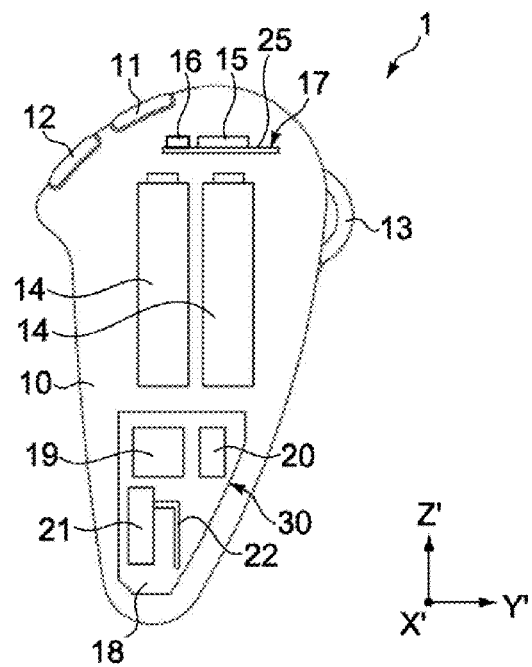
[FIG. 3] A diagram schematically showing an internal structure of the input apparatus.
Figure 4:
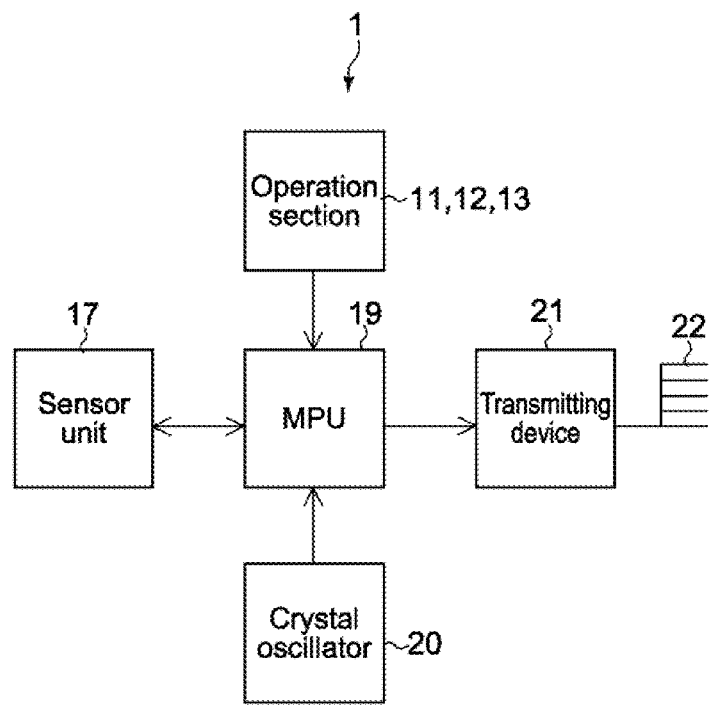
[FIG. 4] A block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
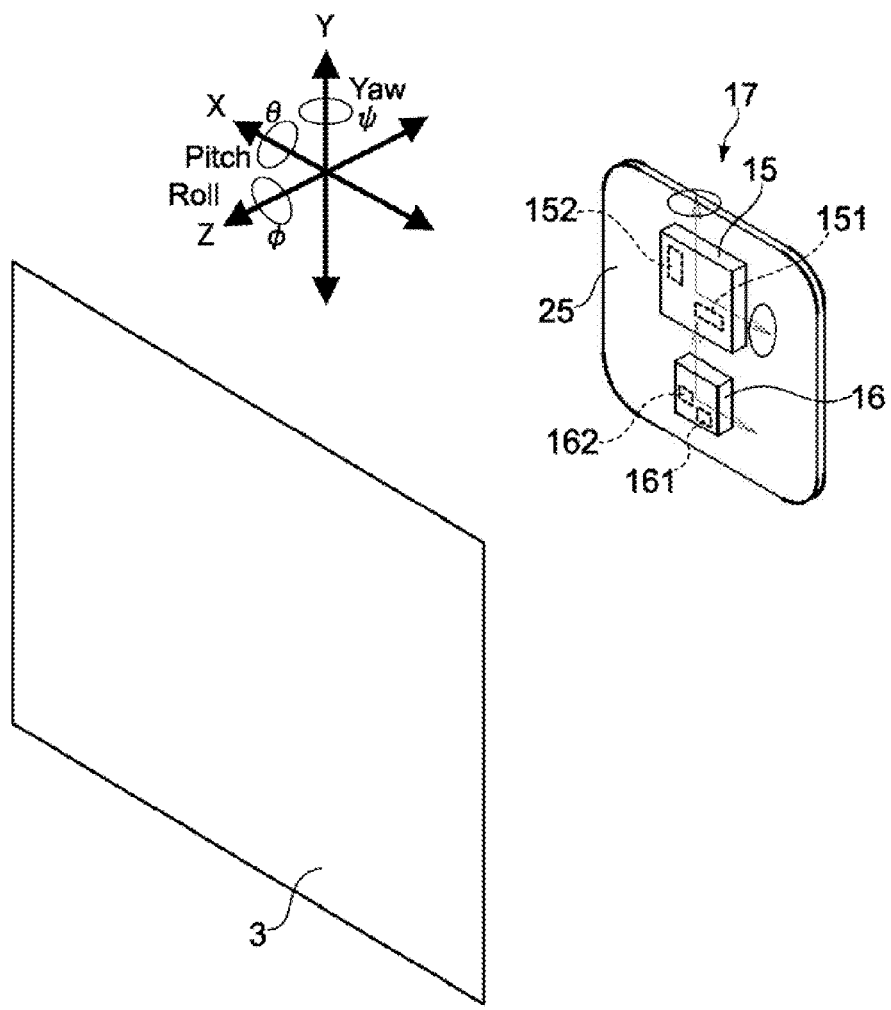
[FIG. 8] A perspective diagram showing a sensor unit.

FIG. 8 is a perspective diagram showing the sensor unit 17. The sensor unit 17 includes an acceleration sensor unit 16 for detecting accelerations in different angles such as along two orthogonal axes (X axis and Y axis). Specifically, the acceleration sensor unit 16 includes two sensors, that is, a first acceleration sensor 161 and a second acceleration sensor 162. The sensor unit 17 further includes an angular velocity sensor unit 15 for detecting angular accelerations about the two orthogonal axes. Specifically, the angular velocity sensor unit 15 includes two sensors, that is, an angular velocity sensor 151 and an angular velocity sensor 152. The acceleration sensor unit 16 and the angular velocity sensor unit 15 are packaged and mounted on a circuit board 25.

As each of the angular velocity sensor 151 and the angular velocity sensor 152, a vibration gyro sensor for detecting Coriolis force in proportion to an angular velocity is used. As each of the first acceleration sensor 161 and the second acceleration sensor 162, any sensor such as a piezoresistive sensor, a piezoelectric sensor, or a capacitance sensor may be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. A plane including an X' axis (pitch axis) and a Y' axis (yaw axis) is an acceleration detection surface, that is, a plane substantially parallel to a main surface of the circuit board 25 (hereinafter, simply referred to as detection surface).

In descriptions below, for convenience, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Further, with regard to a movement of the input apparatus 1, a direction about the X' axis is sometimes referred to as pitch direction, a direction about the Y' axis is sometimes referred to as yaw direction, and a direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transmitting device 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section, and the like, and executes various kinds of operational processing in order to generate predetermined control signals in response to those input signals.

The transmitting device 21 transmits, as RF radio signals, the control signals (input information) generated in the MPU 19 to the control apparatus 40 via the antenna 22.

The crystal oscillator 20 generates clocks and supplies them to the MPU 19. As the batteries 14, dry cell batteries, rechargeable batteries, and the like are used.

The control apparatus 40 is a computer and includes an MPU 35 (or CPU), a RAM 36, a ROM 37, a video RAM 41, an antenna 39, and a receiver device 38.

The receiver device 38 receives the control signal (or input information) transmitted from the input apparatus 1 via the antenna 39. The MPU 35 analyzes the control signal and executes various kinds of operational processing. Accordingly, a display control signal for controlling the screen 3 of the display apparatus 5 is generated. The video RAM 41 stores screen data displayed on the display apparatus 5 generated in response to the display control signal.

The control apparatus 40 may be an apparatus dedicated to the input apparatus 1, or may be a PC or the like. The control apparatus 40 is not limited to the PC, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 5:
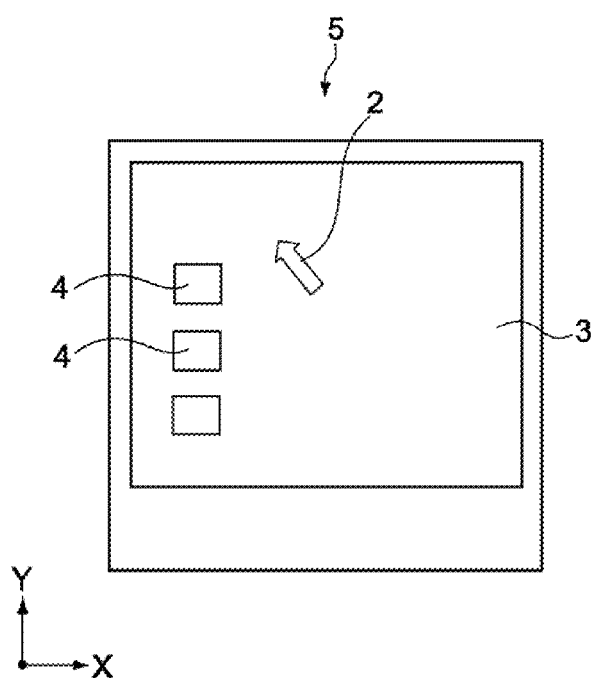
[FIG. 5] A diagram showing an example of a screen displayed on a display apparatus.

FIG. 5 is a diagram showing an example of the screen 3 displayed on the display apparatus 5. UIs such as icons 4 and a pointer 2 are displayed on the screen 3. The icons are images on the screen 3 representing functions of programs, execution commands, file contents, and the like of the computer. It should be noted that on the screen 3, the horizontal direction is referred to as X-axis direction and the vertical direction is referred to as Y-axis direction.

Figure 6:
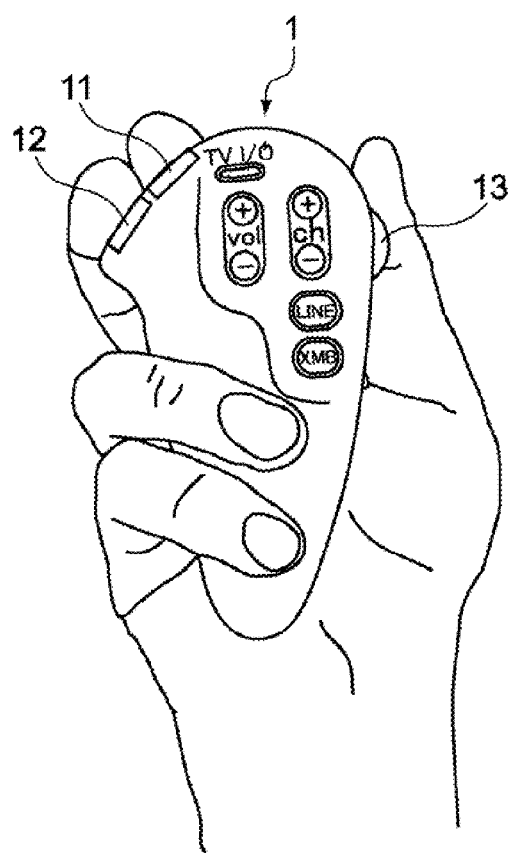
[FIG. 6] A diagram showing a state where a user is holding the input apparatus.

FIG. 6 is a diagram showing a state where a user is holding the input apparatus 1. As shown in FIG. 6, the input apparatus 1 may include, in addition to the buttons 11, 12, and 13, operation sections including various operation buttons such as those provided to a remote controller for operating a television or the like and a power switch, for example. When the user moves the input apparatus 1 in the air or operates the operation sections while holding the input apparatus 1 as shown in the figure, input information thereof is output to the control apparatus 40, and the control apparatus 40 controls the pointer.

Next, a description will be given on typical examples of ways of moving the input apparatus 1 and ways the pointer 2 moves on the screen 3 thereby. FIG. 7 are explanatory diagrams therefor.

Figure 7A:
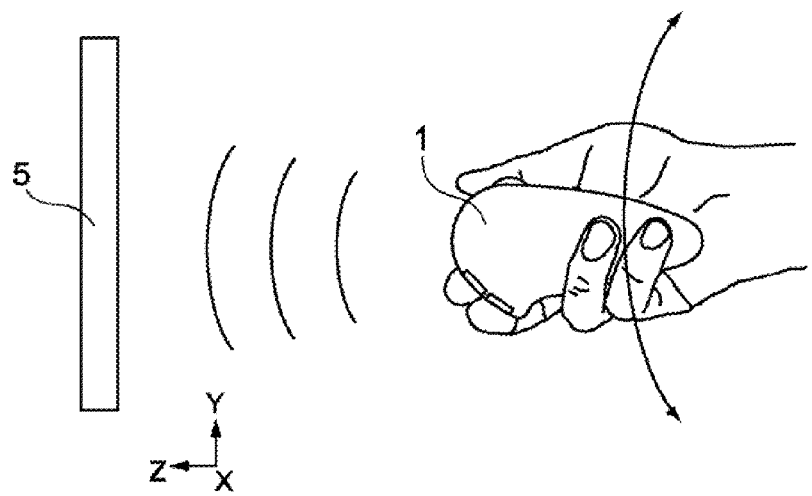
[FIG. 7] Explanatory diagrams showing typical examples of ways of moving the input apparatus and ways a pointer moves on the screen accordingly.
Figure 7B:
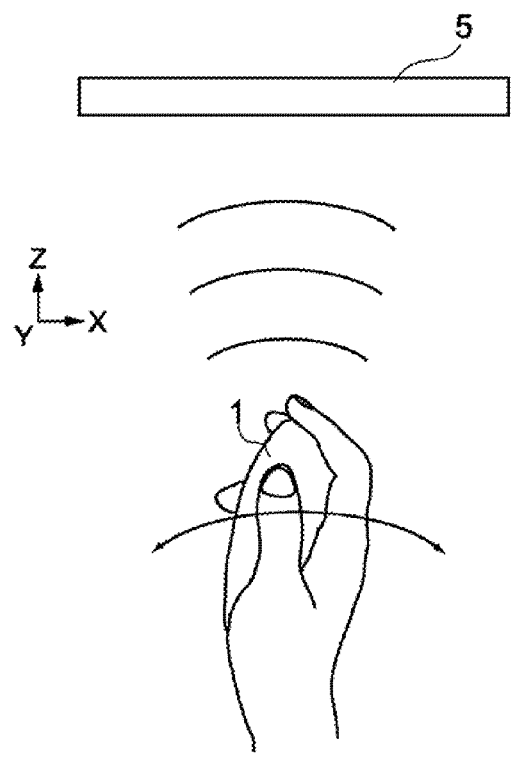

As shown in FIGS. 7A and 7B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 (see FIG. 8) of the sensor unit 17 is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7A and 7B is referred to as reference position.

As shown in FIG. 7A, in the reference position, the user moves a wrist or an arm in the vertical direction or swings it in the pitch direction. At this time, the second acceleration sensor 162 detects an acceleration in the Y-axis direction (second acceleration) and the angular velocity sensor 151 detects an angular velocity $\omega_\theta$ about the X axis. Based on those detection values, the control apparatus 40 controls display of the pointer 2 so as to move the pointer 2 in the Y-axis direction.

Meanwhile, as shown in FIG. 7B, in the reference position, the user moves the wrist or the arm in the lateral direction or swings it in the yaw direction. At this time, the first acceleration sensor 161 detects an acceleration in the X-axis direction (first acceleration) and the angular velocity sensor 152 detects an angular velocity $\omega_\psi$ about the Y axis. Based on those detection values, the control apparatus 40 controls display of the pointer 2 so as to move the pointer 2 in the X-axis direction.

Next, a description will be given on a gravitational effect with respect to the acceleration sensor unit 16. FIG. 9 are explanatory diagrams therefor. FIG. 9 are diagrams showing the input apparatus 1 seen from the Z direction.

In FIG. 9A, the input apparatus 1 is in the reference position and is held still. At this time, an output of the first acceleration sensor 161 is substantially 0, and an output of the second acceleration sensor 162 is an output corresponding to a gravity acceleration G. However, as shown in FIG. 9B, for example, in a state where the input apparatus 1 is tilted in the roll direction, the first and second acceleration sensors 161 and 162 respectively detect acceleration values of tilt components of the gravity acceleration G.

In this case, the first acceleration sensor 161 detects the acceleration in the X-axis direction even when the input apparatus 1 is not actually moved in the yaw direction in particular. The state shown in FIG. 9B is equivalent to a state where, when the input apparatus 1 is in the reference position as shown in FIG. 9C, the acceleration sensor unit 16 has received inertial forces Ix and Iy as respectively indicated by arrows with broken lines, thus being undistinguishable by the acceleration sensor unit 16. As a result, the acceleration sensor unit 16 judges that an acceleration in a downward left-hand direction as indicated by an arrow F is applied to the input apparatus 1 and outputs a detection signal different from the actual movement of the input apparatus 1. In addition, because the gravity acceleration G constantly acts on the acceleration sensor unit 16, an integration value is increased and an amount by which the pointer 2 is displaced in the downward oblique direction is increased at an accelerating pace. When the state is shifted from that shown in FIG. 9A to that shown in FIG. 9B, it is considered that inhibition of the movement of the pointer 2 on the screen 3 is an operation that intrinsically matches the intuition of the user.

Figure 10:
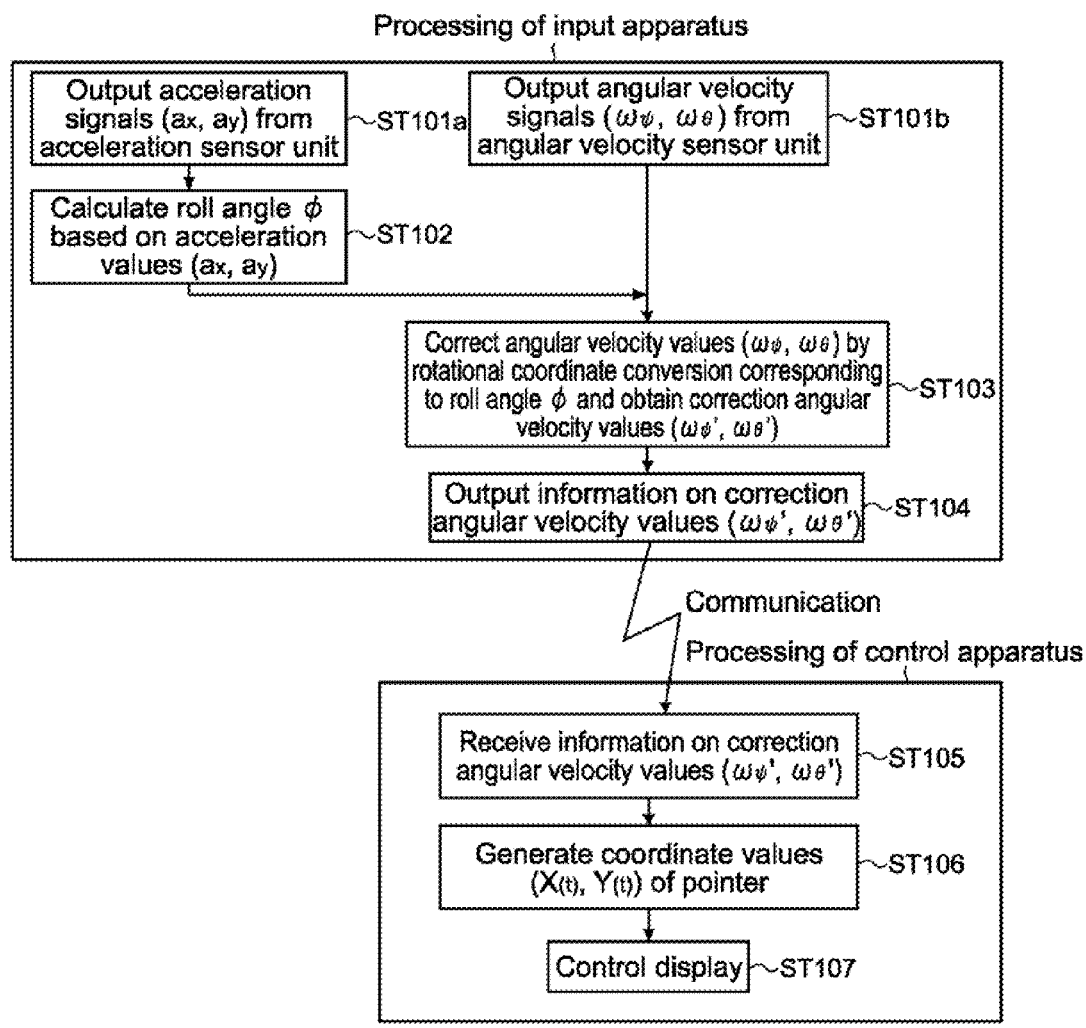
[FIG. 10] A flowchart showing an operation of the control system, including correction processing by rotational coordinate conversion in a roll direction for reducing the gravitational effect with respect to the acceleration sensor unit as much as possible.

To reduce such a gravitational effect with respect to the acceleration sensor unit 16 as much as possible, the input apparatus 1 of this embodiment calculates an angle in the roll direction and uses it to correct the angular velocities. Hereinafter, descriptions will be given on an operation of the control system 100 including the correction processing. FIG. 10 is a flowchart showing the operation.

Power of the input apparatus 1 is turned on. For example, the user turns on a power supply switch or the like provided to the input apparatus 1 or the control apparatus 40 to turn on the power of the input apparatus 1. Upon turning on the power, biaxial acceleration signals (first and second acceleration values $a_x$ and $a_y$) are output from the acceleration sensor unit 16 (Step 101a) to be supplied to the MPU 19. The acceleration signals are signals corresponding to the position of the input apparatus 1 at a point when the power is turned on (hereinafter, referred to as initial position).

There are cases where the initial position is the reference position. However, a position at which the entire amount of the gravity acceleration is detected in the X-axis direction, that is, a position at which the output of the first acceleration sensor 161 is the acceleration value corresponding to the gravity acceleration and the output of the second acceleration sensor 162 is 0 is also possible. As a matter of course, as the initial position, a position tilted in the roll direction as shown in FIG. 9B is also possible.

The MPU 19 calculates a roll angle $\phi$ using Equation (1) below based on the gravity acceleration component values $(a_x, a_y)$ (Step 102).

$$\phi = \arctan(a_x/a_y) \quad (1)$$

The roll angle used herein refers to an angle formed between a combined acceleration vector with respect to the X'- and Y'-axis directions and the Y' axis (see FIG. 9B). However, without being limited thereto, the roll angle may be any angle as long as it is an angle formed between the combined acceleration vector and an axis (reference axis) within the plane including the X' axis and the Y' axis. In other words, in this embodiment, although the Y' axis is used as the reference axis, the reference axis may be any axis within the plane, and the fact that the rotational coordinate conversion corresponding to the roll angle is executed does not change in its essence.

Further, upon turning on the power of the input apparatus 1, biaxial angular velocity signals (angular velocity values $\omega_\theta$ and $\omega_\psi$) are output from the angular velocity sensor unit 15 (Step 101b) and supplied to the MPU 19.

Figure 11:
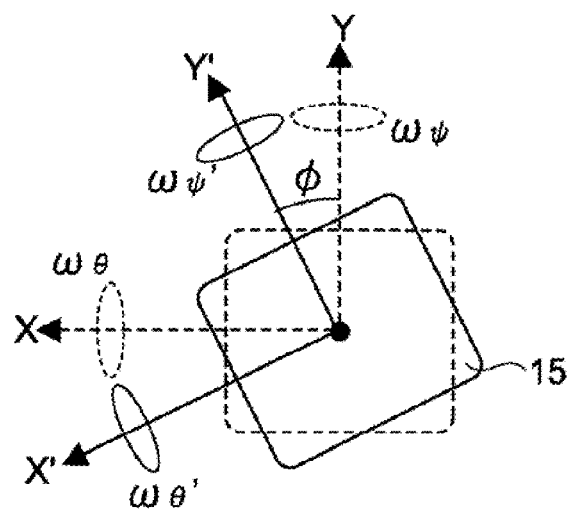
[FIG. 11] An expression and an explanatory diagram of the rotational coordinate conversion.

The MPU 19 corrects the angular velocity values $(\omega_\psi, \omega_\theta)$ by the rotational coordinate conversion corresponding to the calculated roll angle, to thus obtain correction angular velocity values (first and second correction angular velocity values $(\omega_\psi', \omega_\theta')$) as correction values (Step 103). In other words, the MPU 19 corrects the angular velocity values $(\omega_\psi, \omega_\theta)$ using Equation (3) of the rotational coordinate conversion shown in FIG. 11. The MPU 19 outputs information on the correction angular velocity values $(\omega_\psi', \omega_\theta')$ to the control apparatus 40 (Step 104).

The MPU 35 of the control apparatus 40 receives the information on the correction angular velocity values $(\omega_\psi', \omega_\theta')$ (Step 105). The input apparatus 1 outputs the correction angular velocity values $(\omega_\psi', \omega_\theta')$ every predetermined clocks, that is, per unit time, so the control apparatus 40 can receive this and obtain change amounts of the yaw angle and the pitch angle per unit time. The MPU 35 generates coordinate values of the pointer 2 on the screen 3 that corresponds to the obtained change amounts of the yaw angle $\psi(t)$ and the pitch angle $\theta(t)$ per unit time (Step 106) and controls display so that the pointer 2 moves on the screen 3 (Step 107) (coordinate information generation means).

In Step 106, the MPU 35 obtains the change amounts of the pointer 2 on the screen 3 per unit time that correspond to the change amounts of the yaw angle and the pitch angle per unit time, by an operation or a correspondence table stored in advance in the ROM 37. Alternatively, it is also possible for the MPU 35 to output the signals of the correction angular velocity values after passing them through a lowpass filter (may either be digital or analog). The MPU 35 can thus generate the coordinate values of the pointer 2.

As described above, the roll angle $\phi$ of the input apparatus 1 is calculated based on the gravity acceleration component values $(a_x, a_y)$, and the angular velocities $(\omega_\psi, \omega_\theta)$ are corrected by the rotational coordinate conversion corresponding to the roll angle $\phi$. In other words, even when the user moves the input apparatus 1 while the input apparatus 1 is tilted with respect to an axis in a gravity direction (hereinafter, referred to as vertical axis) about the Z axis, an effect of gravity acceleration components in the X'- and Y'-axis directions generated by the tilt can be removed.

It should be noted that when the user actually moves and operates the input apparatus 1 after the effect of the gravity acceleration components generated by the tilt of the input apparatus 1 in the roll direction is removed as described above, an acceleration is generated in the input apparatus 1 (inertial acceleration). It is considered that, because the acceleration sensor unit 16 detects an acceleration as a combination of the gravity acceleration and the inertial acceleration, the roll angle φ calculated in Step 102 fluctuates due to the inertial acceleration. The fluctuation of the roll angle φ is suppressed by a method to be described later.

Figure 12:
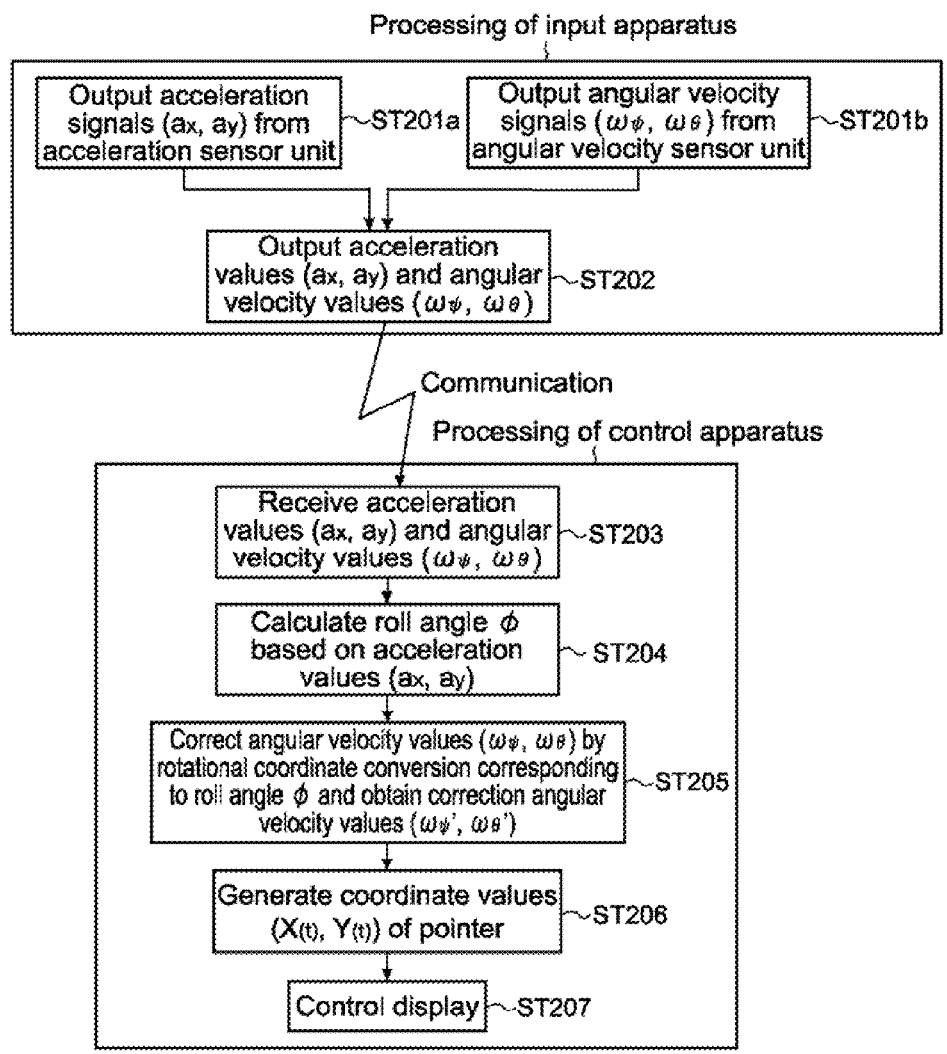
[FIG. 12] A flowchart showing an operation of the control system according to another embodiment.

FIG. 12 is a flowchart showing an operation of the control system 100 according to another embodiment.

The input apparatus 1 has corrected the angular velocity values in the flow shown in FIG. 10, but FIG. 12 is different in that the control apparatus 40 corrects the angular velocity values.

For example, the MPU 19 of the input apparatus 1 outputs, as input information, information on the gravity acceleration component values ($a_x$, $a_y$) obtained from the acceleration sensor unit 16 and the angular velocity values ($\omega_\psi$, $\omega_\theta$) obtained from the angular velocity sensor unit 15 (Step 202).

The MPU 35 of the control apparatus 40 receives the information on the gravity acceleration component values ($a_x$, $a_y$) and the angular velocity values ($\omega_\psi$, $\omega_\theta$) (Step 203). The MPU 35 calculates the roll angle φ based on the gravity acceleration component values ($a_x$, $a_y$) (Step 204). The MPU 35 corrects the angular velocity values ($\omega_\psi$, $\omega_\theta$) by rotational coordinate conversion corresponding to the roll angle φ, to thus obtain the correction angular velocity values ($\omega_\psi'$, $\omega_\theta'$) as the correction values (Step 205). After that, the MPU 35 carries out processing similar to that of Steps 106 and 107 shown in FIG. 10 (Steps 206 and 207).

As described above, it is also possible that the input apparatus 1 transmits the information on the detection values of the detection signals, and the control apparatus 40 carries out the correction processing of the angular velocity values.

In FIG. 12, it is also possible that the input apparatus 1 executes the processing of Steps 201a and 201b, and the control apparatus 40 receives the information on the detection signals and executes the processing of Step 202 and after based on the received information.

Alternatively, the input apparatus 1 may execute the processing of up to Step 204 or 205.

Figure 14:
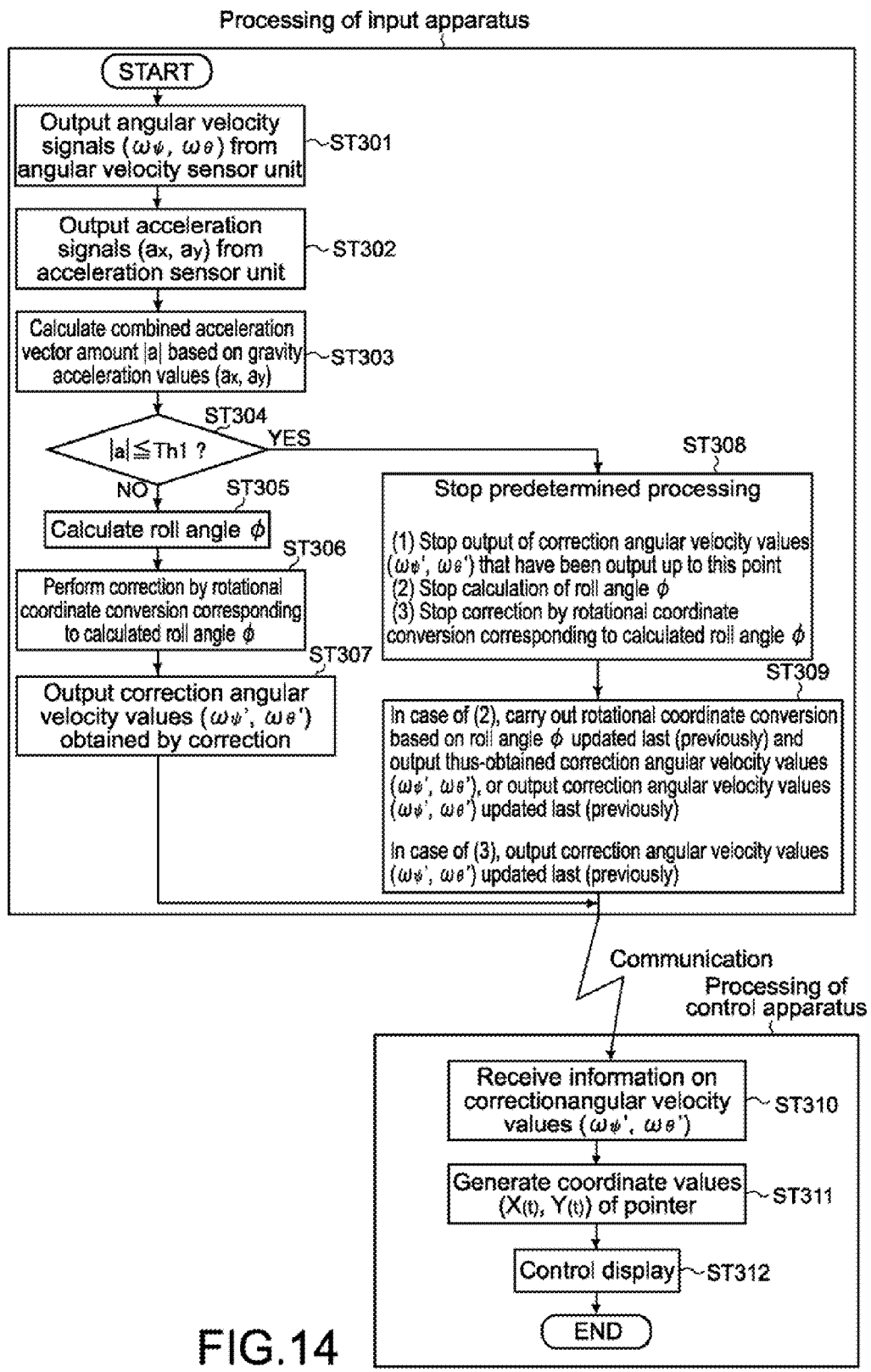
[FIG. 14] A flowchart showing an operation of the control system in a case where the input apparatus is operated while the detection surface is tilted from the vertical surface.

In the above description, the form in which the user operates the input apparatus 1 while the input apparatus 1 is tilted in the roll direction in a state where the detection surface of the sensor unit 17 is substantially in parallel with the absolute vertical surface including the vertical axis has been described. However, a case where the input apparatus 1 is operated while the detection surface is tilted from the vertical surface is also possible. Hereinafter, an operation of the control system 100 in such a case will be described. FIG. 14 is a flowchart showing the operation.

Figure 13A:
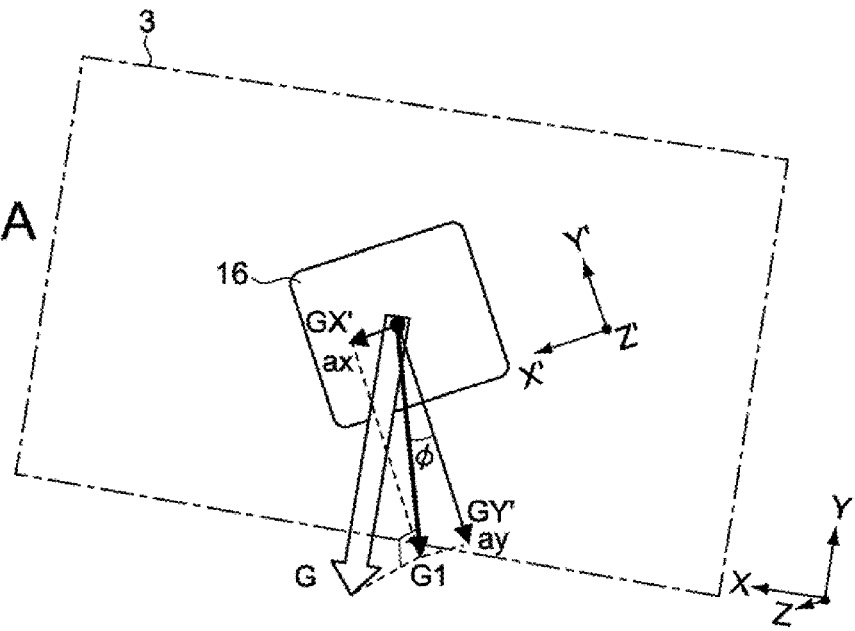
[FIG. 13] (A) is a diagram showing the acceleration sensor unit in a state where a detection surface is tilted from a vertical surface and also tilted in the roll direction. (B) is a diagram of the acceleration sensor unit in the state shown in (A) seen from an absolute Y-Z plane.

FIG. 13A is a diagram showing the acceleration sensor unit 16 that is held still in a state where the detection surface is tilted from the vertical surface and also tilted in the roll direction. The acceleration sensor unit 16 detects the gravity acceleration component values ($a_x$, $a_y$) in the X'- and Y'-axis directions in this state.

Figure 13B:
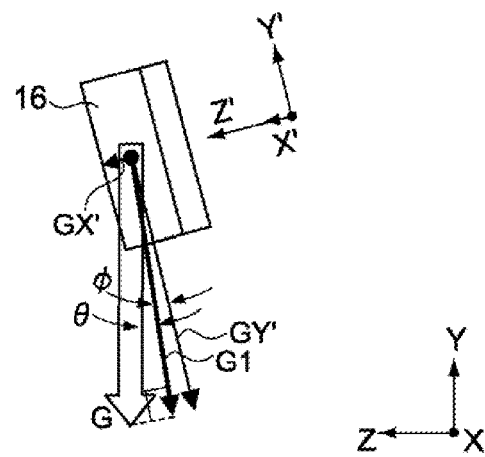

FIG. 13A shows the screen 3 substantially in parallel with the vertical surface as being tilted in the roll direction, and a thick arrow G in the figure indicates a gravity acceleration vector. A vector indicated by an arrow G1 is a combined acceleration vector G1 of gravity acceleration vectors (GX', GY') in the X'- and Y'-axis directions that are detected by the acceleration sensor unit 16. Therefore, the combined acceleration vector G1 is a vector of a component of the gravity acceleration vector G rotated in the pitch direction (θ direction). FIG. 13B is a diagram of the acceleration sensor unit 16 in the state shown in FIG. 13A seen from an absolute Y-Z plane.

Referring to FIG. 14, the MPU 19 of the input apparatus 1 obtains the gravity acceleration component values ($a_x$, $a_y$) and the angular velocities ($\omega_\psi$, $\omega_\theta$) output in Steps 301 and 302. Although descriptions of Steps 301 and 302 in FIG. 14 are different from those of FIG. 10, the processing is practically the same as that of Steps 101a and 101b.

Based on the gravity acceleration component values ($a_x$, $a_y$), the MPU 19 calculates a combined acceleration vector amount $|a|$ (Step 303). The combined acceleration vector amount $|a|$ can be calculated from $[(a_x)^2+(a_y)^2]^{1/2}$. The MPU 19 judges whether the calculated combined acceleration vector amount $|a|$ is equal to or smaller than a threshold value Th1 (Step 304), and when $|a|$ exceeds the threshold value Th1, calculates the roll angle φ (Step 305). The MPU 19 carries out the correction by the rotational coordinate conversion corresponding to the calculated roll angle φ (Step 306), and outputs the correction angular velocity values ($\omega_\psi'$, $\omega_\theta'$) obtained by the correction (Step 307).

When the tilt of the detection surface from the vertical surface is large, that is, when the pitch angle θ is large, the gravity acceleration component values ($a_x$, $a_y$) become small and precision of a calculation result of the roll angle φ drops. Therefore, in this embodiment, in a case where the pitch angle θ increases as the roll angle φ calculated based on the gravity acceleration component values ($a_x$, $a_y$) is buried more into the noise, it becomes difficult to calculate an accurate roll angle φ. Therefore, when $|a|$ is equal to or smaller than the threshold value Th1, the MPU 19 stops predetermined processing as follows (stop means) (Step 308).

The predetermined processing is any one of outputting the correction angular velocity values ($\omega_\psi'$, $\omega_\theta'$), calculating the roll angle, and executing the correction by the rotational coordinate conversion.

When stopping the calculation of the roll angle, the MPU 19 only needs to carry out the rotational coordinate conversion based on the roll angle that has been updated last and stored in the memory, and output the thus-obtained correction angular velocity values ($\omega_\psi'$, $\omega_\theta'$) (Step 309), for example. Alternatively, when stopping the calculation of the roll angle, the MPU 19 only needs to output the correction angular velocity values ($\omega_\psi'$, $\omega_\theta'$) that have been updated last and stored in the memory (Step 309).

When stopping the correction by the rotational coordinate conversion, the MPU 19 only needs to output the correction angular velocity values ($\omega_\psi'$, $\omega_\theta'$) that have been updated last and stored in the memory (Step 309), for example.

When stopping the output of the correction angular velocity values ($\omega_\psi'$, $\omega_\theta'$), it is only necessary to carry out processing such as stopping the movement of the pointer 2, executing control so that display of the pointer 2 is canceled, or moving the pointer 2 to a predetermined position.

The threshold value Th1 only needs to be set appropriately in consideration of noises and the like.

Steps 310 to 312 are the same as Steps 105 to 107 of FIG. 10.

In Step 308, when the combined acceleration vector amount $|a|$ calculated based on the supplied gravity acceleration component values ($a_x$, $a_y$) exceeds the threshold value Th1 after the calculation of the roll angle φ is stopped, the MPU 19 resumes the calculation of the roll angle φ and executes the processing of Step 305 and after.

According to this embodiment, even when the pitch angle θ is large, the MPU 19 stops the output of the correction angular velocity values or outputs the correction angular velocity values that have been updated last, whereby an accurate roll angle φ can be calculated.

In the same manner as in the processing of FIG. 12, a part of the processing executed by the input apparatus 1 regarding the processing of FIG. 14 may be executed by the control apparatus 40. For example, the processing of Steps 303 to 309, the processing of Steps 304 to 309, the processing of Steps 305 to 309, . . . , or the processing of Step 309 may be executed by the control apparatus 40.

Here, there are cases where positive/negative of, for example, the second acceleration value $a_{y'}$ detected in the Y'-axis direction is switched during a period from when the predetermined processing is stopped in Step 308 above to when the predetermined processing is resumed next. The resumption of the predetermined processing means resumption of Steps 305 to 307 when the calculation of the roll angle is stopped, resumption of Steps 306 to 307 when the correction by the rotational coordinate conversion is stopped, and resumption of Step 307 when the output of the correction angular velocity values is stopped.

FIGS. 15A and 15B are diagrams showing states at those times. FIG. 15A shows a position of the acceleration sensor unit 16 at an instant the calculation of the roll angle φ is stopped, and FIG. 15B shows the position of the acceleration sensor unit 16 at an instant the predetermined processing is resumed, for example. At such times, positive/negative of the acceleration value $a_{y'}$ of the gravity acceleration vector GY' in the Y'-axis direction is switched. This is not limited to the Y'-axis direction, and the same holds true also for the X'-axis direction. FIGS. 15A and 15B assume a case where the input apparatus 1 is a pen-type input apparatus and the sensor unit 17 is provided at a tip end portion of that pen. When the user grasps the pen-type input apparatus so as to hold it like a pen, the acceleration sensor unit 16 is positioned so that the detection surface faces downward as shown in FIGS. 15A and 15B.

Figure 16:
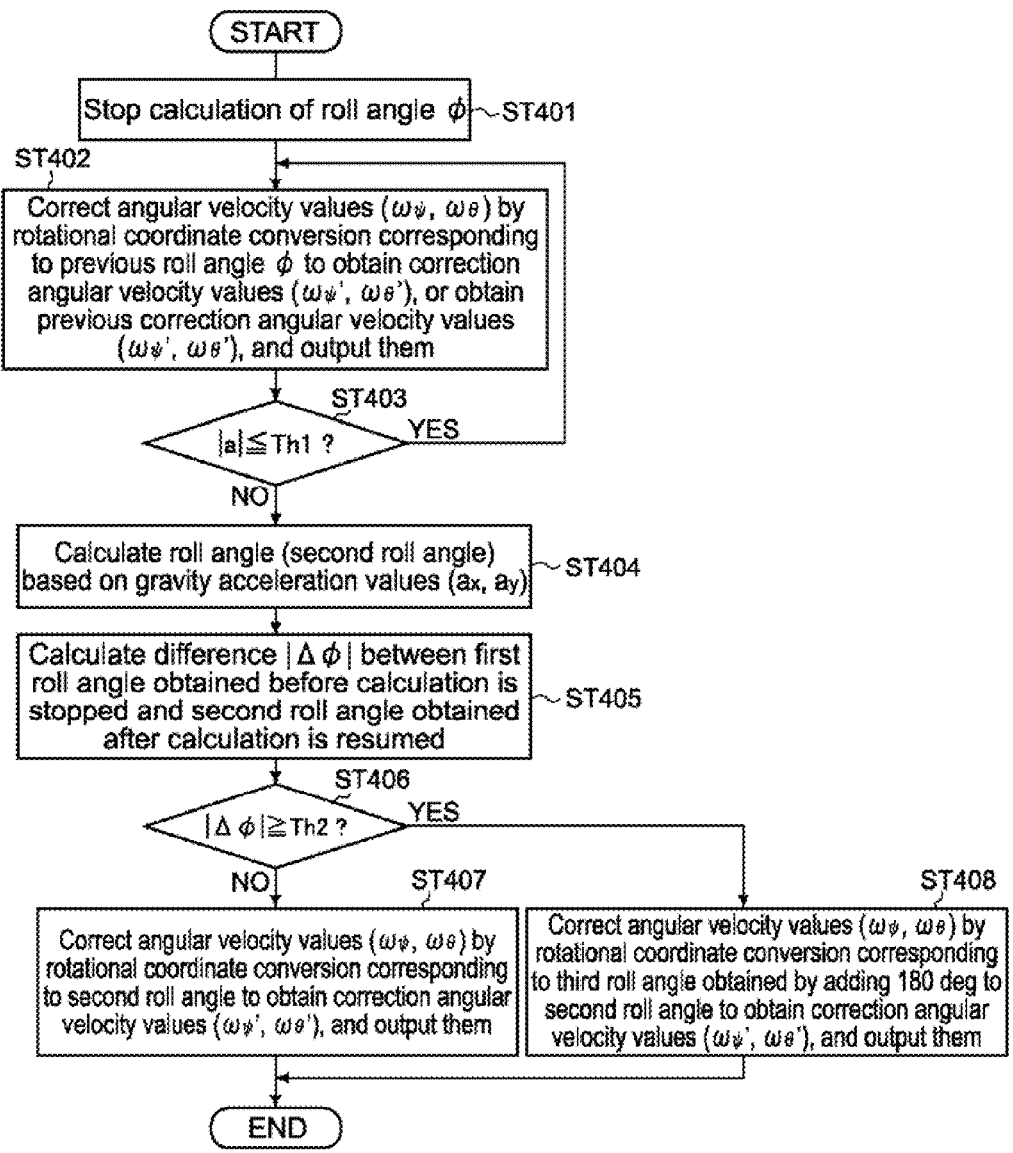
[FIG. 16] A flowchart showing an operation of processing for reducing a calculation error of the roll angle φ in FIG. 15.

When the sign of the acceleration value $a_{y'}$ of the gravity acceleration vector GY' is switched, an error also occurs in calculating the roll angle φ when used as it is. FIG. 16 is a flowchart showing an operation of processing of the input apparatus 1 for avoiding such a phenomenon.

FIG. 16 shows an example where the calculation of the roll angle is stopped out of the stop of the predetermined processing. However, the present embodiments are not limited thereto, and the stop of the correction by the rotational coordinate conversion or the stop of the output of the correction angular velocity values may also be adopted. The same holds true also for processing of FIGS. 17, 49, and 50.

Referring to FIG. 16, the MPU 19 stops the calculation of the roll angle φ under the condition of Step 304 (see FIG. 14) (Step 401). Then, the MPU 19 corrects the angular velocity values ($ω_ψ$, $ω_θ$) by the rotational coordinate conversion corresponding to the previous roll angle φ to thus obtain the correction angular velocity values ($ω_ψ'$, $ω_θ'$), or obtains the previous correction angular velocity values and outputs them (Step 402). When the combined acceleration vector amount |a| exceeds the threshold value Th1 (NO in Step 403), the MPU 19 calculates the roll angle based on the supplied gravity acceleration values ($a_x$, $a_y$).

The MPU 19 calculates a difference between the roll angle obtained when the calculation of the roll angle φ is stopped, that is, the roll angle calculated right before the stop (first roll angle) and the roll angle (calculated in Step 404) obtained right after the resumption of the calculation (second roll angle) (Step 405). When the difference |Δφ| is equal to or larger than a threshold value Th2 (YES in Step 406), the MPU 19 adds 180 deg to the second roll angle as the latest roll angle.

The MPU 19 obtains the correction angular velocity values ($ω_ψ'$, $ω_θ'$) by rotational coordinate conversion corresponding to a third roll angle obtained by adding 180 deg to the second roll angle, and outputs them (Step 407). Thus, in this embodiment, the accuracy of the input apparatus 1 in recognizing the position of the input apparatus 1 is improved, whereby such display that the pointer 2 moves in an appropriate direction becomes possible.

The threshold value Th2 can be set within a range of, for example, 60 deg (=±30 deg) to 90 deg (=±45 deg), though not limited thereto.

In the same manner as in the processing of FIG. 12, a part or all of the processing of FIG. 16 may be executed by the control apparatus 40.

Figure 17:
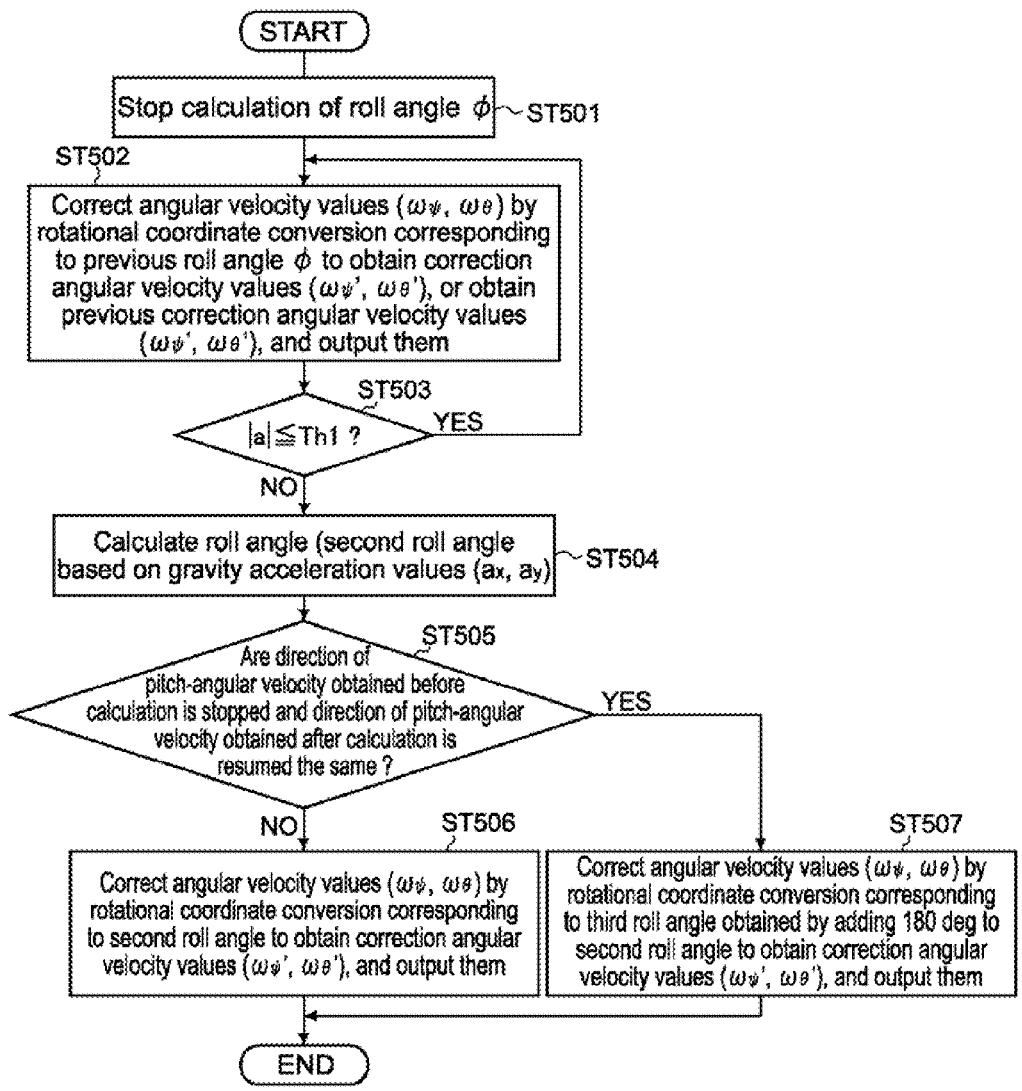
[FIG. 17] A flowchart showing an operation of the processing shown in FIG. 16 according to another embodiment.

FIG. 17 is a flowchart showing an operation of the processing shown in FIG. 16 according to another embodiment.

Processing of Steps 501 to 504 is the same as that of Steps 401 to 404 in FIG. 16. The MPU 19 judges whether a direction of the angular velocity $ω_θ$ in the pitch direction obtained right before the stop of the calculation of the roll angle φ and a direction of the angular velocity $ω_θ$ in the pitch direction obtained right after the start of the calculation are the same (Step 505). In other words, a judgment is made on whether positive/negative of $ω_θ$ is consistent from before the stop of the calculation of the roll angle φ to after start of the calculation. Consistency regarding positive/negative of the angular velocities $ω_ψ$ in the yaw direction may be judged instead of or in addition to that in the pitch direction.

When it is judged YES in Step 505, it can be determined that the direction of GY' has changed as shown in FIGS. 15A and 15B since the direction of the angular velocities in the pitch direction is continuous. In this case, the MPU 19 obtains the correction angular velocity values ($ω_ψ'$, $ω_θ'$) by the rotational coordinate conversion corresponding to the third roll angle obtained by adding 180 deg to the second roll angle, and outputs them (Step 507).

By thus confirming the continuity of the angular velocities $ω_θ$ in the pitch direction (or angular velocities $ω_ψ$ in the yaw direction), accuracy of the input apparatus 1 in recognizing the position of the input apparatus 1 is additionally improved.

In the same manner as in the processing of FIG. 12, a part or all of the processing of FIG. 17 may be executed by the control apparatus 40.

As still another embodiment of the processing of FIGS. 16 and 17, it is also possible to judge whether a difference between a combined angular velocity vector amount of the two angular velocities obtained when the calculation of the roll angle is stopped (first combined angular velocity vector amount) and the combined angular velocity vector amount obtained when the calculation of the roll angle is resumed (second combined angular velocity vector amount) is equal to or larger than a threshold value. The combined angular velocity vector amount can be calculated from $[(ω_ψ)^2+(ω_θ)^2]^{1/2}$. When the difference between the first combined angular velocity vector amount and the second combined angular velocity vector amount is large, it is determined that a positional change is large. When the difference is judged to be equal to or larger than the threshold value, the MPU 19 executes processing similar to that of Steps 408 and 507.

The processing of the input apparatus 1 as described above may also be executed by the control apparatus 40.

[Suppression of Fluctuation of Roll Angle φ]

Next, descriptions will be given on four embodiments for suppressing a fluctuation of the roll angle φ that is caused when the user actually moves and operates the input apparatus 1 after the effect of the gravity acceleration components generated by the tilt of the input apparatus 1 in the roll direction is removed as described above.

Figure 18:
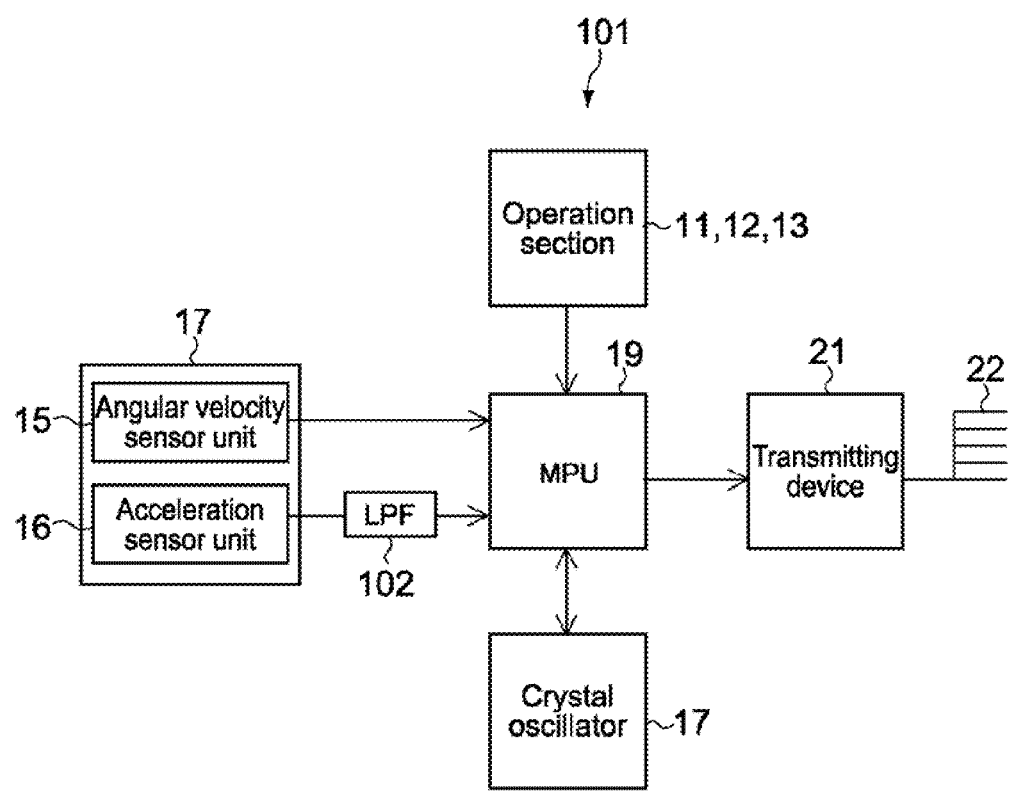
[FIG. 18] A block diagram showing an input apparatus according to a first embodiment of suppressing a fluctuation of the roll angle caused when, after an effect of gravity acceleration components due to the tilt of the input apparatus in the roll direction is removed, the user actually moves and operates the input apparatus.

FIG. 18 is a block diagram showing an input apparatus according to one of those embodiments. An input apparatus 101 includes a lowpass filter (LPF) 102 to which at least one of the acceleration signals in the X'- and Y'-axis directions obtained by the acceleration sensor unit 16 is input. The LPF 102 removes impulse-like components within the acceleration signal.

Figure 19A:
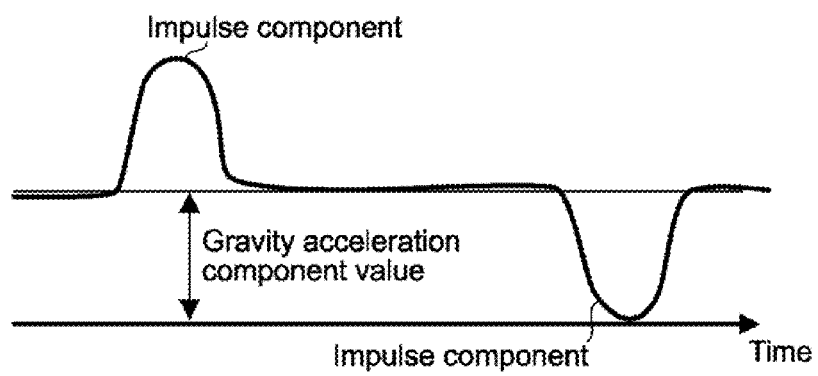
[FIG. 19] (A) is a graph showing an acceleration signal in an X'- or Y'-axis direction before being passed through an LPF. (B) is a graph showing the acceleration signal after being passed through the LPF.
Figure 19B:
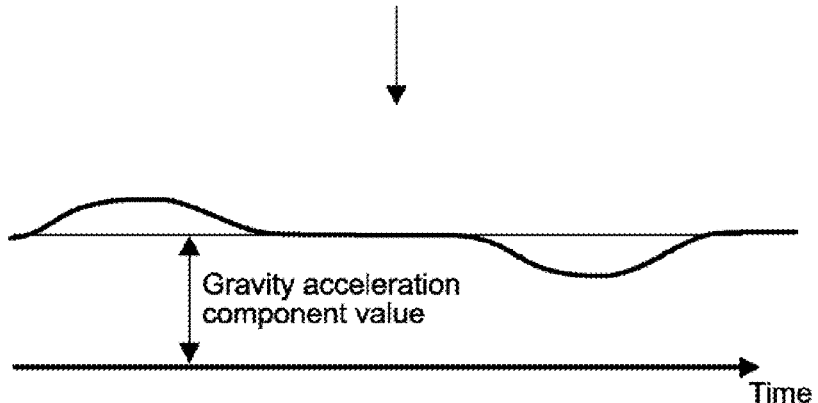

FIG. 19A shows the acceleration signal in the X'- or Y'-axis direction obtained before being passed through the LPF 102, and FIG. 19B shows the acceleration signal obtained after being passed through the LPF 102. The impulse-like components are acceleration signals detected when the user moves the input apparatus 101. DC offset components in the figures are gravity acceleration component values that pass through the LPF 102.

Typically, a waveform of the impulse is ten to several-ten Hz. Thus, the LPF 102 has a cutoff frequency of several Hz. If the cutoff frequency is too low, a delay of $\phi$ caused by a phase delay is transferred to the user as awkwardness in operation. Therefore, it is only necessary that a practical lower limit be defined.

As described above, by the LPF 102 removing the impulse-like components, the effect of the accelerations generated when the user moves the input apparatus 101 can be removed at the time of calculating the roll angle $\phi$.

Figure 20:
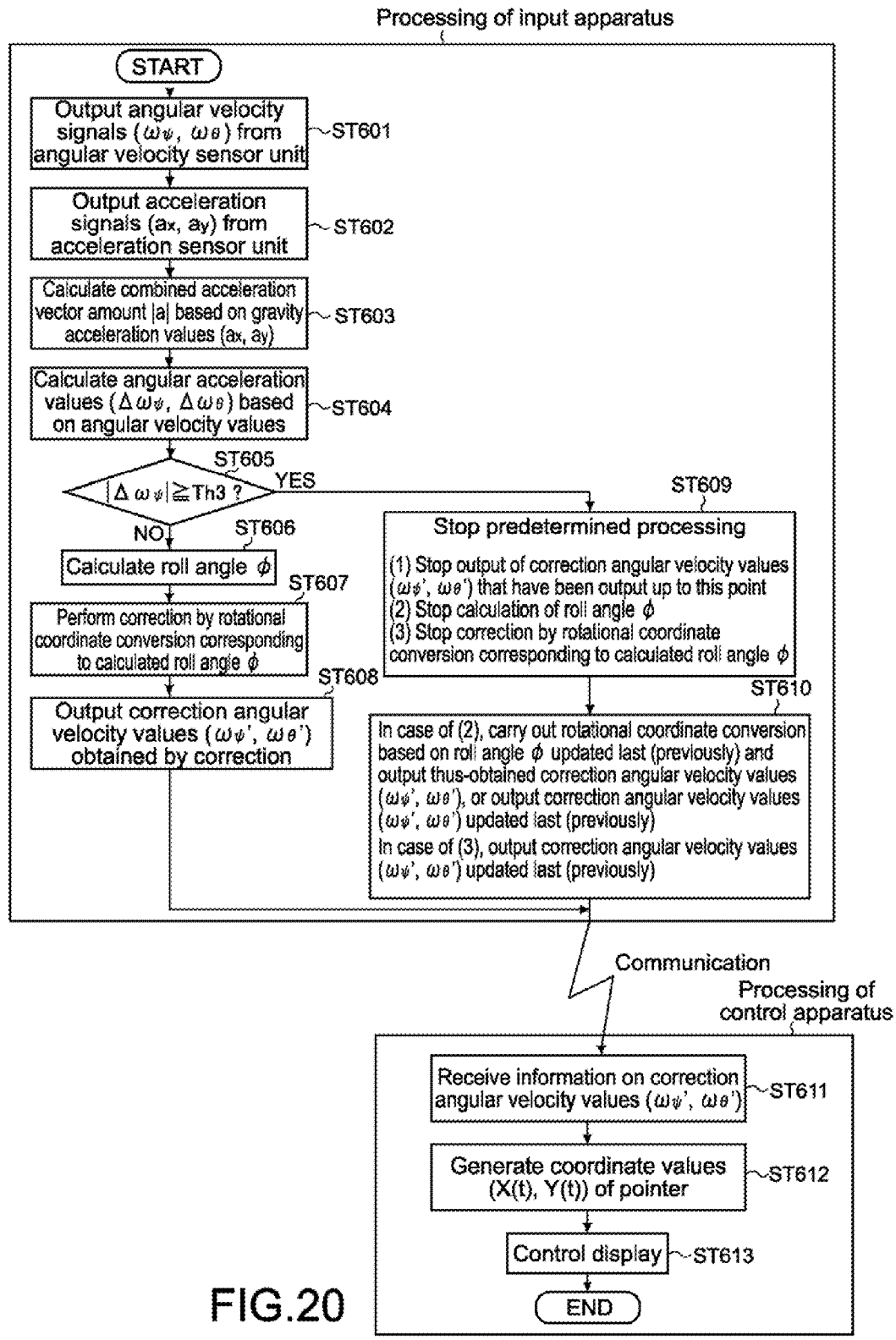
[FIG. 20] A flowchart showing an operation of a second embodiment of suppressing the fluctuation of the roll angle, in which angular acceleration values are monitored at a time of calculating the roll angle φ.

As a second embodiment for suppressing a fluctuation of the roll angle $\phi$, a method of monitoring angular acceleration values at the time of calculating the roll angle $\phi$ is conceivable. FIG. 20 is a flowchart showing an operation thereof.

Steps 601, 602, and 603 are the same as Steps 301, 302, and 303 shown in FIG. 14. The MPU 19 calculates angular acceleration values ($\Delta\omega_\psi$, $\Delta\omega_\theta$) by a differential operation based on the angular velocity values ($\omega_\psi$, $\omega_\theta$) supplied (Step 604).

The MPU 19 judges whether an angular acceleration value $|\Delta\omega_\psi|$ in the yaw direction, for example, among the calculated angular acceleration values in both directions is equal to or larger than a threshold value Th3 (Step 605). When equal to or larger than the threshold value Th3, the MPU 19 stops the predetermined processing (Step 609). The reason for performing the processing as described above is as follows.

When the user operates the input apparatus 1 naturally, an angular acceleration is generated in the input apparatus 1. The roll angle $\phi$ is calculated using Equation (1) above. Further, the angular velocity value ($\omega_\theta$, $\omega_\psi$) about the X or Y axis is calculated based on the acceleration values ($a_x$, $a_y$) using Equation (4) to be described later. Even when an acceleration is generated in the input apparatus 1 when the user moves the input apparatus 1, it is possible to calculate a desired first or second acceleration value for suppressing a calculation error of the roll angle $\phi$ that is caused accordingly within an allowable range by using Equation (4). In other words, it is possible to suppress the calculation error of the roll angle $\phi$ within the allowable range by setting the threshold value Th3 of the angular accelerations.

Hereinafter, descriptions will be given on the threshold value Th3 of the angular accelerations.

Consideration will be given on, for example, the threshold value Th3 in a case where, even when the input apparatus 1 is tilted $\theta_1$=60 deg in the pitch direction when the user moves the input apparatus 1, an error of the roll angle $\phi$ resulting from misrecognition of the MPU 19 in the gravity direction that is caused by an inertial force generated by the tilt is wished to be suppressed to 10 deg or lower.

In the state where the input apparatus 1 is tilted 60 deg in the pitch direction, $a_y$=1 G*cos 60°=0.5 G is established. Therefore, with $\phi$=10 deg, Equation (1) is expressed as 10°=arctan($a_x$/0.5 G)

with the result of $a_x$=0.09 G being obtained. Therefore, it is only necessary that minimum $|\Delta\omega_\psi|$ with which $a_x$ becomes 0.09 G be calculated.

Thus, considering a relationship between the acceleration and the angular acceleration generated when the user swings an arm, the larger the radius by which the user swings the input apparatus 1 is, the smaller the angular acceleration $|\Delta\omega_\psi|$ with respect to the same acceleration $a_x$ becomes. It is presumed that a maximum radius can be obtained when the entire arm is swung with the shoulder as a rotational center. Here, when a length of the arm is represented by $L_{arm}$, $\Delta\omega_\psi$ can be expressed by Equation (4) below.

$$|\Delta\omega_\psi|=a_x/L_{arm} \qquad (4)$$

As a typical example, since a length l of an arc having a center angle $\theta$ in a circle with a radius r is r$\theta$, Equation (4) is established.

When $a_x$=0.09 G=0.09*9.8 (m/s) and $L_{arm}$=0.8 m (presumably a user with a long arm) are substituted in Equation (4), $\Delta\omega x$=1.1 rad/s²=63 deg/s² is established. Specifically, by the MPU 19 stopping, as the processing of stopping the predetermined processing, the update of $\phi$ when an angular acceleration satisfying $|\Delta\omega_\psi|$>63°/s² is detected, for example, it becomes possible to suppress the calculation error of the roll angle $\phi$ to 10 deg or less even when the user tilts the input apparatus 1 60 deg at most in the pitch direction. A setting range of the calculation error of the roll angle $\phi$ is not limited to 10 deg or less, and can be set as appropriate.

When the user operates the input apparatus 1 with an elbow as the rotational center or a wrist as the rotational center, $a_x$ in the case of the angular acceleration becomes an additionally smaller value. Therefore, an error of the angle in the gravity direction caused by the effect of the inertial force is a value that falls below 10°, thus being directed toward a smaller error.

Processing of Steps 606 to 608 and 610 to 613 is similar to that of Steps 305 to 307 and 309 to 312 in FIG. 14.

Although reference has been made to the angular velocity in the yaw direction in the above descriptions, the same holds true for the angular velocity in the pitch direction. Therefore, it is also possible to add a step of judging whether $|\Delta\omega_\theta|$ is equal to or larger than a threshold value after Step 605, and stop the predetermined processing when judged as being equal to or larger than the threshold value.

Incidentally, it is also possible for the MPU 19 to stop the calculation of the roll angle and carry out the processing of Steps 609 and 610 when at least one of the angular velocities in the yaw and pitch directions is equal to or larger than the threshold value. It is known from an experiment that when the user operates the pointer 2 at a fairly high speed (at high angular velocity) like moving the pointer 2 from an end of the screen 3 to the other end in 0.1 to 0.2 sec, not executing the predetermined processing gives less awkwardness as a sense of human beings. When the user roughly operates the pointer on the screen without any delicate operations as described above, an operation that matches the intuition of the user becomes possible by stopping the predetermined processing. For example, it is only necessary that the predetermined processing be stopped when the output value of the angular velocity sensor 151 or 152 is −200 or less or +200 or more when split to −512 to +512. However, the values are not limited thereto.

As a third embodiment for suppressing the fluctuation of the roll angle φ, a method in which a threshold value is set for the accelerations detected by the acceleration sensor unit 16 is conceivable. For example, when at least one of the detected acceleration values ($a_x$, $a_y$) in the X′- and Y′-axis directions is equal to or larger than the threshold value, the MPU 19 stops the predetermined processing and resumes the predetermined processing after the acceleration value drops below the threshold value. Alternatively, the processing may be such that, merely because a detection voltage is saturated when the acceleration value becomes a certain value or more, update of φ is stopped automatically at that time.

In the same manner as in the processing of FIG. 12, the processing of Steps 603 to 610, the processing of Steps 604 to 610, the processing of Steps 605 to 610, . . . , or the processing of Step 610 shown in FIG. 20 may be executed by the control apparatus 40.

Figure 34:
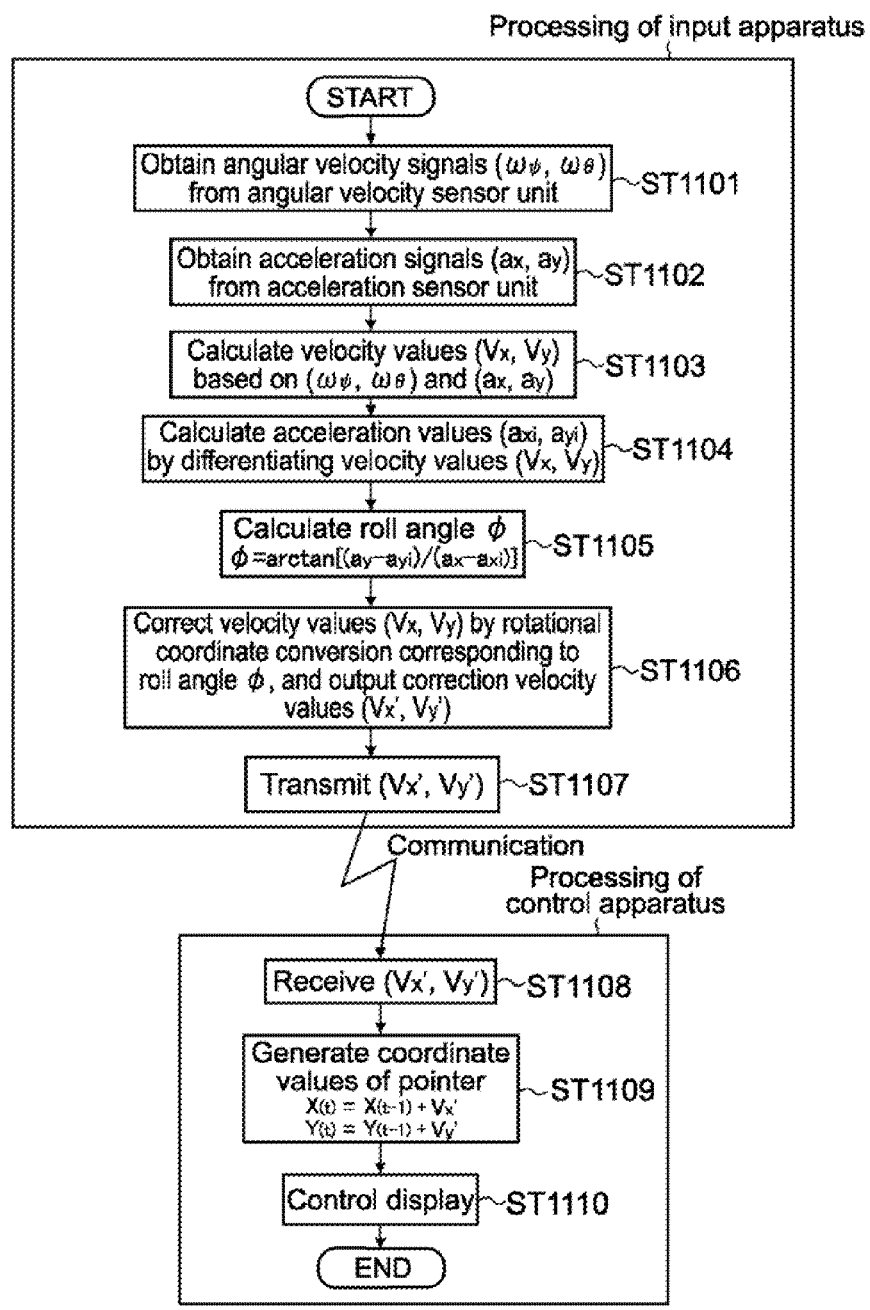
[FIG. 34] A flowchart showing an operation of the control system according to an embodiment.

Next, a fourth embodiment for suppressing the fluctuation of the roll angle φ will be described. FIG. 34 is a flowchart showing an operation thereof.

The power of the input apparatus 1 is turned on. For example, the user turns on the power supply switch or the like provided to the input apparatus 1 or the control apparatus 40 to turn on the power of the input apparatus 1. Upon turning on the power, biaxial angular velocity signals are output from the angular velocity sensor unit 15. The MPU 19 obtains the first angular velocity value $\omega_\psi$ and the angular velocity value $\omega_\theta$ from the biaxial angular velocity signals (Step 1101).

Further, upon turning on the power of the input apparatus 1, biaxial acceleration signals are output from the acceleration sensor unit 16. The MPU 19 obtains the first acceleration value $a_x$ and the second acceleration value $a_y$ from the biaxial acceleration signals (Step 1102). The signals of the acceleration values are signals corresponding to the position of the input apparatus 1 at a point when the power is turned on (hereinafter, referred to as initial position).

It should be noted that Steps 1101 and 1102 are typically carried out in sync. However, the MPU 19 may execute Step 1102 after executing Step 1101, or execute Step 1101 after executing Step 1102. The same holds true for FIGS. 10, 12, 14, 20, 22, 43 to 45, 48, 51, 52, and 54.

There are cases where the initial position is the reference position. However, a position at which the entire amount of the gravity acceleration is detected in the X-axis direction, that is, a position at which the output of the first acceleration sensor 161 is the acceleration value corresponding to the gravity acceleration and the output of the second acceleration sensor 162 is 0 is also possible. As a matter of course, as the initial position, a position tilted in the roll direction as shown in FIG. 9B is also possible.

Based on the acceleration values ($a_x$, $a_y$) and the angular velocity values ($\omega_\psi$, $\omega_\theta$), the MPU 19 calculates velocity values ($V_x$, $V_y$) by an integration operation (Step 1103) (calculation means). The calculated velocity values are obtained by an operation that uses the angular velocity values as will be descried later. Thus, velocity values that practically match the movement of the input apparatus 1 can be obtained. The calculation of the velocity values will be described later in detail.

The MPU 19 subjects the calculated velocity values ($V_x$, $V_y$) to a differential operation (Step 1104). Accordingly, operational acceleration values ($a_{xi}$, $a_{yi}$) are obtained. In the differential operation, a tilt between every two velocity value samples only needs to be calculated, for example.

Based on the gravity acceleration component values ($a_x$, $a_y$), the MPU 19 calculates the roll angle φ using Equation (1′) below.

$$\phi = \arctan[(a_x - a_{xi})/(a_y - a_{yi})] \quad (1')$$

It should be noted that values of the acceleration values ($a_x$, $a_y$) and the operational acceleration values ($a_{xi}$, $a_{yi}$) in Equation (1′) are calculated as an absolute value.

If the velocity values ($V_x$, $V_y$) are 0 in the calculation of Equation (1′), φ is practically calculated based only on the gravity acceleration component values ($a_x$, $a_y$).

The generation of the velocity values ($V_x$, $V_y$) means that the user is moving the input apparatus 1, so the operational acceleration values ($a_{xi}$, $a_{yi}$) are generated accordingly. In this case, in Equation (1′), the roll angle φ is calculated after the operational acceleration values generated by the movement of the input apparatus 1, that is, accurate inertial acceleration values are subtracted from the gravity acceleration component values.

The MPU 19 corrects the velocity values ($V_x$, $V_y$) by the rotational coordinate conversion corresponding to the calculated roll angle φ, to thus obtain correction velocity values (first and second correction velocity values ($V_x'$, $V_y'$)) as correction values (Step 1106). In other words, the MPU 19 corrects the velocity values ($V_x$, $V_y$) using Equation (5) of the rotational coordinate conversion shown in FIG. 35, and outputs them. The MPU 19 transmits information on the correction velocity values ($V_x'$, $V_y'$) to the control apparatus 40 by the transmitting device 21 (Step 1107).

The MPU 35 of the control apparatus 40 receives the information on the correction velocity values ($V_x'$, $V_y'$) (Step 1108). The input apparatus 1 transmits the correction velocity values ($V_x'$, $V_y'$) every predetermined clocks, that is, per unit time, so the control apparatus 40 can receive this and obtain change amounts in the X- and Y-axis directions per unit time. By Equations (6) and (7) below, the MPU 35 generates coordinate values (X(t), Y(t)) of the pointer 2 on the screen 3 that correspond to the obtained change amounts in the X- and Y-axis directions per unit time (Step 1109). Due to the generation of the coordinate values, the MPU 35 controls display so that the pointer 2 moves on the screen 3 (Step 1110) (coordinate information generation means).

$$X(t) = X(t-1) + V_x \quad (6)$$

$$Y(t) = Y(t-1) + V_y \quad (7)$$

In this embodiment, the roll angle φ is calculated after the operational acceleration values ($a_{xi}$, $a_{yi}$) are subtracted from the gravity acceleration component values ($a_x$, $a_y$), respectively. In other words, the roll angle φ that is practically based only on the gravity acceleration component values ($a_x$, $a_y$) is calculated. As a result, the correction velocity values ($V_x'$, $V_y'$) that match the movement of the input apparatus can thus be obtained, and the user can move the pointer 2 without feeling awkward.

Further, because two acceleration sensors 161 and 162 and two angular velocity sensors 151 and 152 are used in this embodiment, the calculation amount can be reduced and costs can also be reduced as compared to the case of using triaxial acceleration sensors and triaxial angular velocity sensors.

Figure 36:
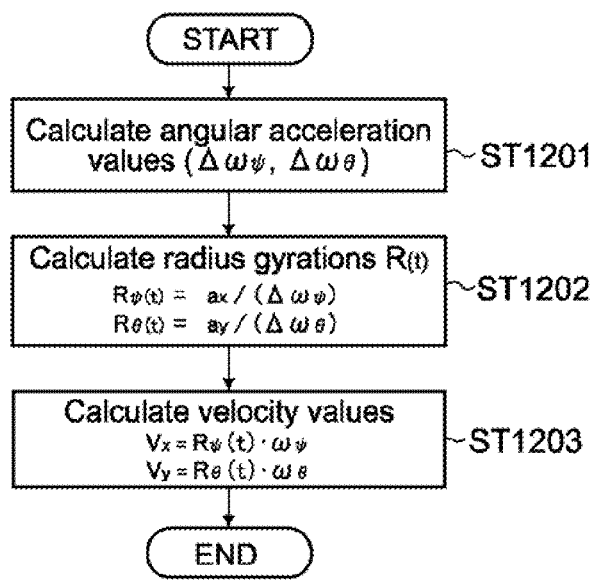
[FIG. 36] A flowchart showing an operation of the input apparatus regarding a method of calculating velocity values, according to the embodiment.
Figure 37:
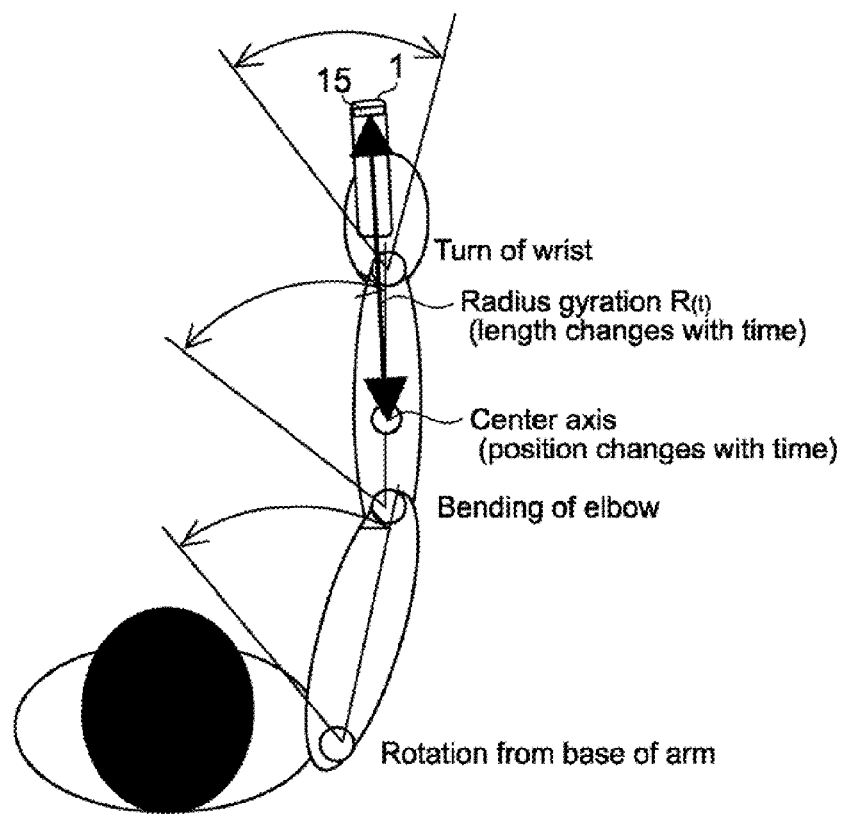
[FIG. 37] A diagram for illustrating a basic idea of the method of calculating the velocity values.

Next, a calculation method of the velocity values ($V_x$, $V_y$) in Step 1103 will be described. FIG. 36 is a flowchart showing an operation of the input apparatus 1. FIG. 37 is a diagram for illustrating a basic idea of the velocity value calculation method.

FIG. 37 is a top view of the user operating the input apparatus 1 by swinging it in, for example, a lateral direction (yaw direction). As shown in FIG. 37, when the user operates the input apparatus 1 naturally, an operation is made by using at least one of a turn of a wrist, a bending of an elbow, and a rotation from a base of an arm. Therefore, a comparison between the movement of the input apparatus 1 and the rotations of a wrist, elbow, and base of an arm shows that there exist relationships of 1 and 2 below.

1. The angular velocity value $\omega_\psi$ about the Y axis of a portion of the input apparatus 1 at which the acceleration sensor unit 16 is disposed (hereinafter, tip end portion) is a combined value of an angular velocity obtained by the turn of a wrist, an angular velocity obtained by the bending of an elbow, and an angular velocity obtained by the rotation from a base of an arm.

2. The velocity value $V_x$ in the yaw direction at the tip end portion of the input apparatus 1 is a combined value of values obtained by respectively multiplying the angular velocities of the wrist, elbow, and base of an arm by a distance between the wrist and the tip end portion, a distance between the elbow and the tip end portion, and a distance between the base on an arm and the tip end portion.

Here, regarding a rotational movement of the input apparatus 1 in a minute time, the input apparatus 1 can be considered to be rotating about a center axis (first center axis or second center axis) parallel to the Y axis and whose position changes with time. Assuming that a distance between the center axis whose position changes with time and the tip end portion of the input apparatus 1 is a radius gyration $R_\psi(t)$ about the Y axis (first radius gyration or second radius gyration), the relationship between the velocity value $V_x$ and the angular velocity value $\omega_\psi$ at the tip end portion of the input apparatus 1 can be expressed by Equation (8) below. In other words, the velocity value $V_x$ in the yaw direction becomes a value obtained by multiplying the angular velocity value $\omega_\psi$ about the Y axis by the distance $R_\psi(t)$ between the center axis and the tip end portion.

It should be noted that in this embodiment, the acceleration sensor unit 16 and the angular velocity sensor unit 15 are provided integrally on the circuit board 25 of the sensor unit 17. Therefore, the radius gyration R(t) becomes a distance from the center axis to the sensor unit 17. However, when the acceleration sensor unit 16 and the angular velocity sensor unit 15 are provided apart from each other inside the casing 10, the distance from the center axis to the acceleration sensor unit 16 becomes the radius gyration R(t) as described above.

$$V_x = R_\psi(t) * \omega_\psi \tag{8}$$

As shown in Equation (8), the relationship between the velocity value and the angular velocity value at the tip end portion of the input apparatus 1 is a proportional relationship, that is, a correlation with R(t) as a proportional constant.

Equation (8) above is modified to obtain Equation (9).

$$R_\psi(t) = V_x/\omega_\psi \tag{9}$$

The right-hand side of Equation (9) is a velocity dimension. Even when the velocity value and the angular velocity value represented on the right-hand side of Equation (9) are differentiated to obtain a dimension of the acceleration or acceleration time change rate, the correlation is not lost. Similarly, even when the velocity value and the angular velocity value are integrated to obtain a displacement dimension, the correlation is not lost.

Therefore, with the velocity and the angular velocity represented on the right-hand side of Equation (9) as a dimension of the displacement, acceleration, and acceleration time change rate, Equations (10), (11), and (12) below can be obtained.

$$R_\psi(t) = x/\psi \tag{10}$$

$$R_\psi(t) = a_x/\Delta\omega_\psi \tag{11}$$

$$R_\psi(t) = \Delta a_x/\Delta(\Delta\omega_\psi) \tag{12}$$

Focusing on Equation (11) out of Equations (9), (10), (11), and (12) above, for example, it can be seen that the radius gyration $R_\psi(t)$ can be obtained if the acceleration value $a_x$ and the angular acceleration value $\Delta\omega_\psi$ are known. As described above, the first acceleration sensor 161 detects the acceleration value $a_x$ in the yaw direction, and the angular velocity sensor 152 detects the angular velocity value $\omega_\psi$ about the Y axis. Therefore, if the angular velocity value $\omega_\psi$ about the Y axis is differentiated to thus calculate the angular acceleration value $\Delta\omega_\psi$ about the Y axis, the radius gyration $R_\psi(t)$ about the Y axis can be obtained.

If the radius gyration $R_\psi(t)$ about the Y axis is known, the velocity value $V_x$ of the input apparatus 1 in the X-axis direction can be obtained by multiplying the radius gyration $R_\psi(t)$ by the angular velocity value $\omega_\psi$ about the Y axis detected by the angular velocity sensor 152 (see Equation (8)). Specifically, a rotational operation amount itself of the user is converted into a linear velocity value in the X-axis direction, thus obtaining a velocity value that matches an intuition of the user. Therefore, because the movement of the pointer 2 becomes a natural movement with respect to the movement of the input apparatus 1, operability of the input apparatus for the user is improved.

This velocity value calculation method can also be applied in a case where the user operates the input apparatus 1 by swinging it in the vertical direction (pitch direction).

In FIG. 36, an example where Equation (11) is used will be described. Referring to FIG. 36, by performing the differential operation on the angular velocity values $(\omega_\psi, \omega_\theta)$ obtained in Step 1101, the MPU 19 of the input apparatus 1 calculates the angular acceleration values $(\Delta\omega_\psi, \Delta\omega_\theta)$ (Step 1201).

Using the acceleration values $(a_x, a_y)$ obtained in Step 1102 and the angular acceleration values $(\Delta\omega_\psi, \Delta\omega_\theta)$, the MPU 19 calculates the radius gyrations $(R_\psi(t), R_\theta(t))$ about the Y axis and the X axis using Equations (11) and (13) (Step 1202).

$$R_\psi(t) = a_x/\Delta\omega_\psi \tag{11}$$

$$R_\theta(t) = a_y/\Delta\omega_\theta \tag{13}$$

After the radius gyrations are calculated, the velocity values $(V_x, V_y)$ are calculated using Equations (8) and (14) (Step 1203).

$$V_x = R_\psi(t) * \omega_\psi \tag{8}$$

$$V_y = R_\theta(t) * \omega_\theta \tag{14}$$

The rotational operation amounts themselves of the user with respect to the input apparatus 1 are thus converted into the linear velocity values in the X- and Y-axis directions, resulting in the velocity values that match the intuition of the user.

Further, by using the acceleration values $(a_x, a_y)$ detected by the acceleration sensor unit 16 as they are, the calculation amount can be reduced, and power consumption of the input apparatus 1 can be reduced.

The MPU 19 only needs to obtain $(a_x, a_y)$ from the acceleration sensor unit 16 every predetermined clocks, and calculate the velocity values $(V_x, V_y)$ in sync therewith, for example. Alternatively, the MPU 19 may calculate the velocity values ($V_x$, $V_y$) once every time a plurality of acceleration values ($a_x$, $a_y$) are sampled. The same holds true for FIGS. 38, 39, and 40.

Further, in the processing of FIG. 34, the MPU 19 may calculate the roll angle $\phi$ in sync with the calculation of the velocity values ($V_x$, $V_y$), or calculate the roll angle $\phi$ once every time a plurality of velocity values ($V_x$, $V_y$) are calculated. The same holds true for FIGS. 44, 45, 48, and 49 to 51 that are to be described later.

Figure 38:
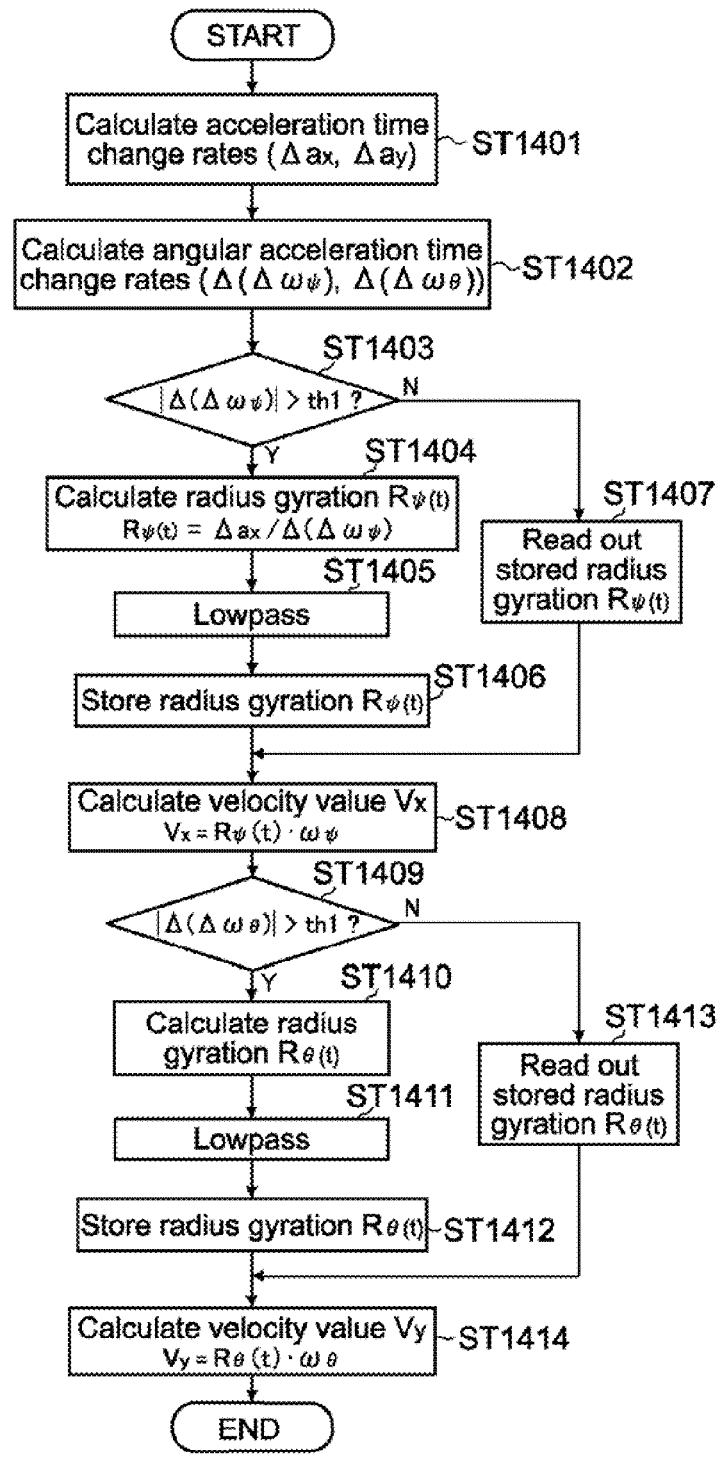
[FIG. 38] A flowchart showing an operation of the input apparatus for calculating the velocity values using radius gyrations according to another embodiment.

Next, another embodiment of calculating the velocity values ($V_x$, $V_y$) using the radius gyrations as in FIG. 36 will be described. FIG. 38 is a flowchart showing an operation of the input apparatus 1. In FIG. 38, an example where Equation (12) above is used will be described.

Referring to FIG. 38, the MPU 19 of the input apparatus 1 carries out the differential operation on the obtained acceleration values ($a_x$, $a_y$). Accordingly, acceleration time change rates ($\Delta a_x$, $\Delta a_y$) are calculated (Step 1401). Similarly, the MPU 19 carries out a second-order differential operation on the obtained angular velocity values ($\omega_\psi$, $\omega_\theta$) to calculate angular acceleration time change rates ($\Delta(\Delta\omega_\psi)$), $\Delta(\Delta\omega_\theta)$) (Step 1402).

Upon calculating the angular acceleration time change rates, the MPU 19 judges whether an absolute value of the angular acceleration time change rate $|\Delta(\Delta\omega_\psi)|$ $|\Delta(\Delta\omega_\psi)|$ about the Y axis exceeds a threshold value th1 (Step 1403). When $|\Delta(\Delta\omega_\theta)|$ above exceeds the threshold value th1, the MPU 19 calculates the radius gyration $R_\psi(t)$ about the Y axis by dividing the acceleration time change rate $\Delta a_x$ in the X-axis direction by the angular acceleration time change rate $\Delta(\Delta\omega_\psi)$ about the Y axis (Step 1404). In other words, a ratio of the acceleration time change rate $\Delta a_x$ in the X-axis direction to the angular acceleration time change rate $\Delta(\Delta\omega_\psi)$ about the Y axis is calculated as the radius gyration $R_\psi(t)$ (Equation (12)). The threshold value th1 of $|\Delta(\Delta\omega_\psi)|$ can be set as appropriate.

A signal of the radius gyration $R_\psi(t)$ is passed through a lowpass filter, for example (Step 1405). Information on the radius gyration $R_\psi(t)$ from which noises of a high-frequency range have been removed by the lowpass filter is stored in the memory (Step 1406). The memory updates the signal of the radius gyration $R_\psi(t)$ every predetermined clocks and stores it.

By multiplying the radius gyration $R_\psi(t)$ by the angular velocity value $\omega_\psi$ about the Y axis, the MPU 19 of the input apparatus 1 calculates the velocity value $V_x$ in the X-axis direction (Step 1408).

On the other hand, when $|\Delta(\Delta\omega_\psi)|$ above is equal to or smaller than the threshold value th1, the MPU 19 reads out the radius gyration $R_\psi(t)$ stored in the memory (Step 1407). By multiplying the read-out radius gyration $R_\psi(t)$ by the angular velocity value $\omega_\psi$ about the Y axis, the velocity value $V_x$ in the X-axis direction is calculated (Step 1408).

There are the following two reasons for carrying out the processing of Steps 1401 to 1408.

One is to obtain the radius gyration $R_\psi(t)$ of Equation (12) above to thus obtain a linear velocity that matches the intuition of the user.

Second is to remove the gravitational effect as described above in the process of calculating the velocity values ($V_x$, $V_y$). When the input apparatus 1 is tilted in the roll direction or the pitch direction from its reference position, detection signals different from the actual movement of the input apparatus 1 are inadvertently output due to the gravitational effect. When the input apparatus 1 is tilted in the pitch direction, for example, gravity acceleration component values are output from the acceleration sensor 162. Therefore, when the effect of the gravity acceleration component values is not removed, the movement of the pointer 2 becomes a movement that does not match a sense of the user.

Figure 39:
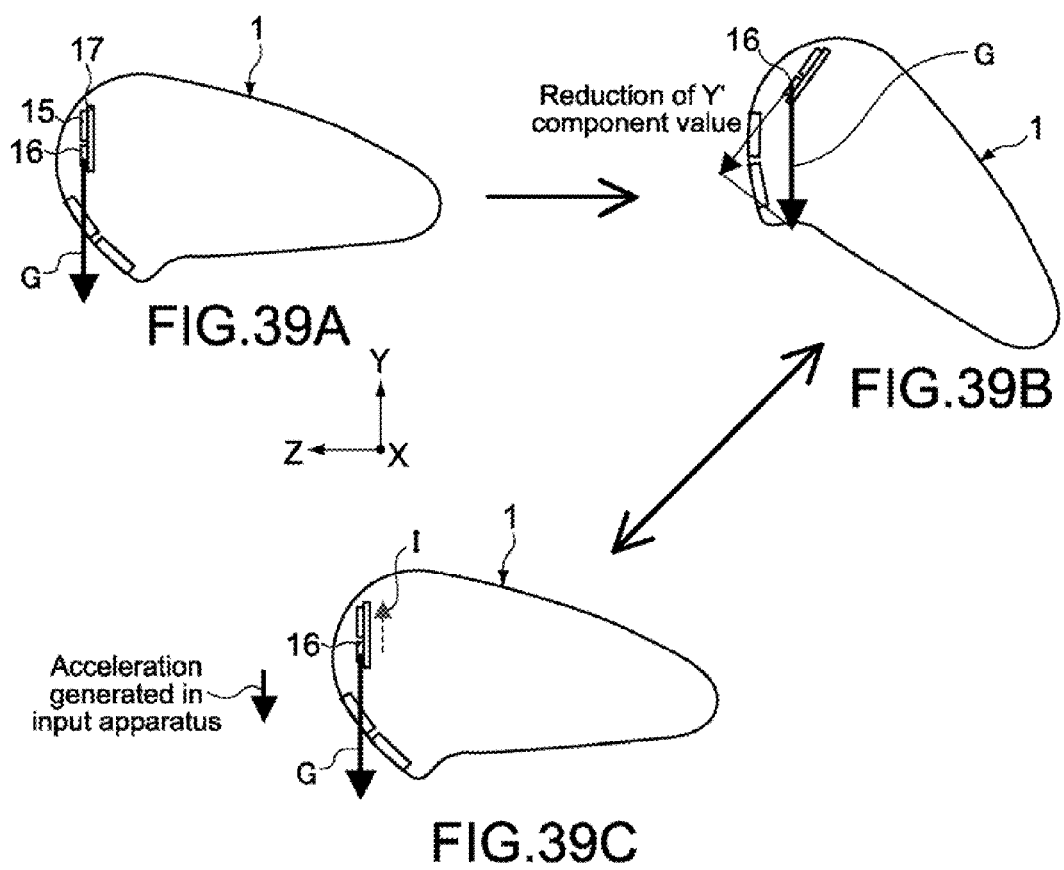
[FIG. 39] Diagrams for illustrating the effect of the gravity accelerations when the input apparatus is swung in a pitch direction, the input apparatus being seen from an X direction.

FIG. 39 are diagrams for illustrating the effect of the gravity acceleration generated when the input apparatus 1 is swung in the pitch direction, the input apparatus 1 being seen from the X-axis direction. It should be noted that the effect of the gravity acceleration in the roll direction has already been described in FIG. 9.

For example, when the input apparatus 1 is rotated in the pitch direction from the reference position thereof as shown in FIG. 39A to tilt as shown in FIG. 39B, for example, the gravity acceleration G detected by the second acceleration sensor 162 at the time the input apparatus 1 is in the reference position decreases. Thus, it is difficult for the input apparatus 1 to make a distinguishment from an upward inertial force I in the pitch direction as shown in FIG. 39C.

In this regard, a fact that a time change rate of the gravity acceleration component value generated by the movement of the input apparatus 1 is smaller than a time change rate of the acceleration value that focuses on an inertial component at the time the input apparatus 1 is moved by the operation of the user, that is, an inertial acceleration is used. The time change rate of the gravity acceleration component value is a $\frac{1}{10}$ order of a time change rate of the inertial acceleration component value generated by the operation of the user. The value output from the acceleration sensor unit 16 is a value obtained by combining those two. That is, the signal output from the acceleration sensor unit 16 is a signal obtained by superimposing a low-frequency component value as the gravity acceleration component value on the time change rate of the inertial acceleration component value generated by the operation of the user.

Therefore, by carrying out the differential operation on the acceleration values in Step 1401, the acceleration time change rates can be obtained. Accordingly, the time change rates of the gravity acceleration component values are removed. As a result, even in the case where a change in a component force of the gravity acceleration due to the tilt of the input apparatus 1 occurs, the radius gyrations can be obtained appropriately, and appropriate velocity values can be calculated from the radius gyrations.

It should be noted that there are cases where, in addition to the gravity acceleration component value, the low-frequency component value contains, for example, a temperature drift of the acceleration sensor unit 16 or a DC offset value.

Moreover, because Equation (12) is used in this embodiment, in Step 1402, a second-order differential is carried out on the angular velocity value $\omega_\psi$, and noises of a high-frequency range are superimposed on the operational value of the angular velocity. Though there is no problem when $|\Delta(\Delta\omega_\psi)|$ is large, when small, S/N deteriorates. When $|\Delta(\Delta\omega_\psi)|$ with S/N deteriorated is used in the calculation of $R_\psi(t)$ in Step 1408, precision of $R_\psi(t)$ and the velocity value $V_x$ is lowered.

In this regard, in Step 1403, the angular acceleration time change rate $\Delta(\Delta\omega_\psi)$ about the Y axis calculated in Step 1402 is used. When $|\Delta(\Delta\omega_\psi)|$ is equal to or smaller than the threshold value th1, the radius gyration $R_\psi(t)$ previously stored in the memory and that has less noise is read out (Step 1407), and the read-out radius gyration $R_\psi(t)$ is used in calculating the velocity value $V_x$ in Step 1408.

In Steps 1409 to 1414, the MPU 19 calculates the velocity value $V_y$ in the Y-axis direction in the same manner as in the processing of Steps 1403 to 1408 above. In other words, the MPU 19 judges whether the absolute value of the angular acceleration time change rate $|\Delta(\Delta\omega_\theta)|$ about the X axis exceeds the threshold value th1 (Step 1409), and when exceeding the threshold value th1, calculates the radius gyration $R_\theta(t)$ about the X axis using the angular acceleration time change rate (Step 1410).

A signal of the radius gyration $R_\theta(t)$ is passed through the lowpass filter (Step 1411) and stored in the memory (Step 1412). When equal to or smaller than the threshold value th1, the radius gyration $R_\theta(t)$ stored in the memory is read out (Step 1413), and the velocity value $V_y$ in the Y-axis direction is calculated based on the radius gyration $R_\theta(t)$ (Step 1414).

It should be noted that although the same threshold value th1 is used in both the yaw direction and the pitch direction in this embodiment, different threshold values may be used for those directions.

In Step 1403, it is also possible to judge the angular acceleration value $(\Delta\omega_\psi)$ based on the threshold value, instead of $\Delta(\Delta\omega_\psi)$. Also in Step 1409, it is possible to judge the angular acceleration value $(\Delta\omega_\theta)$ based on the threshold value, instead of $\Delta(\Delta\omega_\theta)$. In the flowchart shown in FIG. 38, Equation (12) has been used for calculating the radius gyration R(t). However, because the angular acceleration values $(\Delta\omega_\psi, \Delta\omega_\theta)$ are calculated when using Equation (11), the angular acceleration values $(\Delta\omega_\psi, \Delta\omega_\theta)$ may be judged based on the threshold value.

Figure 40:
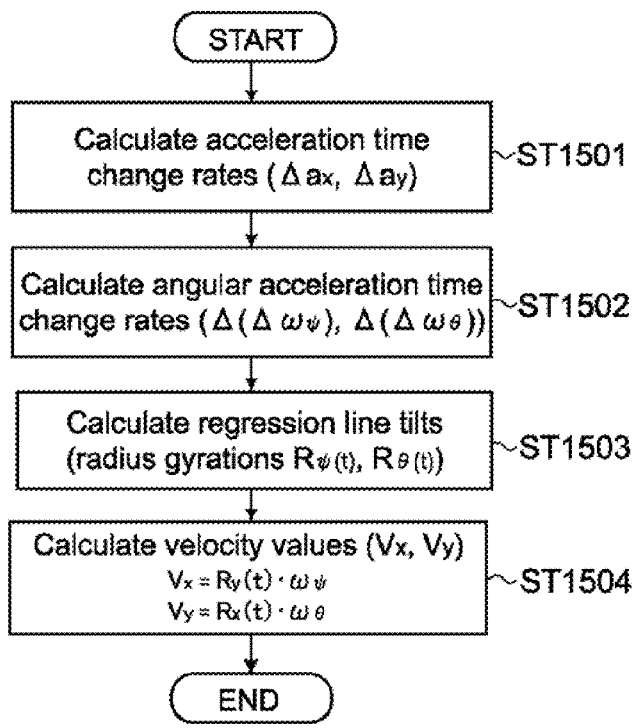
[FIG. 40] A flowchart showing an operation of the input apparatus regarding a method of calculating the radius gyrations according to another embodiment.

Next, another embodiment of the calculation method of the radius gyrations $(R_\psi(t), R_\theta(t))$ described in Step 1404 or 1410 will be described. FIG. 40 is a flowchart showing an operation of the input apparatus 1 at that time.

In this embodiment, a tilt of a regression line is used to calculate the radius gyration. As described above, the radius gyration is a ratio of the acceleration change rate to the angular acceleration change rate. For calculating the ratio of the acceleration change rate to the angular acceleration change rate, this embodiment uses the tilt of the regression line.

The MPU 19 subjects the acceleration values $(a_x, a_y)$ and the angular velocity values $(\omega_\psi, \omega_\theta)$ to a first-order differential and second-order differential, to thus calculate the acceleration change rates $(\Delta a_x, \Delta a_y)$ and the angular acceleration change rates $(\Delta(\Delta\omega_\psi), \Delta(\Delta\omega_\theta))$ (Steps 1501 and 1502). A history of n pairs of acceleration change rates $(\Delta a_x, \Delta a_y)$ and angular acceleration change rates $(\Delta(\Delta\omega_\psi), \Delta(\Delta\omega_\theta))$ are stored in the memory, for example, and regression line tilts $(A_1, A_2)$ are respectively calculated using Equations (15) and (16) below (Step 1503). The regression line tilts are ratios of the acceleration change rates to the angular acceleration change rates, that is, the radius gyrations $(R_\theta(t), R_\psi(t))$. It should be noted that as a reference, methods of calculating regression line segments $(B_1, B_2)$ are respectively expressed by Equations (17) and (18).

$$A_1 = R_\theta(t) = [\{\Sigma(\Delta(\Delta\omega_{\psi j}))^2\} * \Sigma(\Delta a_{yj})^2\} - \{\Sigma\Delta(\Delta\omega_{\psi j}) * \Sigma\Delta(\Delta\omega_{\psi j}) * \Delta a_{yj}\}]/[n * \Sigma(\Delta(\Delta\omega_{\psi j}))^2 - \{\Sigma\Delta(\Delta\omega_{\psi j})\}^2] \quad (15)$$

$$A_2 = R_\psi(t) = [\{\Sigma(\Delta(\Delta\omega_{\theta j}))^2 * \Sigma(\Delta a_{xj})^2\} - \{\Sigma\Delta(\Delta\omega_{\theta j}) * \Sigma\Delta(\Delta\omega_{\theta j}) * \Delta a_{xj}\}]/[n * \Sigma(\Delta(\Delta\omega_{\theta j}))^2 - \{\Sigma\Delta(\Delta\omega_{\theta j})\}^2] \quad (16)$$

$$B_1 = [\{n * \Sigma\Delta(\Delta\omega_{\psi j}) * \Delta a_{yj}\} - \{\Sigma\Delta(\Delta\omega_{\psi j}) * \Sigma\Delta a_{yj}\}]/[n * \Sigma(\Delta(\Delta\omega_{\psi j}))^2 - \{\Sigma\Delta(\Delta\omega_{\psi j})\}^2] \quad (17)$$

$$B_2 = [\{n * \Sigma\Delta(\Delta\omega_{\theta j}) * \Delta a_{xj}\} - \{\Sigma\Delta(\Delta\omega_{\theta j}) * \Sigma\Delta a_{xj}\}]/[n * \Sigma(\Delta(\Delta\omega_{\theta j}))^2 - \{\Sigma\Delta(\Delta\omega_{\theta j})\}^2] \quad (18)$$

In Equations (15) to (18) above, n represents a sampling count of the acceleration values $(\Delta a_x, \Delta a_y)$ and angular acceleration change rates $(\Delta(\Delta\omega_\psi), \Delta(\Delta\omega_\theta))$. The sampling count n is suitably set so that operational errors are minimized.

Upon calculating the radius gyrations, the velocity values are calculated based on the respective radius gyrations as in Steps 1408 and 1414 of FIG. 38 (Step 1504).

It should be noted that the effect of noises in a high-frequency range may be reduced by making the signals of the radius gyrations or the signals of the velocity values pass through the lowpass filter.

In the embodiment shown in FIG. 39, by calculating the regression line tilts as the radius gyrations, it becomes possible to calculate the radius gyrations and the velocity values $(V_x, V_y)$ more accurately. Therefore, the movement of the pointer 2 displayed on the screen 3 can be made a natural movement that matches the intuition of the user.

The descriptions above have been given on the method of calculating the regression line tilts in the dimensions of the acceleration change rates and angular acceleration change rates. However, the present embodiment are not limited thereto, and the regression line tilts may be calculated in dimensions of displacements and angles, velocities and angular velocities, or accelerations and angular accelerations.

Figure 41:
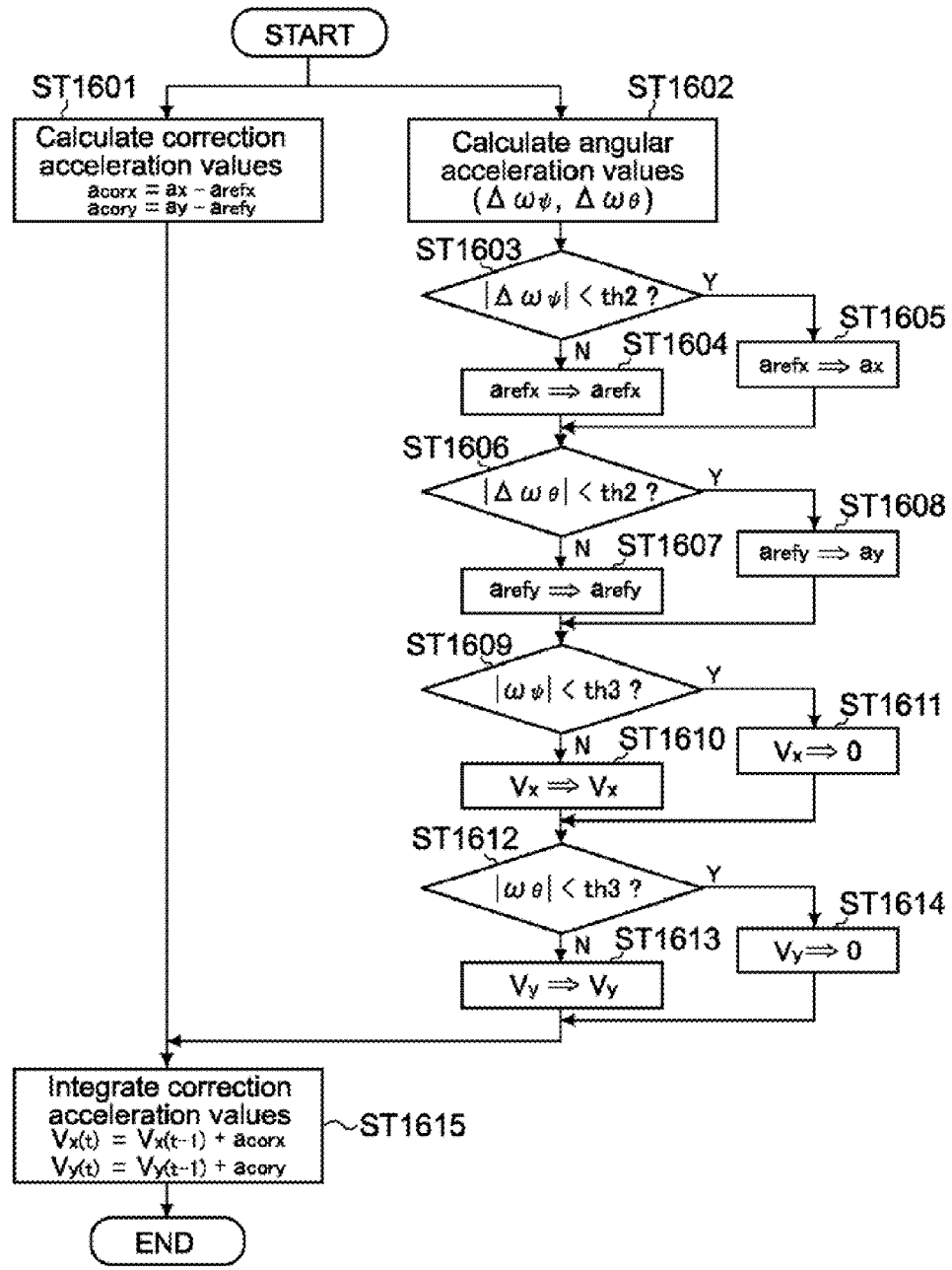
[FIG. 41] A flowchart showing an operation of the input apparatus regarding a method of calculating the velocity values according to another embodiment.

Next, another embodiment of the calculation method of the velocity values $(V_x, V_y)$ in Step 1103 of FIG. 34 will be described. FIG. 41 is a flowchart showing an operation of the input apparatus 1 at that time.

Upon obtaining the acceleration values $(a_x, a_y)$ and the angular velocity values $(\omega_\psi, \omega_\theta)$ from the sensor unit 17, the MPU 19 performs the following operation to remove the gravitational effect. Specifically, as in Equations (19) and (20) below, the MPU 19 subtracts gravity acceleration components (first $a_x (=a_{refx})$ and $a_y (=a_{refy})$) previously detected in the X- and Y-axis directions from the currently-obtained acceleration values $a_x$ and $a_y$, respectively, to thereby generate a first correction acceleration value $a_{corx}$, and a second correction acceleration value $a_{cory}$ (Step 1601).

$$a_{corx} = a_x - a_{refx} \quad (19)$$

$$a_{cory} = a_y - a_{refy} \quad (20)$$

Hereinafter, $a_{refx}$ and $a_{refy}$ will be referred to as reference acceleration value on the X axis and reference acceleration value on the Y axis (first reference acceleration value and second reference acceleration value), respectively. $a_{refx}$ and $a_{refy}$ used in the first calculation of Step 1601 since turning on the power are acceleration signals $a_x$ and $a_y$ detected right after the power is turned on.

As shown in Equations (21) and (22), the MPU 19 calculates the first velocity value $V_x$ and the second velocity value $V_y$ by respectively adding the first and second correction acceleration values $a_{corx}$ and $a_{cory}$, that is, by an integration operation (Step 1615).

$$V_x(t) = V_x(t-1) + a_{corx} \quad (21)$$

$$V_y(t) = V_y(t-1) + a_{cory} \quad (22)$$

$V_x(t)$ and $V_y(t)$ represent the currently-obtained velocity values and $V_x(t-1)$ and $V_y(t-1)$ represent previous velocity values.

Meanwhile, the MPU 19 calculates the angular acceleration values $(\Delta\omega_\psi, \Delta\omega_\theta)$ by performing a differential operation on the obtained angular velocity values $(\omega_\psi, \omega_\theta)$ (Step 1602).

The MPU 19 judges whether absolute values $|\Delta\omega_\psi|$ and $|\Delta\omega_\theta|$ of $\Delta\omega_\psi$ and $\Delta\omega_\theta$ above, respectively, are smaller than a threshold value th2 (Steps 1603 and 1606). When $|\Delta\omega_\psi| \geq th2$, the MPU 19 uses the first reference acceleration value $a_{refx}$ as it is and does not update it (Step 1604). Similarly, when $|\Delta\omega_\theta| \geq th2$, the MPU 19 uses the second reference acceleration value $a_{refy}$ as it is and does not update it (Step 1607).

A value close to 0 is set as the threshold value th2. The threshold value th2 takes into account the angular velocity values that are detected due to a DC offset or the like even when the user is consciously holding the input apparatus 1 still. Thus, the pointer 2 is prevented from being moved during display due to a DC offset in the case where the user is consciously holding the input apparatus 1 still.

Reasons for performing the processing as described above are as follows.

As shown in FIG. 37, when the user operates the input apparatus 1 naturally, the operation is made by at least one of a rotation from a base of an arm, bending of an elbow, and a turn of a wrist. Therefore, generation of the acceleration leads to generation of the angular acceleration. Specifically, the acceleration can be assumed to be subservient to the angular acceleration generated in the same direction as the acceleration. Therefore, by the MPU 19 monitoring the angular acceleration value $|\Delta\omega_\psi|$, it is possible to judge whether to update the first reference acceleration value $a_{refx}$ in the same direction, and judge whether to eventually correct the first correction acceleration value $a_{corx}$ from Equation (19). The same holds true for the angular acceleration value $|\Delta\omega_\theta|$.

More specifically, when the angular acceleration value $|\Delta\omega_\psi|$ is equal to or larger than the threshold value th2, the MPU 19 judges that the input apparatus 1 is moving in the yaw direction. In this case, the MPU 19 does not update the first reference acceleration value $a_{refx}$ and consequently does not correct the first correction acceleration value $a_{corx}$ and continues on with the integration operation of Equation (21) based on $a_{corx}$.

Further, when the angular acceleration value $|\Delta\omega_\theta|$ is equal to or larger than the threshold value th2, the MPU 19 judges that the input apparatus 1 is moving in the pitch direction. In this case, the MPU 19 does not update the second reference acceleration value $a_{refy}$ and consequently does not correct the second correction acceleration value $a_{cory}$, and continues on with the integration operation of Equation (22) based on $a_{cory}$.

Meanwhile, when the angular acceleration value $|\Delta\omega_\psi|$ is smaller than the threshold value th2 in Step 1603, the MPU 19 judges that the input apparatus 1 is not moved in the yaw direction. In this case, the MPU 19 updates the reference acceleration value $a_{refx}$ to the currently-obtained (latest) detection value $a_x$, to thereby correct the first correction acceleration value $a_{corx}$ using Equation (19) (Step 1605). The latest detection value $a_x$ is, in other words, a detection value obtained while the input apparatus 1 is held almost still, thus being the gravity acceleration component value.

Similarly, when the angular acceleration value $|\Delta\omega_\theta|$ is smaller than the threshold value th2 in Step 1606, the MPU 19 judges that the input apparatus 1 is not moved in the pitch direction. In this case, the MPU 19 updates the second reference acceleration value $a_{refy}$ to the currently-obtained (latest) detection value $a_y$, to thereby correct the second correction acceleration value $a_{cory}$ using Equation (20) (Step 1608).

It should be noted that in this embodiment, the threshold values in both the yaw direction and the pitch direction have been set to the same value th2. However, different threshold values may be used for those directions.

In the descriptions above, the angular acceleration values $\Delta\omega_\psi$ and $\Delta\omega_\theta$ have been monitored, but the MPU 19 can also monitor the angular velocity values $\omega_\psi$ and $\omega_\theta$ to correct the velocity values calculated in Equations (21) and (22). Based on the same idea as that of FIG. 37, assuming that generation of the velocity leads to generation of the angular velocity, it can be assumed that the velocity is subservient to the angular velocity in the same direction as the velocity.

Specifically, when the absolute value $|\omega_\psi|$ of the angular velocity value $\omega_\psi$ is equal to or larger than a threshold value th3 (NO in Step 1609), the MPU 19 judges that the input apparatus 1 is moving in the yaw direction. In this case, the MPU 19 does not correct the first velocity value $V_x$ (Step 1610). The same holds true for the absolute value $|\omega_\theta|$ of the angular velocity value $\omega_\theta$ (NO in Step 1612, and Step 1613).

The threshold value th3 also only needs to be set in the same manner as the threshold value th2.

On the other hand, when $|\omega_\psi|$ is smaller than the threshold value th3 (YES in Step 1609), the MPU 19 judges that the input apparatus 1 is not moved in the yaw direction. In this case, the MPU 19 corrects the first velocity value $V_x$ so as to reset it to 0, for example (Step 1611). The same holds true for $|\omega_\theta|$ (YES in Step 1612, and Step 1614).

As described above, the reference acceleration values $a_{refx}$ and $a_{refy}$ are updated and the correction acceleration values $a_{corx}$ and $a_{cory}$ are corrected when the input apparatus 1 is held almost still, with the result that the gravitational effect with respect to the acceleration sensor unit 16 can be suppressed. In addition, because the correction acceleration values $a_{corx}$ and $a_{cory}$ are corrected by Equations (19) and (20) upon update of the reference acceleration values $a_{refx}$ and $a_{refy}$, a DC level is also corrected, thereby solving the problem regarding the DC offset. Further, because the velocity values are corrected so as to be reset to 0 when the input apparatus 1 is held almost still, integration errors can also be suppressed. When an integration error occurs, a phenomenon in which the pointer 2 moves on the screen 3 irrespective of the fact that the user has stopped moving the input apparatus 1 occurs.

Thus, by removing the effect of the gravity acceleration also in the process of calculating the velocity values $(V_x, V_y)$ in Step 1103 of FIG. 34, more-accurate velocity values are calculated.

Figure 42:
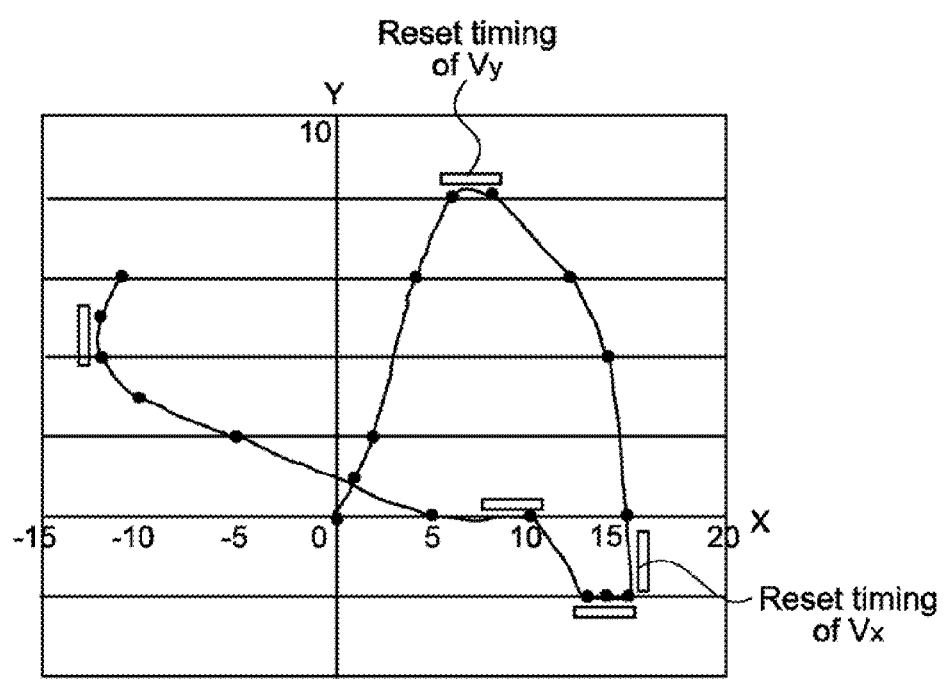
[FIG. 42] An example of a trajectory of the input apparatus seen from a plane of an X axis and a Y axis is shown.

Moreover, in this embodiment, because the first reference acceleration value $a_{refx}$ and the second reference acceleration value $a_{refy}$ are updated individually, when even one of the angular acceleration values in the yaw direction and the pitch direction becomes smaller than the threshold value, a correction thereof is performed. Therefore, it is possible to update the first reference acceleration value $a_{refx}$ or the second reference acceleration value $a_{refy}$ with a time interval short enough for practical use. The same holds true for the individual corrections of the first velocity value $V_x$ and the second velocity value $V_y$. FIG. 42 is an explanatory diagram to help understand the above description.

FIG. 42 shows a trajectory of the input apparatus 1 seen from a plane formed by the X axis and the Y axis. $V_x$ is reset to 0 if the angular velocity value $\omega_\psi$ in the yaw direction is substantially 0 (smaller than the threshold value th3). $V_y$ is reset to 0 if the angular velocity value $\omega_\theta$ in the pitch direction is substantially 0 (smaller than the threshold value th3).

Up to now, the input apparatus 1 has carried out the main operations to calculate the velocity values $(V_x, V_y)$. In an embodiment shown in FIG. 43, the control apparatus 40 carries out the main operations. An operation shown in FIG. 43 corresponds to that of FIG. 34.

The input apparatus 1 transmits the biaxial acceleration values and the biaxial angular velocity values output from the sensor unit 17 to the control apparatus 40 as input information, for example (Step 1703). The MPU 35 of the control apparatus 40 receives the input information (Step 1704) and carries out processing the same as that of Steps 1103 to 1106, 1109, and 1110 (Steps 1705 to 1710). As the method of calculating the velocity values in Step 1705, the methods described in FIGS. 36 to 42 may be used.

It is also possible that the input apparatus 1 executes the processing up to Step 1705 (or 1706, 1707, 1708, or 1709), and the control apparatus 40 executes the processing of Step 1706 (or 1707, 1708, 1709, or 1710) and after.

Figure 44:
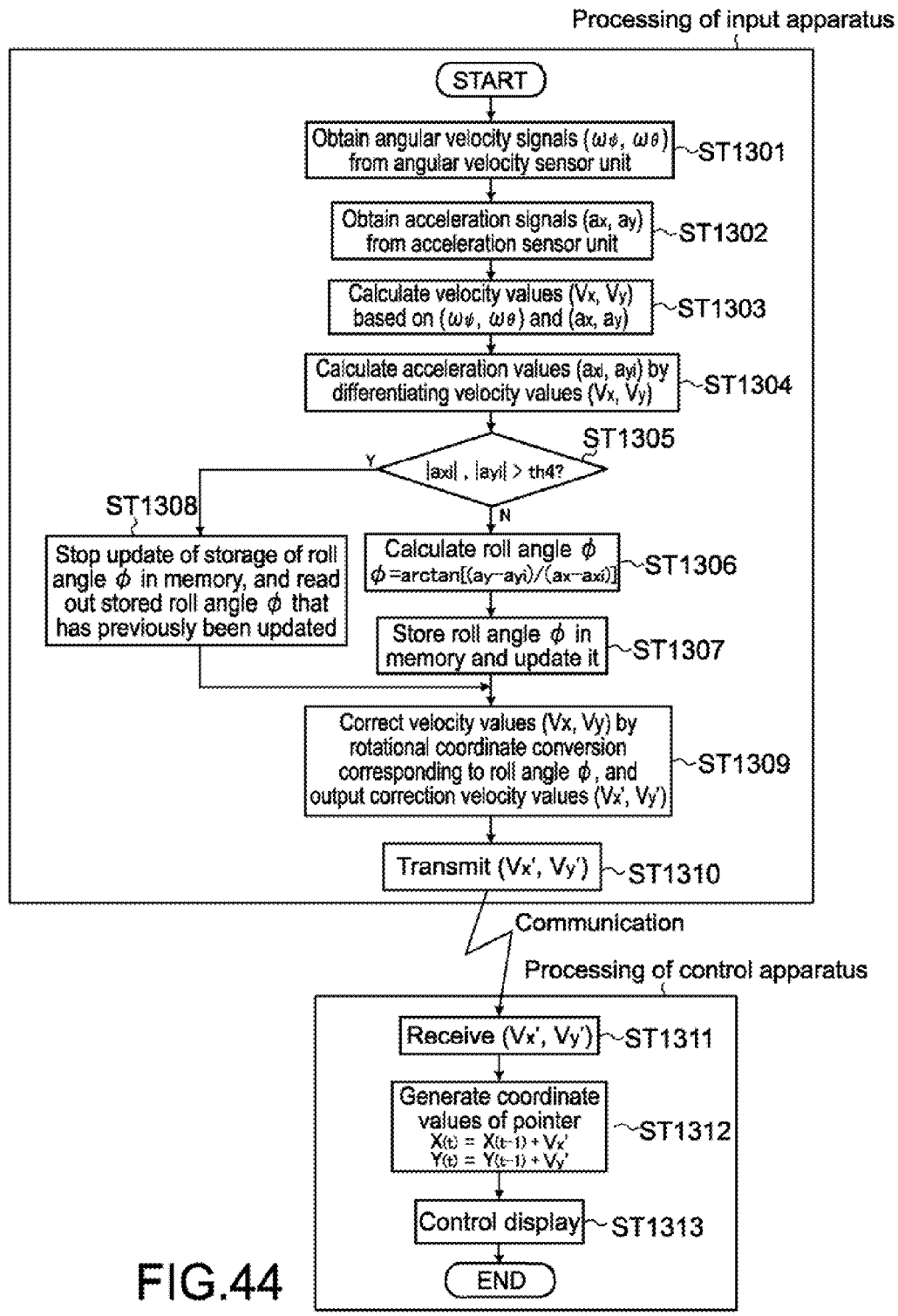
[FIG. 44] A flowchart showing an operation of the control system regarding an operation of removing the effect of the gravity accelerations due to the tilt of the input apparatus in the roll direction and removing movement inertial components, according to another embodiment.

Next, another embodiment of the operation of removing the effect of the gravity acceleration due to the tilt of the input apparatus 1 in the roll direction and removing the inertial acceleration component will be described (another embodiment of the operation shown in FIG. 34). FIG. 44 is a flowchart showing the operation.

Processing of Steps 1301 to 1304 is the same as that of Steps 1101 to 1104.

In Step 1305, the MPU 19 judges whether at least one of absolute values $|a_{xi}|$ and $|a_{yi}|$ of the operational acceleration values ($a_{xi}$, $a_{yi}$) calculated in Step 1304 exceeds a threshold value th4 (judgment means). This is because, if the operational acceleration values ($|a_{xi}|$, $|a_{yi}|$) are too large, the calculation error of the roll angle $\phi$ in Equation (1') may become large.

The threshold value th4 is set as appropriate to, for example, a value equal to or smaller than the gravity acceleration, but is not limited thereto.

It is also possible to judge whether an operational value calculated based on the absolute values $|a_{xi}|$ and $|a_{yi}|$ exceeds a threshold value in Step 1305. The operational value of $|a_{xi}|$ and $|a_{yi}|$ is, for example, a combined vector amount $[(a_x)^2+(a_y)^2]^{1/2}$. Alternatively, the operational value is an additional value, a mean value, or the like of $|a_{xi}|$ and $|a_{yi}|$.

When both of the absolute values $|a_{xi}|$ and $|a_{yi}|$ or the operational value thereof are/is equal to or smaller than the threshold value, the MPU 19 assumes that no calculation error is caused, and calculates the roll angle $\phi$ using. Equation (1') (Step 1306).

The MPU 19 successively stores the calculated roll angles $\phi$ in the memory. Because the roll angle $\phi$ is calculated at predetermined time intervals as described above, the MPU 19 typically updates it occasionally and stores it in the memory (update means) (Step 1307).

On the other hand, when at least one of the absolute values $|a_{xi}|$ and $|a_{yi}|$ exceeds the threshold value, the MPU 19 stops the update of storage of the roll angle $\phi$ in the memory, for example. In other words, in this case, the MPU 19 reads out the previous roll angle $\phi$ stored in the memory (Step 1308). The MPU 19 corrects the velocity values ($V_x$, $V_y$) by rotational coordinate conversion corresponding to the read-out roll angle $\phi$ (Equation (5) of FIG. 35), and outputs the correction velocity values ($V_x'$, $V_y'$) (Step 1309).

Instead of reading out the previous roll angle $\phi$, the MPU 19 may execute the following processing. For example, the MPU 19 occasionally updates the calculated velocity values ($V_x$, $V_y$) and stores them in the memory. It is also possible that, when at least one of the absolute values $|a_{xi}|$ and $|a_{yi}|$ exceeds the threshold value, the MPU 19 stops the update of the velocity values and outputs the velocity values that have previously been updated and stored. Alternatively, the MPU 19 may stop the predetermined processing as shown in FIG. 308 of FIG. 14.

Processing of Steps 1310 to 1313 is the same as that of Steps 1107 to 1110 of FIG. 34.

As described above, in the processing shown in FIG. 44, even when the operational acceleration values are larger than the threshold value th4, the previous roll angle $\phi$ calculated with a normal range of operational acceleration values is used. Thus, the velocity values are calculated accurately.

Figure 43:
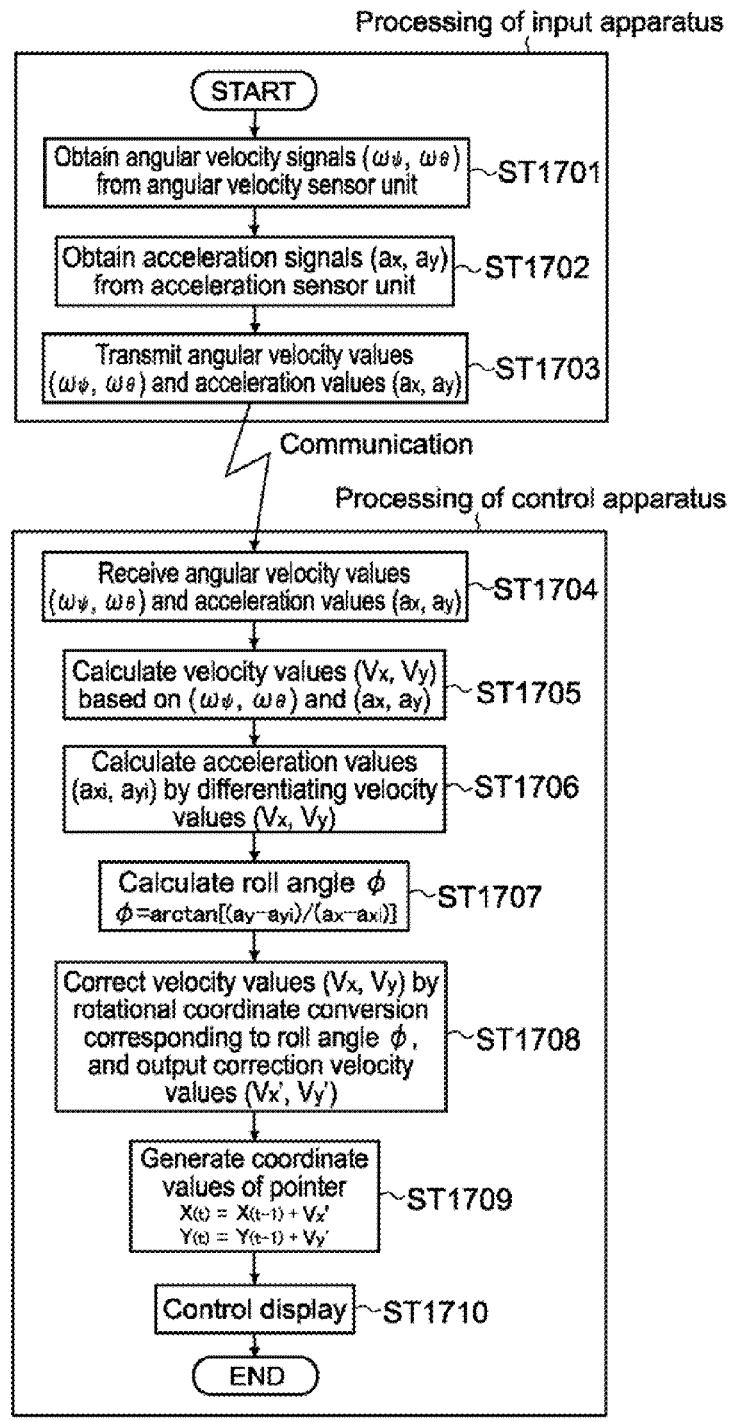
[FIG. 43] A flowchart showing an operation of the control system corresponding to FIG. 10, in a case where the control apparatus carries out a main operation.

In the same manner as in the processing shown in FIG. 43, the processing of Steps 1303 to 1309, 1312, and 1313 shown in FIG. 44 may be executed by the control apparatus 40. Alternatively, the control apparatus 40 may execute the processing of Step 1304 (or 1305, 1306, . . . , or 1309) and after.

In the processing of FIG. 44, the operational acceleration values ($a_{xi}$, $a_{yi}$) have been the target of the threshold-value judgment. However, the acceleration values ($a_x$, $a_y$) detected by the acceleration sensor unit 16 may be the target of the threshold-value judgment. In this case, processing after the threshold-value judgment is carried out on the acceleration values ($a_x$, $a_y$) is the same as that of Step 1306 and after. Alternatively, the processing may be such that, merely because a detection voltage is saturated when the detected acceleration values become a certain value or more, update of storage of the roll angle $\phi$ is stopped automatically at that time.

Alternatively, the target of the threshold-value judgment is not limited to the operational acceleration values ($a_{xi}$, $a_{yi}$) and the acceleration values ($a_x$, $a_y$). For example, the angular velocity values ($\omega_\psi$, $\omega_\theta$) detected by the angular velocity sensor unit 15, the angular acceleration values ($\Delta\omega_\psi$, $\Delta\omega_\theta$) calculated by carrying out the differential operation on the angular velocity values ($\omega_\psi$, $\omega_\theta$), or the velocity values ($V_x$, $V_y$) calculated in Step 1303 may be used as the target of the threshold-value judgment. The threshold-value judgment on each of those operational acceleration values, the acceleration values, the angular velocity values, the angular acceleration values, and the velocity values is executed for the purpose of suppressing an operational error of the roll angle $\phi$ due to the too fast a movement of the input apparatus 1 (too large an acceleration).

In contrast, although descriptions will be given later on embodiments in which the threshold-value judgment is carried out on the acceleration values (see FIGS. 48 to 50), the angular velocity values (see FIG. 50), and the angular acceleration values (see FIG. 51), the threshold-value judgment executed in those embodiments is executed for a purpose different from that of the threshold-value judgment in the processing of FIG. 34.

Figure 45:
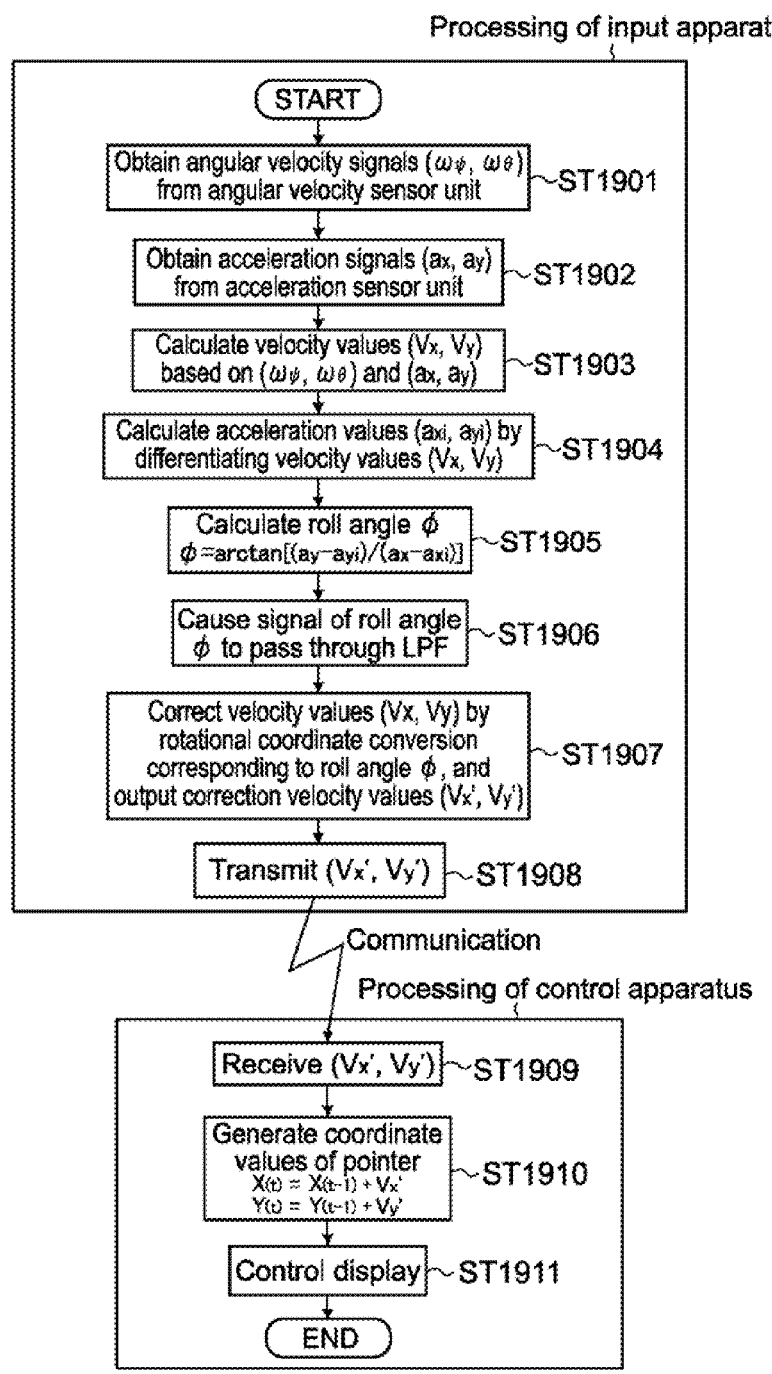
[FIG. 45] A flowchart showing an operation of the control system of additionally removing, after removing the movement inertial components by an operation of the roll angle, residual movement inertial components, according to an embodiment.

Next, an embodiment of additionally removing residual inertial acceleration components after removing the inertial acceleration components by the operation of the roll angle $\phi$ as described above will be described. FIG. 45 is a flowchart showing an operation of the processing.

In this embodiment, the input apparatus 1 includes a function of a lowpass filter (LPF) (not shown) to which a signal of at least one of the residual inertial acceleration component values, that are contained in the operational acceleration values ($a_{xi}$, $a_{yi}$) of Equation (1') regarding the roll angle $\phi$ calculated in Step 1905, is input. The LPF is typically a function of the MPU 19. Because of the LPF, the impulse-like components of the acceleration signals are removed, and consequently the residual inertial acceleration components contained in the signal of the roll angle $\phi$ are removed. Thus, the purpose of the processing that uses the LPF is the same as that of the processing described in FIGS. 18 and 19.

Processing of Steps 1901 to 1905 is the same as that of Steps 1101 to 1105. In Step 1906, the MPU 19 removes the impulse-like components of the acceleration component signals that are contained in data of the roll angle $\phi$. The processing thereafter is the same as that of Steps 1106 to 1110.

In the same manner as in the processing shown in FIG. 43, the processing of Steps 1903 to 1909, 1912, and 1913 shown in FIG. 45 may be executed by the control apparatus 40. Alternatively, the control apparatus 40 may execute the processing of Step 1904 (or 1905, 1906, or 1907) and after.

Figure 46A:
[FIG. 46] (A) is a diagram showing an actual trajectory of the pointer in a case where the roll angle is corrected without subtracting operational acceleration values in Equation (1). (B) is a diagram showing an actual trajectory of the pointer in a case where the roll angle is corrected using Equation (1).

FIG. 46A is a diagram showing an actual trajectory of the pointer 2 in a case where the roll angle $\phi$ is corrected without compensating the inertial acceleration components (without subtracting the operational acceleration values ($a_{xi}$, $a_{yi}$)). In other words, FIG. 46A shows a case where the roll angle $\phi$ is corrected by Equation (1) above.

Figure 47:
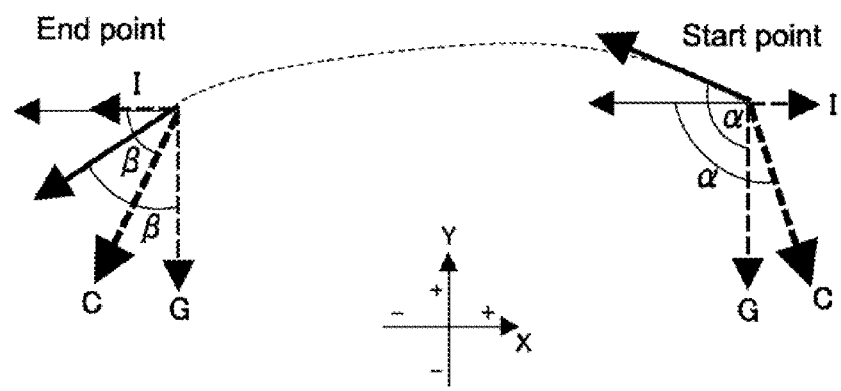
[FIG. 47] A diagram for illustrating a reason why the pointer moves as shown in FIG. 46A.

In FIG. 46A, irrespective of the fact that the inventor has moved the input apparatus 1 linearly in the horizontal direction, the trajectory of the pointer 2 is an arc-shaped trajectory that is covexed upwardly. A reason why such a trajectory is obtained will be described. FIG. 47 is an explanatory diagram therefor.

As shown in FIG. 47, when the pointer 2 starts or stops moving, an inertial force I acts on the input apparatus 1 in a + direction on the X axis, for example. In this case, as a result of correcting the roll angle φ using Equation (1), the input apparatus misrecognizes a combined vector C of the gravity G and the inertial force I of the input apparatus as genuine gravity. Consequently, irrespective of the fact that the input apparatus is actually moved horizontally along the X axis, the pointer 2 is erroneously detected as being moved in an upward oblique direction at a start point thereof, for example.

Figure 46B:

FIG. 46B is a diagram showing an actual trajectory of the pointer 2 in the case where the roll angle φ is corrected. In FIG. 46B, processing as a combination of the threshold-value judgment of Step 1305 of FIG. 44 above and the example of Step 1906 of FIG. 45 where the LPF is used is carried out. As can be seen from the figure, the trajectory of the pointer 2 matches the horizontal movement of the input apparatus 1.

Figure 48:
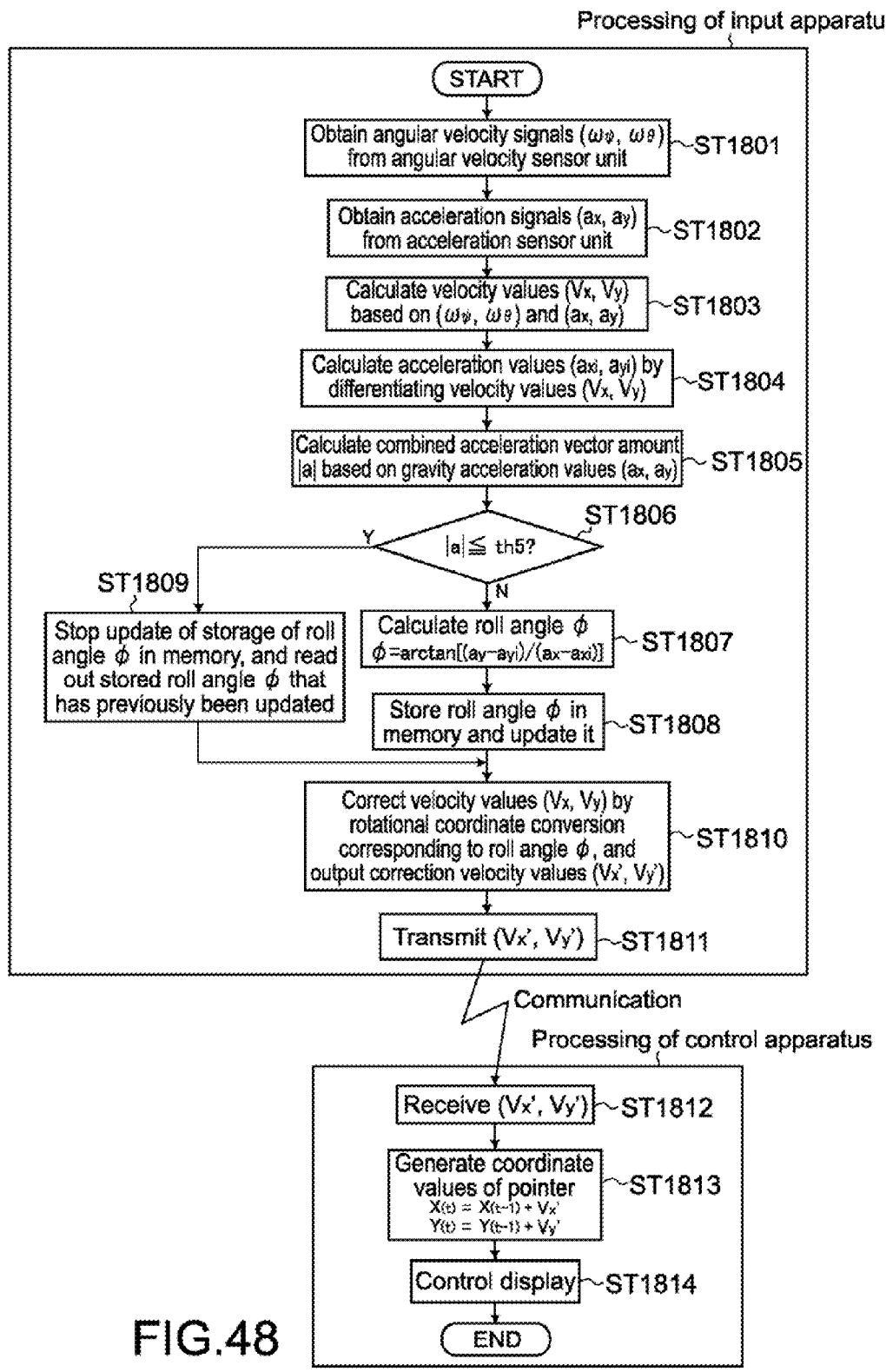
[FIG. 48] A flowchart showing an operation of the control system in a case where the input apparatus is operated while the detection surface is tilted from the vertical surface.

FIG. 48 is a flowchart showing an operation of the control apparatus 40 in a case where the user operates the input apparatus 1 in a state where the detection surface of the acceleration sensor unit 16 is tilted from the vertical surface.

Referring to FIG. 48, processing of Steps 1801 to 1804 is the same as that of Steps 1101 to 1104.

In Step 1805, the MPU 19 calculates the combined acceleration vector amount |a| based on the gravity acceleration component values ($a_x$, $a_y$). The combined acceleration vector amount |a| can be calculated from $[(a_x)^2+(a_y)^2]^{1/2}$. The MPU 19 judges whether the calculated combined acceleration vector amount |a| is equal to or smaller than a threshold value th5 (Step 1806), and when |a| exceeds the threshold value th5, calculates the roll angle φ (Step 1807). The calculated roll angle φ is stored in the memory and updated (Step 1808).

When the tilt of the detection surface from the vertical surface is large, that is, when the pitch angle θ is large, the gravity acceleration component values ($a_x$, $a_y$) become small and precision of the calculation result of the roll angle φ drops. Therefore, in this embodiment, in a case where the pitch angle θ increases as the roll angle φ calculated based on the gravity acceleration component values ($a_x$, $a_y$) is buried more into the noise, it becomes difficult to calculate an accurate roll angle φ. Therefore, when |a| is equal to or smaller than the threshold value th5, the MPU 19 stops the update of storage of the roll angle φ in the memory (Step 1809). In this case, the MPU 19 corrects the velocity values ($V_x$, $V_y$) by the rotational coordinate conversion corresponding to the previously-updated roll angle φ using Equation (1), to thus obtain the correction velocity values ($V_x'$, $V_y'$) (Step 1810).

Alternatively, it is also possible for the MPU 19 to output the previously-updated correction velocity values ($V_x'$, $V_y'$).

Alternatively, the MPU 19 may stop the predetermined processing as shown in Step 308 of FIG. 14. The same holds true for FIG. 51.

In the processing of FIG. 48, the combined acceleration vector amount has been used as the target of the threshold-value judgment, though not limited thereto. For example, it is also possible to compare the acceleration values |$a_x$| and |$a_y$| (comparison means) and stop the update of storage of the roll angle φ in the memory when the smaller one of those values as a result of the comparison is equal to or smaller than a threshold value.

Alternatively, it is also possible to stop the update of the storage of the roll angle φ in the memory when the operational value based on the gravity acceleration component values ($a_x$, $a_y$) is equal to or smaller than a threshold value. The operational value is, for example, a value calculated by $[(a_x)^2+(a_y)^2]^{1/2}$, |$a_x$|+|$a_y$|, other addition, subtraction, multiplication, and division, a combination of those, or other operational expressions.

The threshold value th5 only needs to be set as appropriate in consideration of noises and the like.

According to this embodiment, even when the pitch angle θ is large, because the MPU 19 stops the update of the roll angle φ, an accurate roll angle φ can be calculated.

In the same manner as in the processing of FIG. 43, the processing of Steps 1803 to 1810, 1813, and 1814 shown in FIG. 48 may be executed by the control apparatus 40.

Figure 52:
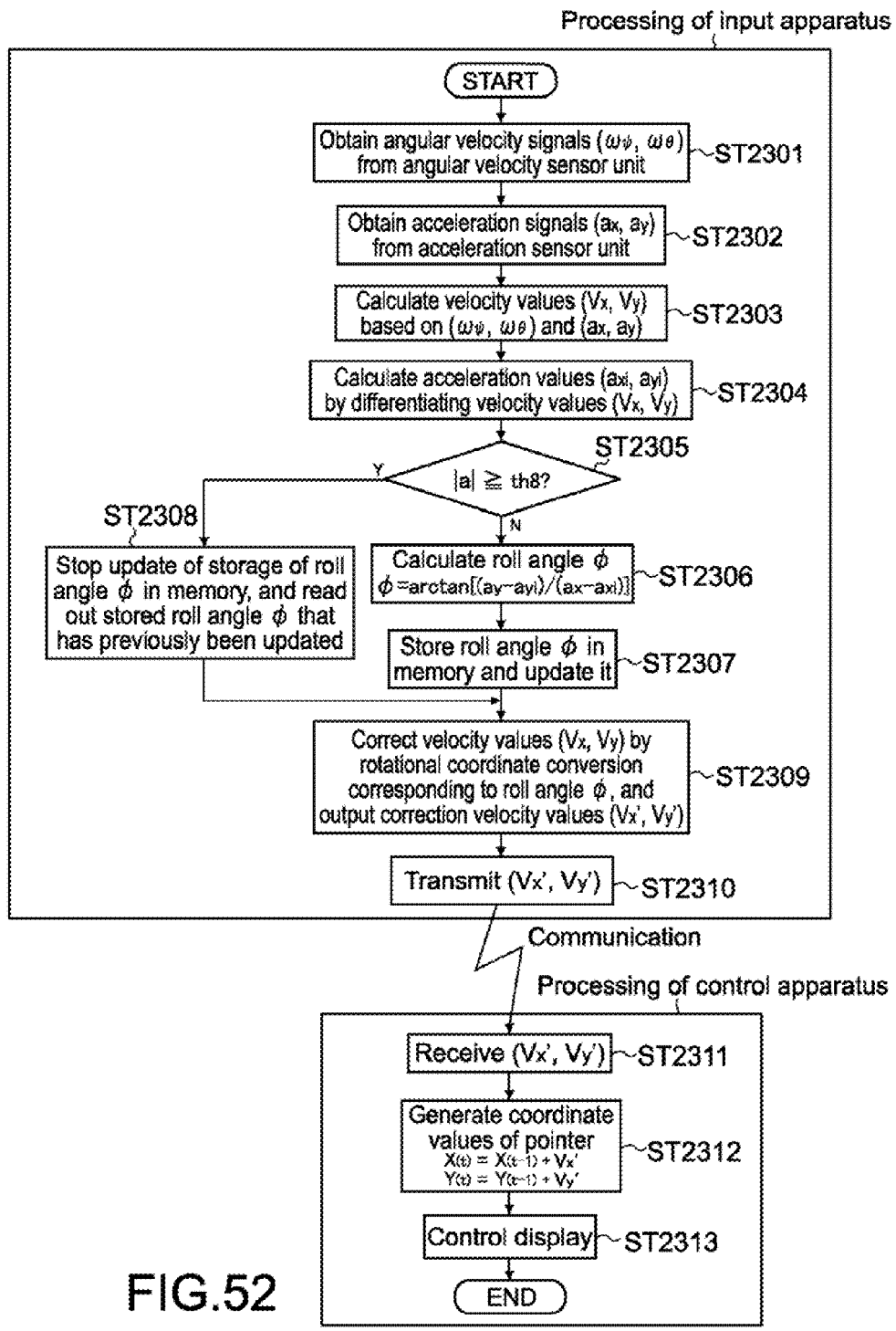
[FIG. 52] A flowchart showing an operation of the control system regarding the processing shown in FIG. 48, according to another embodiment.
Figure 53A:
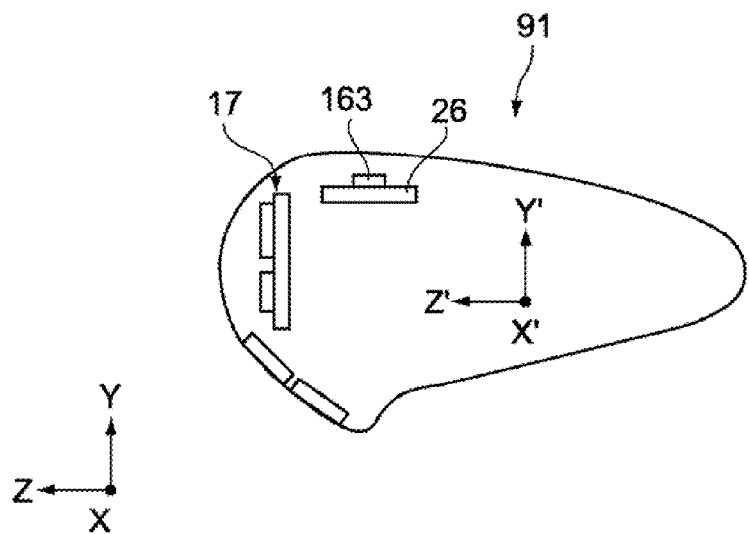
[FIG. 53] (A) is a schematic diagram showing a structure of an input apparatus for realizing the processing shown in FIG. 52. (B) is a diagram for illustrating acceleration values detected by a third acceleration sensor.

Next, another embodiment of the processing shown in FIG. 48 will be described. FIG. 52 is a flowchart showing an operation of the control system in this case. FIG. 53A is a schematic diagram showing a structure of an input apparatus for realizing the processing shown in FIG. 52.

As shown in FIG. 53A, an input apparatus 91 includes, in addition to the sensor unit 17 above, a third acceleration sensor 163. Typically, the third acceleration sensor 163 detects an acceleration in a direction along the Z' axis (third acceleration) substantially orthogonal to the X' axis and the Y' axis as the detection axes of the first and second acceleration sensors 161 and 162. In other words, the input apparatus 91 is capable of detecting triaxial accelerations.

In FIG. 53A, the third acceleration sensor 163 is mounted on a substrate 26 different from the circuit board 25, but it may be mounted on a substrate integrally formed with the circuit board 25. Alternatively, the third acceleration sensor 163 may be mounted on the main substrate 18 (see FIG. 3).

Referring to FIG. 52, in Step 2302, the MPU 19 obtains triaxial acceleration values ($a_x$, $a_y$, $a_z$) from the acceleration sensor unit 16 and the third acceleration sensor 163. Processing of Steps 2303 and 2304 is the same as that of Steps 1803 and 1804.

Figure 53B:
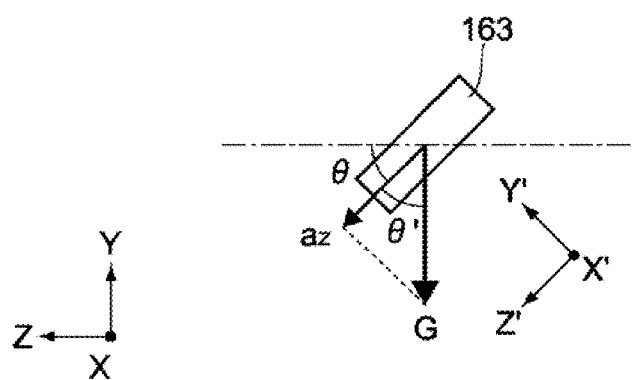

For example, when the input apparatus 91 is in the reference position as shown in FIG. 53A, the acceleration value |$a_z$| is substantially 0. However, when the input apparatus 91 is rotated in the pitch direction (or a direction including the pitch direction) from the reference position, the acceleration value |$a_z$| is generated, and |$a_z$| increases as the tilt becomes larger. When the input apparatus 91 is rotated in the pitch direction, the acceleration value |$a_z$| that focuses only on the gravity component value becomes G*sin θ' (θ'=90°−θ) as shown in FIG. 53B, which is 1 G at maximum.

When the obtained acceleration value |$a_z$| is smaller than a threshold value th8 in Step 2305, processing of Steps 2306, 2307, and 2309 to 2313 is executed. The processing of Steps 2306, 2307, and 2309 to 2313 is the same as that of Steps 1807, 1808, and 1810 to 1814 in FIG. 48.

On the other hand, when the acceleration value |$a_z$| is equal to or larger than the threshold value th8 in Step 2305, that is, when the tilt θ of the detection surface from the vertical surface (X-Y plane) is relatively large, the gravity acceleration component values ($a_x$, $a_y$) of the sensor unit 17 become small and precision of the calculation result of the roll angle φ drops. Therefore, in this case, the update of the storage of the roll angle φ in the memory is stopped (Step 2308).

As described above, the threshold value th8 can be set within a range in which the acceleration value |$a_z$| becomes a sufficiently large value. Accordingly, because the threshold-value judgment is carried out in a state where a relatively-low noise level occurs with respect to the acceleration value |$a_z$|, that is, a state where a high S/N can be obtained, accuracy of the judgment can be improved.

Here, as described in FIG. 15, there are cases where positive/negative of, for example, the second acceleration value $a_y$ detected in the Y'-axis direction is switched during a period from right before the update of the roll angle φ is stopped in Step 1809 shown in FIG. 48 to when the update is resumed next.

Figure 49:
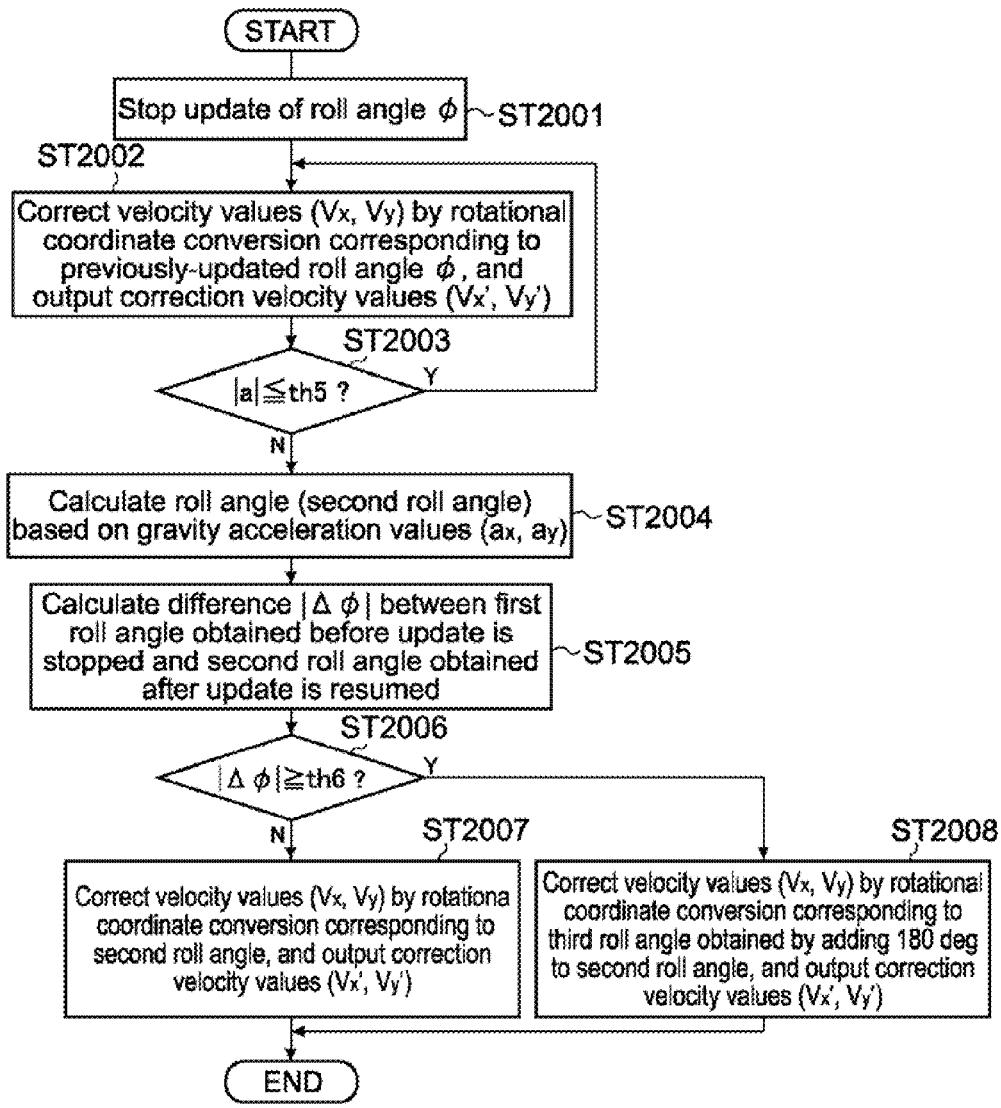
[FIG. 49] A flowchart showing an operation of processing for reducing a calculation error of the roll angle in FIG. 48.

As shown in FIG. 15, when the sign of the acceleration value $a_y$ of the gravity acceleration vector GY' is switched, an error also occurs in the calculation of the roll angle φ when used as it is. FIG. 49 is a flowchart showing an operation of processing of the input apparatus 1 for avoiding such a phenomenon.

Referring to FIG. 49, the MPU 19 stops the update of the roll angle φ under the condition of Step 1806 (see FIG. 48) (Step 2001). Then, the MPU 19 corrects the velocity values $(V_x, V_y)$ by the rotational coordinate conversion corresponding to the previously-updated roll angle φ to thus obtain the correction velocity values $(V_x', V_y')$, and outputs them (Step 2002). Alternatively, the MPU 19 may output the previously-updated correction velocity values.

When the combined acceleration vector amount |a| exceeds the threshold value th5 (NO in Step 2003), the MPU 19 calculates the roll angle φ based on the obtained gravity acceleration values $(a_x, a_y)$ (Step 2004).

The MPU 19 calculates a difference between the roll angle obtained when the update of the roll angle φ is stopped, that is, a roll angle φ1 calculated right before the stop (first roll angle) and a roll angle φ2 (calculated in Step 2004) obtained right after the resumption of the update (second roll angle) (Step 2005). When the difference |Δφ| is equal to or larger than a threshold value th6 (YES in Step 2006), the MPU 19 adds 180 deg to the second roll angle φ2 as the latest roll angle. It is also possible to subtract 180 deg (angular difference judgment means).

The MPU 19 calculates the correction velocity values $(V_x', V_y')$ by rotational coordinate conversion corresponding to a third roll angle φ3 obtained by adding 180 deg to the second roll angle φ2, and outputs them (Step 2008). Thus, in this embodiment, the accuracy of the input apparatus 1 in recognizing the position of the input apparatus 1 is improved, and such display that the pointer 2 moves in an appropriate direction becomes possible.

The threshold value th6 can be set within a range of, for example, 60 deg (=±30 deg) to 90 deg (=±45 deg), though not limited thereto.

In the same manner as in the processing shown in FIG. 43, the processing shown in FIG. 49 may be executed by the control apparatus 40.

Figure 50:
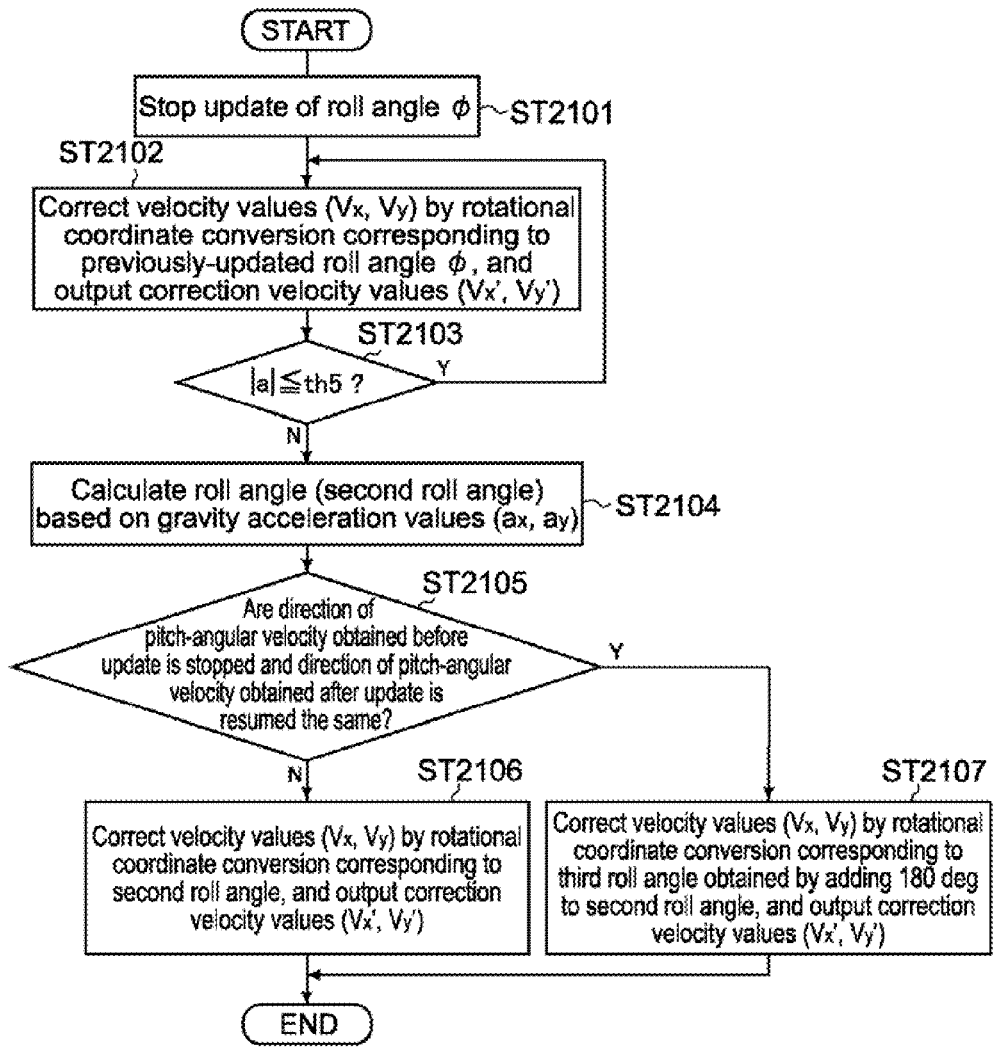
[FIG. 50] A flowchart showing an operation of the processing shown in FIG. 49 according to another embodiment.

FIG. 50 is a flowchart showing an operation of the processing shown in FIG. 49 according to another embodiment.

Processing of Steps 2101 to 2104 is the same as that of Steps 2001 to 2004 of FIG. 49. The MPU 19 judges whether a direction of the angular velocity $\omega_\theta$ in the pitch direction obtained right before the stop of the update of the roll angle φ and a direction of the angular velocity $\omega_\theta$ in the pitch direction obtained right after the start of the update are the same (Step 2105) (angular velocity direction judgment means). In other words, a judgment is made on whether positive/negative of the vector of $\omega_\theta$ is consistent from before the stop of the update of the roll angle φ to after start of the update. Consistency regarding positive/negative of the angular velocity $\omega_\psi$ in the yaw direction may be judged instead of or in addition to the pitch direction.

When it is judged YES in Step 2105, it can be determined that the direction of GY' has changed as shown in FIGS. 15A and 15B since the direction of the angular velocities in the pitch direction is continuous. In this case, the MPU 19 calculates the correction velocity values $(V_x', V_y')$ by the rotational coordinate conversion corresponding to the third roll angle φ3 obtained by adding 180 deg to the second roll angle φ2 and outputs them (Step 2107).

By thus confirming the continuity of the angular velocities $\omega_\theta$ in the pitch direction (or angular velocities $\omega_\psi$ in the yaw direction), accuracy of the input apparatus 1 in recognizing the position of the input apparatus 1 is additionally improved.

In the same manner as in the processing shown in FIG. 19, the processing of FIG. 50 may be executed by the control apparatus 40.

As still another embodiment of the processing of FIGS. 49 and 50, there is the following example. For example, it is judged whether a difference between a combined angular velocity vector amount of the first and second angular velocities obtained when the update of the roll angle φ is stopped (first combined angular velocity vector amount) and the combined angular velocity vector amount obtained when the update of the roll angle is resumed (second combined angular velocity vector amount) is equal to or larger than a threshold value (angular velocity vector judgment means). The combined angular velocity vector amount can be calculated from $[(\omega_\psi)^2 + (\omega_\theta)^2]^{1/2}$. When the difference between the first combined angular velocity vector amount and the second combined angular velocity vector amount is large, it is determined that a positional change is large. When the difference is judged to be equal to or larger than the threshold value, the MPU 19 executes processing similar to that of Steps 2008 and 2107.

The processing of the input apparatus 1 as described above may also be executed by the control apparatus 40.

Figure 51:
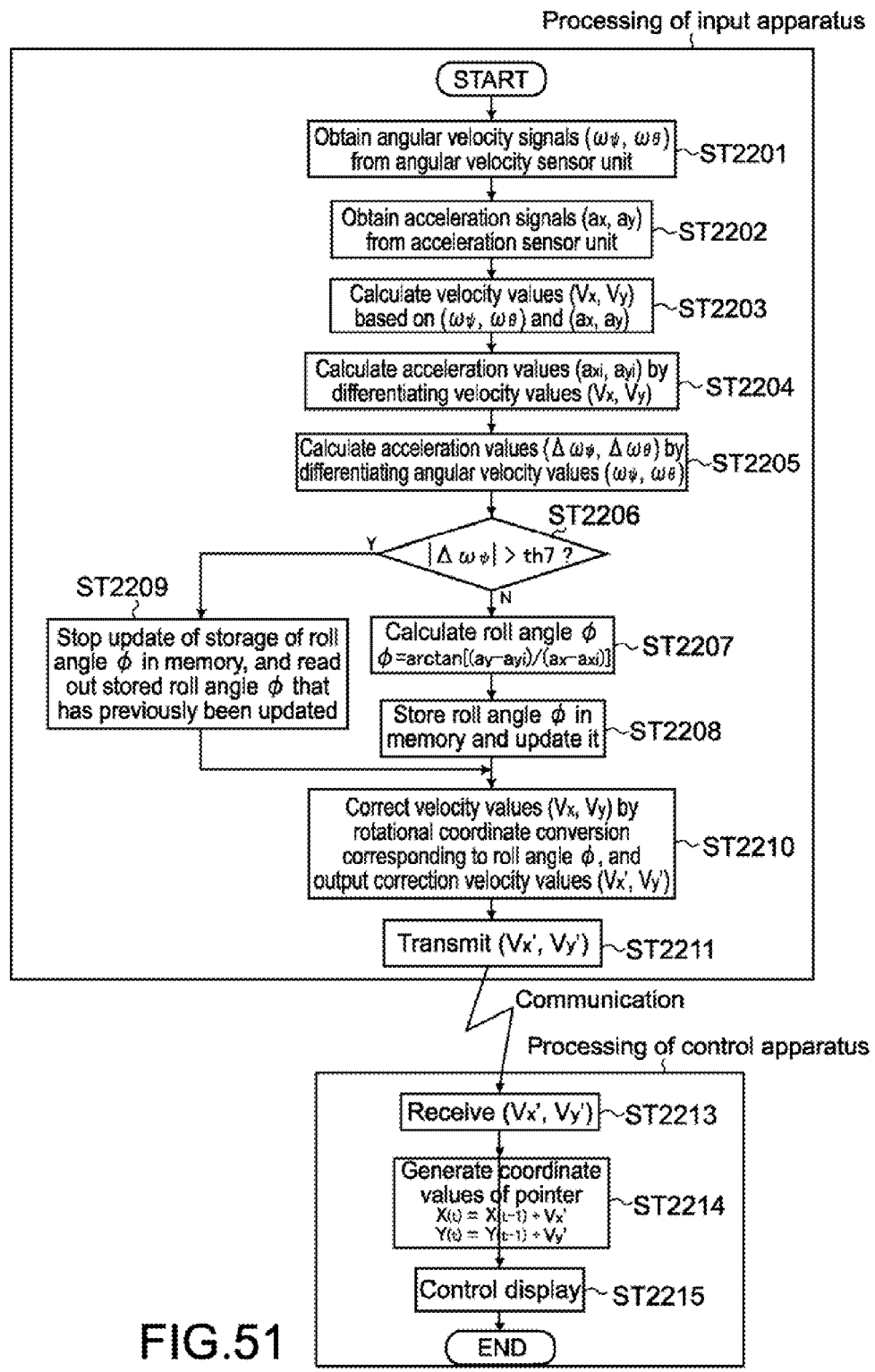
[FIG. 51] A flowchart showing an operation of the control system regarding the operation of removing the effect of the gravity accelerations due to the tilt of the detection surface of the input apparatus from the vertical surface, according to another embodiment.

Next, a still another embodiment of the operation of removing the effect of the gravity acceleration due to the tilt of the detection surface of the input apparatus 1 from the vertical surface will be described. FIG. 51 is a flowchart showing the operation. This embodiment is a method of monitoring the angular acceleration values at the time of calculating the roll angle φ.

Processing of Steps 2201 to 2204 is the same as that of Steps 1101 to 1104.

In Step 2205, the MPU 19 calculates the angular acceleration values $(\Delta\omega_\psi, \Delta\omega_\theta)$ by the differential operation based on the obtained angular velocity values $(\omega_\psi, \omega_\theta)$ (angular velocity differential means).

The MPU 19 judges whether the angular acceleration value $|\Delta\omega_\psi|$ in the yaw direction, for example, among the calculated angular acceleration values in both directions exceeds a threshold value th7 (Step 2206) (judgment means). When exceeding the threshold value th7, the MPU 19 stops the update of the roll angle φ (Step 2209). The reason for performing the processing as described above is as follows.

The angular acceleration value $(\Delta\omega_\theta, \Delta\omega_\psi)$ about the X or Y axis is calculated based on the acceleration value $(a_x, a_y)$ using Equation (4) above. Even when an acceleration is generated in the input apparatus 1 when the user moves the input apparatus 1, it is possible to calculate a desired first allowable acceleration value or second allowable acceleration value for suppressing the calculation error of the roll angle φ that is caused accordingly within an allowable range by using Equation (4). In other words, it is possible to suppress the calculation error of the roll angle φ within the allowable range by setting the threshold value th7 of the angular accelerations.

Figure 21:
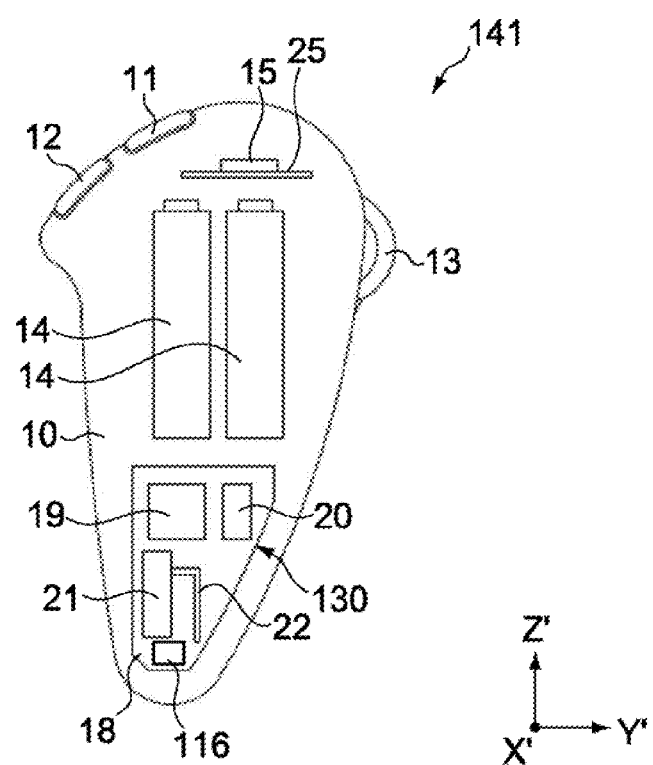
[FIG. 21] A schematic diagram showing a structure of an input apparatus according to another.

FIG. 21 is a schematic diagram showing a structure of an input apparatus according to still another embodiment.

A control unit 130 of an input apparatus 141 includes an acceleration sensor unit 116 disposed at a lower portion of the main substrate 18. The acceleration sensor unit 116 may be one that detects accelerations regarding two axes (X' and Y' axes) or may be one that detects accelerations regarding three axes (X', Y', and Z' axes).

When the user grasps the input apparatus 141, the position at which the acceleration sensor unit 116 is disposed is closer to the wrist than in the case of the input apparatus 1. By disposing the acceleration sensor unit 116 at such a position, the effect of the inertial accelerations generated when the user swings the wrist can be minimized.

Further, by using a triaxial-type acceleration sensor unit 116, for example, although the calculation amount slightly increases, acceleration components within the X'-Y' plane can be extracted regardless of a type of a mounting surface on which the acceleration sensor unit 116 is disposed. As a result, it becomes possible to enhance a degree of freedom in substrate layout.

Figure 22:
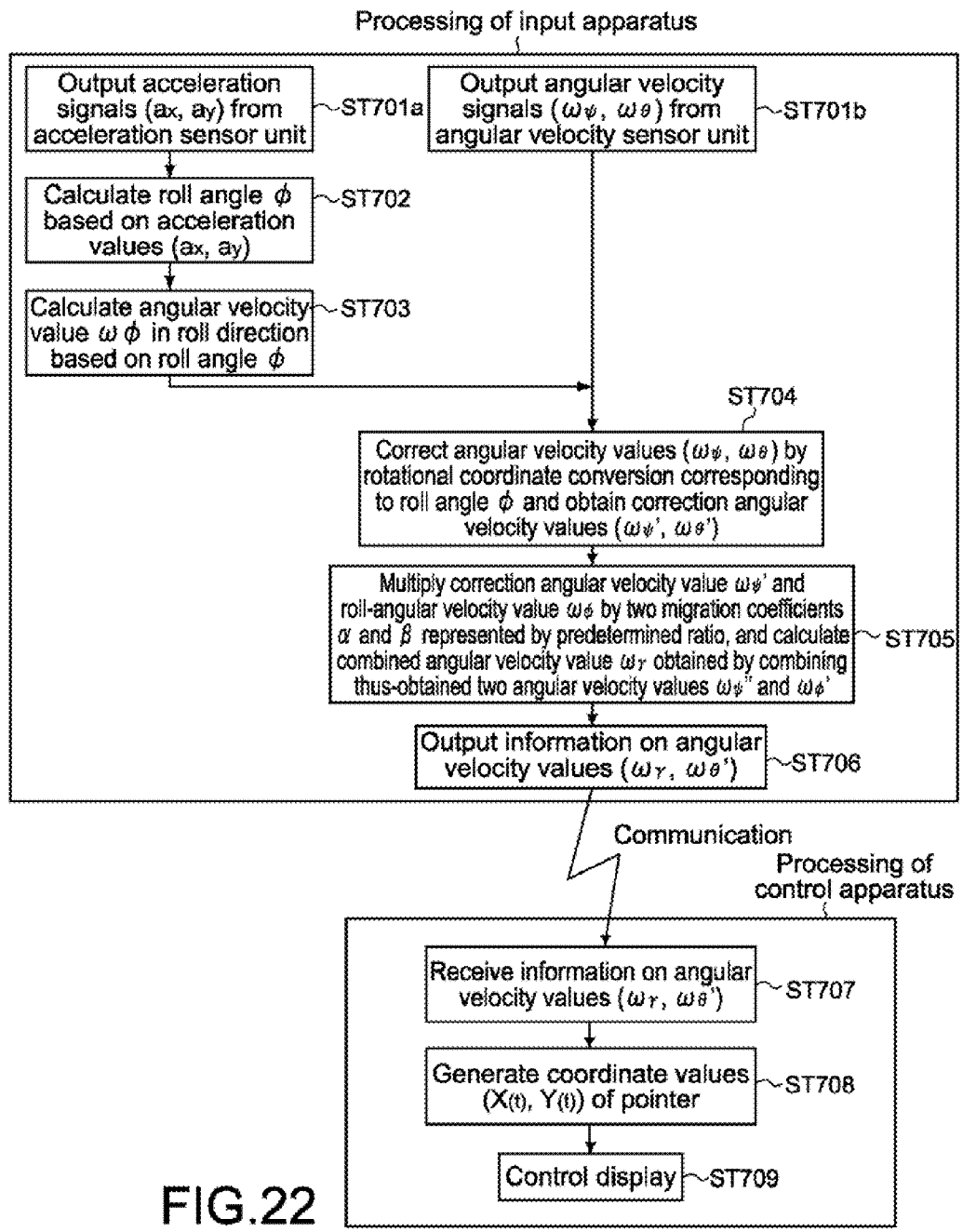
[FIG. 22] A flowchart showing an operation of the control system according to another embodiment.

FIG. 22 is a flowchart showing an operation of the control system according to still another embodiment.

In Steps 701a, 701b, and 702, the MPU 19 executes processing the same as that of Steps 101a, 101b, and 102. Based on the roll angle φ calculated in Step 702, the MPU 19 calculates an angular velocity value $\omega_\phi$ in the roll direction (Step 703).

The angular velocity value $\omega_\phi$ in the roll direction is obtained by temporally differentiating the roll angle φ. The MPU 19 only needs to sample a plurality of roll angles φ and differentiate them, or may output the roll angle φ calculated every predetermined clocks as the angular velocity value $\omega_\phi$ (roll-angular velocity).

The MPU 19 corrects the angular velocity values ($\omega_\psi$, $\omega_\theta$) by rotational coordinate conversion corresponding to the roll angle φ to thus obtain the correction angular velocity values ($\omega_\psi'$, $\omega_\theta'$) (Step 704). The MPU 19 respectively multiplies the correction angular velocity value $\omega_\psi'$ and the roll-angular velocity value $\omega_\phi$ by migration coefficients α and β represented by a predetermined ratio. Values of α and β are arbitrary real numbers or functions and only need to be stored in the ROM or the like or other storage devices. The input apparatus 1 or the control apparatus 40 may include a program with which the user can set α and β. The MPU 19 calculates a combined angular velocity value $\omega_\gamma$ of the two angular velocity values $\omega_\psi''$ and $\omega_\phi'$ respectively obtained by multiplying the migration coefficients α and β (Step 705) (combination calculation means).

As an expression for calculating the combination, an addition expression of Equation (23) is typically used.

$$\omega_\gamma = \omega_\psi'' + \omega_\phi'(=\alpha\omega_\psi + \beta\omega_\phi) \tag{23}$$

The expression for calculating the combination is not limited to Equation (23), and may be $\omega_\psi''*\omega_\phi'$ or $[(\omega_\psi'')^2+(\omega_\phi)^2]^{1/2}$. The MPU 19 outputs, as the input information, information on the thus-obtained combined angular velocity value $\omega_\gamma$ and the correction angular velocity value $\omega_\theta'$ obtained in Step 704 (Step 706)

The combined angular velocity value $\omega_\gamma$ becomes a displacement amount of the pointer 2 on the screen 3 in the X-axis direction, and the correction angular velocity value $\omega_\theta'$ in the pitch direction becomes a displacement amount of the pointer 2 on the screen 3 in the Y-axis direction. In other words, the displacement amounts (dX, dY) of the pointer 2 on both axes can be expressed by Equations (24) and (25) below.

$$dX = \omega_\psi'' + \omega_\phi' = \omega_\gamma \tag{24}$$

$$dY = \omega_\theta'(=\delta\omega_\theta) \text{ (δ is a real number or function)} \tag{25}$$

In Steps 707 to 709, the MPU 35 of the control apparatus 40 executes processing similar to that of Steps 105 to 107 shown in FIG. 10.

The processing of Steps 702 to 706 shown in FIG. 22 may be executed by the control apparatus 40 as in FIG. 12.

As described above, in this embodiment, by at least one of an operation of the user rotating the input apparatus 1 about the Z' axis and an operation of the user moving the input apparatus 1 in the X'-axis direction, the movement of the pointer in the first-axis direction is controlled. Accordingly, not only can the user reduce the movement amount when moving the input apparatus 1 in the X-axis direction, but can also easily move the pointer in the X-axis direction.

Particularly when a horizontally-long screen is used, for example, the user can easily move the pointer 2 in the horizontal direction. Further, because the pointer 2 can be moved in the horizontal direction by the user rotating the input apparatus 1 about the Z axis, intuitional operations become possible.

Figure 23:
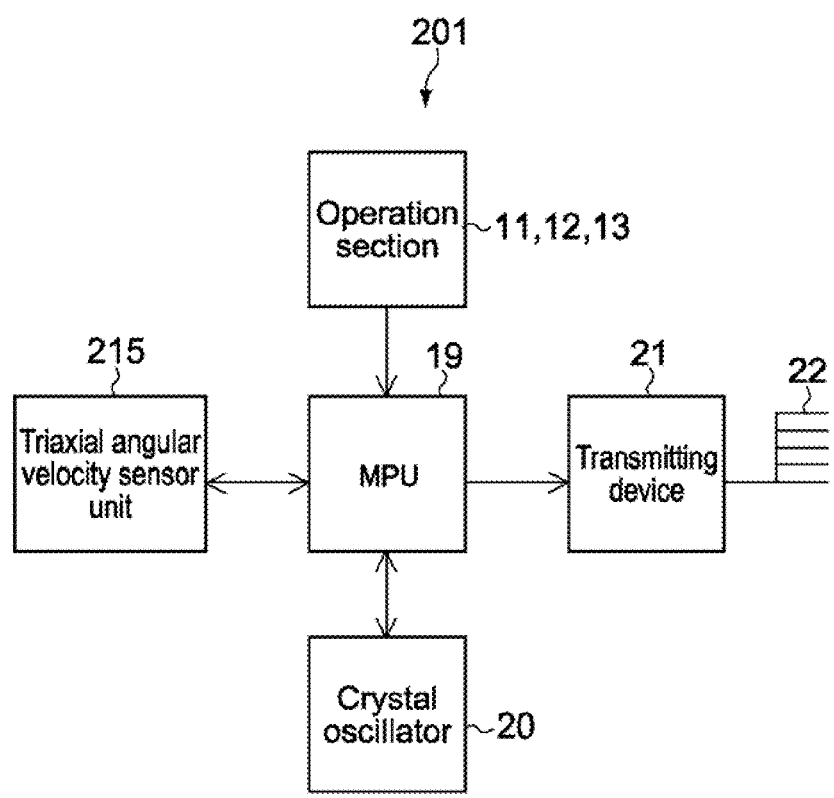
[FIG. 23] A block diagram showing an electrical structure of an input apparatus according to another embodiment.

FIG. 23 is a block diagram showing an electrical structure of an input apparatus according to still another embodiment. An input apparatus 201 is different from the input apparatuses 1, 101, and 141 above in the point of excluding the sensor unit 17 and including a triaxial angular velocity sensor unit 215.

The triaxial angular velocity sensor unit 215 includes an angular velocity sensor for detecting an angular velocity about the X' axis, an angular velocity sensor for detecting an angular velocity about the Y' axis, and an angular velocity sensor for detecting an angular velocity about the Z' axis. Those angular velocity sensors respectively output signals of the angular velocity values ($\omega_\theta$, $\omega_\psi$, $\omega_\phi$).

Figure 24:
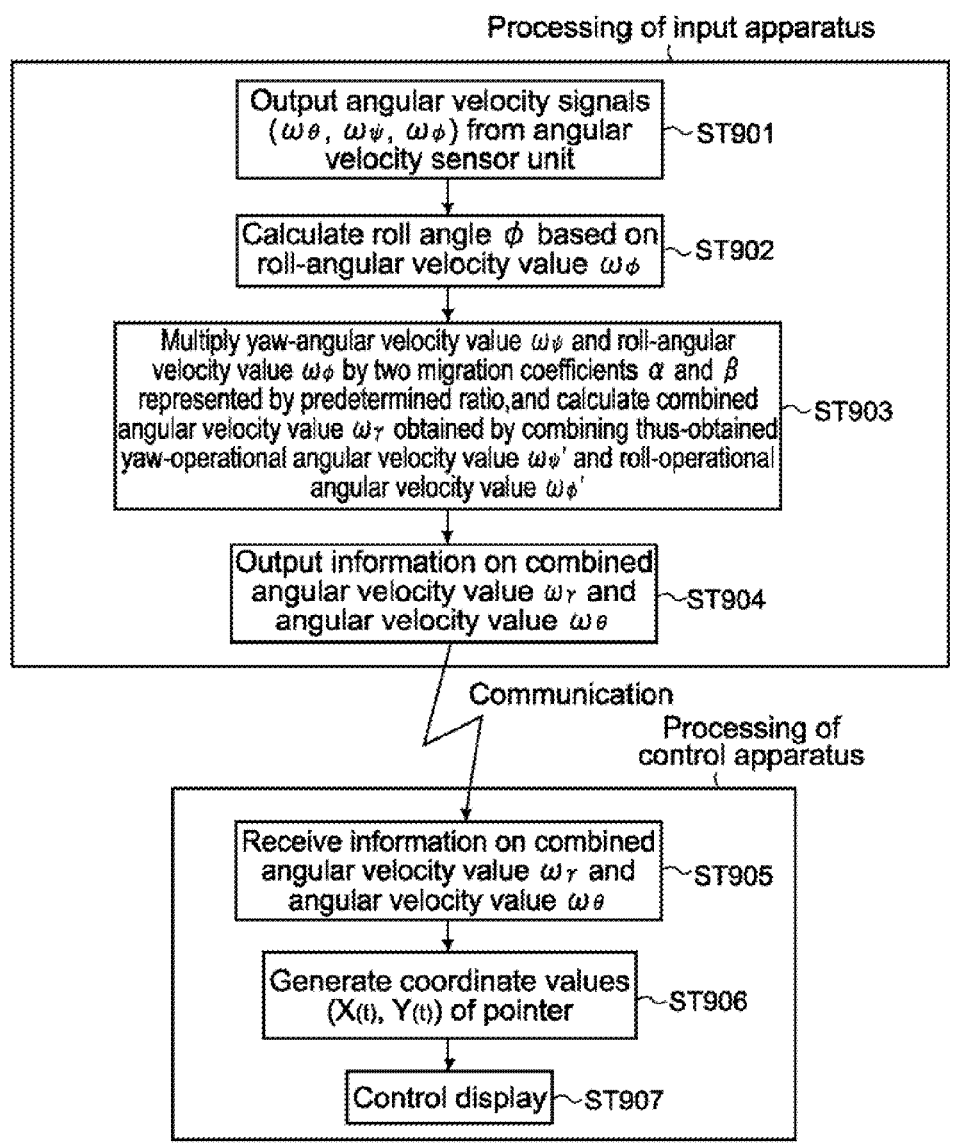
[FIG. 24] A flowchart showing an operation of a control system including the input apparatus shown in FIG. 23.

FIG. 24 is a flowchart showing an operation of the control system including the input apparatus 201. As the control apparatus, the control apparatus 40 shown in the above embodiments only needs to be used.

Triaxial angular velocity signals are output from the angular velocity sensor unit 215 (Step 901), and the MPU 19 obtains angular velocity values ($\omega_\theta$, $\omega_\psi$, $\omega_\phi$) thereof. The MPU 19 calculates the roll angle φ by an integration operation of Equation (26) below (Step 902).

$$\phi = \phi_0 + \int\omega_\phi dt \tag{26}$$

$\phi_0$ represents an initial value of the roll angle.

In the above embodiments, the tilt of the input apparatus 1 in the roll direction has been corrected by means of the rotational coordinate conversion. However, in this embodiment, an integration error occurs when no measure is taken when the initial value $\phi_0$ is generated at the initial position of the input apparatus 201.

As a practical and simple method of removing integration errors in Equation (26), there is the following method.

For example, a reset button (not shown) is provided to the input apparatus 201. The reset button is typically a button provided separate from the buttons 11 and 12 and the wheel button 13. While the user is pressing the reset button, the control apparatus 40 controls display so that the pointer 2 moves on the screen in accordance with the operation of the input apparatus 201. Alternatively, from immediately after the user presses the reset button to before the user re-presses the reset button next, the control apparatus 40 controls display so that the pointer 2 moves on the screen in accordance with the operation of the input apparatus 201. Specifically, pressing of the reset button is set as a trigger for starting the operation for reducing integration errors.

Here, immediately after the trigger is put into effect, the MPU 19 or the MPU 35 of the control apparatus 40 resets $\phi_0$ and φ to 0 (reset means). Alternatively, Equation (26) does not need to include the term of $\phi_0$ in the first place.

By this method, integration errors are practically not spread because φ is reset to 0 every time one operation is made to the input apparatus 201 (a time during which the user is pressing the reset button or a period from immediately after the pressing to the next pressing).

In this case, the user needs to be careful to hold the input apparatus 201 at nearly the reference position at the time of pressing the reset button, but difficulty thereof is low and can be easily mastered.

It should be noted that instead of the structure provided with the reset button, the MPU 19 of the input apparatus 201 or the MPU 35 of the control apparatus 40 may perform the reset under a predetermined condition. An example of the predetermined condition is a case where the input apparatus 201 is in the reference position. It is only necessary that the acceleration sensor unit 16 or the like be provided for detecting that the input apparatus 201 is in the reference position.

After Step 902, the MPU 19 calculates the combined angular velocity value $\omega_\gamma$ of the yaw-angular velocity value $\omega_\psi'$ and the roll-operational angular velocity value $\omega_\phi'$, which are obtained by respectively multiplying the yaw-angular velocity value $\omega_\psi$ and the roll-angular velocity $\omega_\phi$ by the predetermined migration coefficients α and β (Step 903). The MPU 19 outputs, as the input information, information on the calculated combined angular velocity value $\omega_\gamma$ and the pitch-angular velocity value $\omega_\theta$ obtained from the angular velocity sensor unit 215 (Step 904).

The control apparatus 40 receives the input information (Step 905), generates coordinate values of the pointer 2 in accordance therewith (Step 906), and controls display of the pointer 2 (Step 907).

The processing of Steps 902 to 904 shown in FIG. 24 may be executed by the control apparatus 40 as in FIG. 12.

Figure 25:
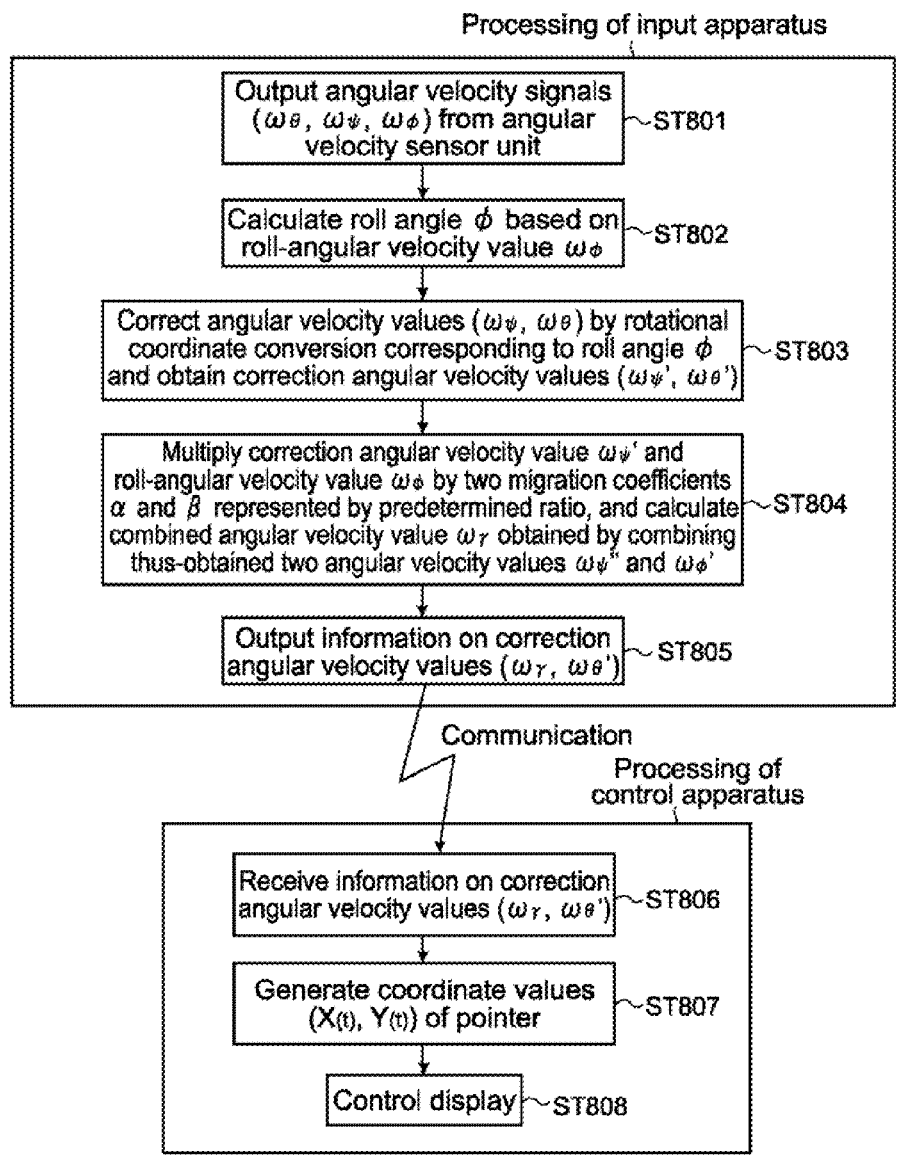
[FIG. 25] A flowchart showing an operation of the processing shown in FIG. 24 according to another embodiment.

FIG. 25 is a flowchart showing an operation of the processing of FIG. 24 according to another embodiment.

Triaxial angular velocity signals are output from the angular velocity sensor unit 215 (Step 801), and the MPU 19 obtains the angular velocity values ($\omega_\theta$, $\omega_\psi$, $\omega_\phi$) thereof. The MPU 19 calculates the roll angle φ using Equation (27) below (Step 802).

$$\phi = \int \omega_\phi dt \tag{27}$$

The MPU 19 executes processing the same as that of Steps 704 to 706 shown in FIG. 22 (Steps 803 to 805), and the MPU 35 of the control apparatus 40 executes processing the same as that of Steps 707 to 709 (Steps 806 to 808).

Although an integration error occurs in Equation (27), it is of no problem since the rotational coordinate conversion corresponding to the roll angle φ is executed in Step 803. Moreover, the initial value $\phi_0$ of the roll angle in Equation (26) is also removed by carrying out the rotational coordinate conversion.

The processing of Steps 802 to 805 shown in FIG. 25 may be executed by the control apparatus 40 as in FIG. 12.

Next, another embodiment of the input apparatus will be described.

Figure 26:
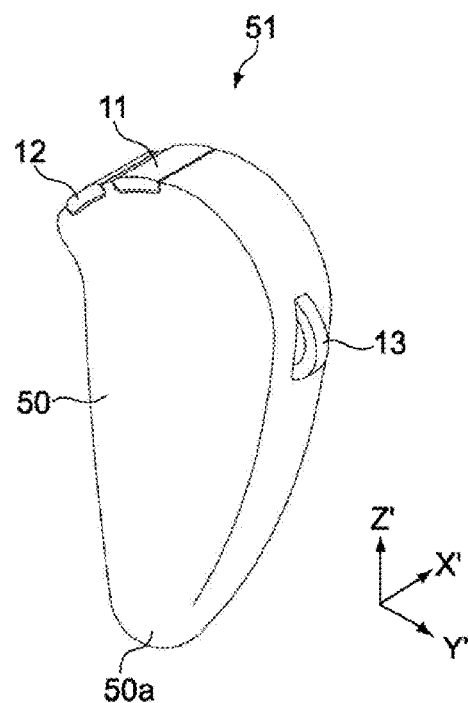
[FIG. 26] A perspective diagram showing an input apparatus according to another embodiment.
Figure 27:
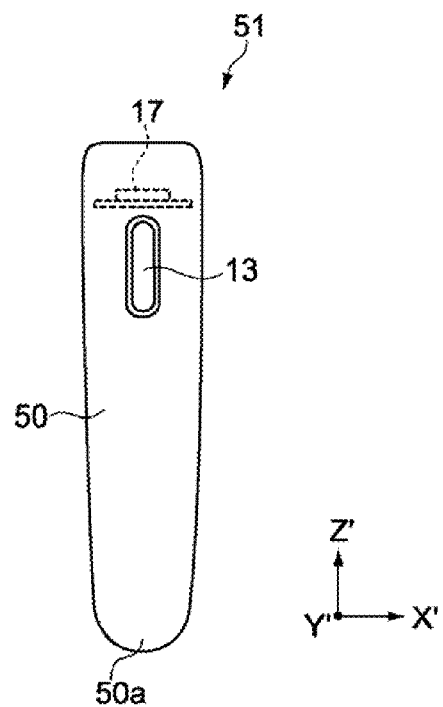
[FIG. 27] A side view of the input apparatus shown in FIG. 26 seen from a rotary button side.

FIG. 26 is a perspective diagram showing an input apparatus 51. FIG. 27 is a side view of the input apparatus 51 seen from the wheel button 13 side. In descriptions below, descriptions on components, functions, and the like similar to those of the input apparatus 1 according to the embodiments shown in FIG. 2 and the like will be simplified or omitted, and points different therefrom will mainly be described.

A casing 50 of the input apparatus 51 includes a partial sphere or partial quadric surface 50a at a predetermined position on a surface of the casing 50. Hereinafter, the partial sphere or partial quadric surface (50a) will be referred to as "lower curved surface" (50a) for convenience.

The lower curved surface 50a is provided at a position almost opposite to the buttons 11 and 12, that is, a position where, when the user holds the input apparatus 51, a pinky is located closer to the lower curved surface 50a than other fingers. Alternatively, in a case where, in the casing 50 elongated in one direction (Z'-axis direction), the sensor unit 17 is provided on a positive side of the Z' axis with respect to a longitudinal center of the casing 50 in the Z'-axis direction, the lower curved surface 50a is provided on a negative side of the Z' axis.

Typically, the partial sphere is substantially a hemisphere, but does not necessarily have to be a hemisphere. The quadric surface is a curved surface obtained by expanding a 2-dimensional conic curve (quadric curve) into a 3-dimensional conic curve. Examples of the quadric surface include an ellipsoid surface, an ellipsoid paraboloid surface, and a hyperbolic surface.

Figure 28:
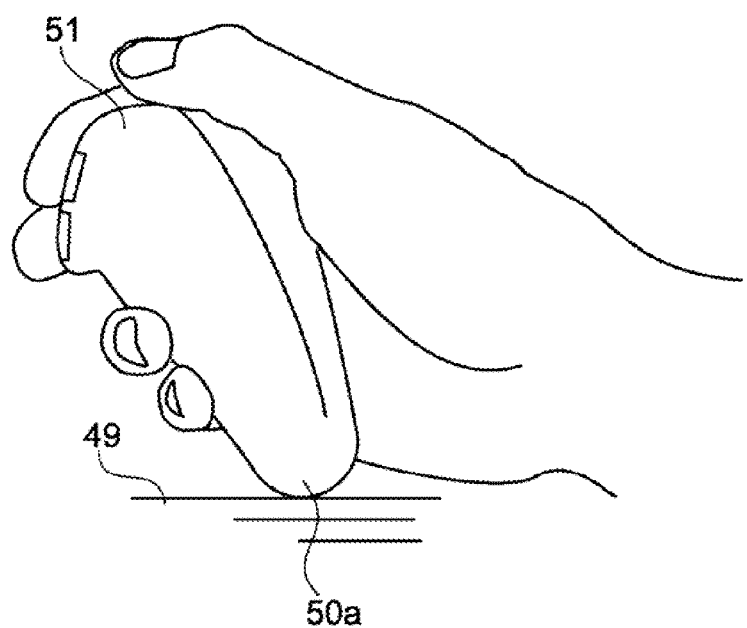
[FIG. 28] A diagram showing a state where the user operates the input apparatus while a lower curved surface thereof is in contact with a knee.

With the configuration of the casing 50 of the input apparatus 51 as described above, the user can easily operate the input apparatus 51 while causing the lower curved surface 50a of the input apparatus 51 as a fulcrum to abut on an abutment target object 49 such as a table, a chair, a floor, or a knee or thigh of a user. That is, even in the state where the lower curved surface 50a of the input apparatus 51 is abutted on the abutment target object 49, the user can easily tilt the input apparatus 51 in diverse angles, thereby enabling delicate operations such as placing the pointer on the icon. FIG. 28 is a diagram showing the state where the user operates the input apparatus 51 while causing the lower curved surface 50a to abut on the knee.

Alternatively, in this embodiment, erroneous operations due to a shake of a hand, which cannot be suppressed by a shake correction circuit, can be prevented from occurring, and the user is free from fatigue that is caused when the user keeps holding the input apparatus 51 in the air to operate it.

Figure 29:
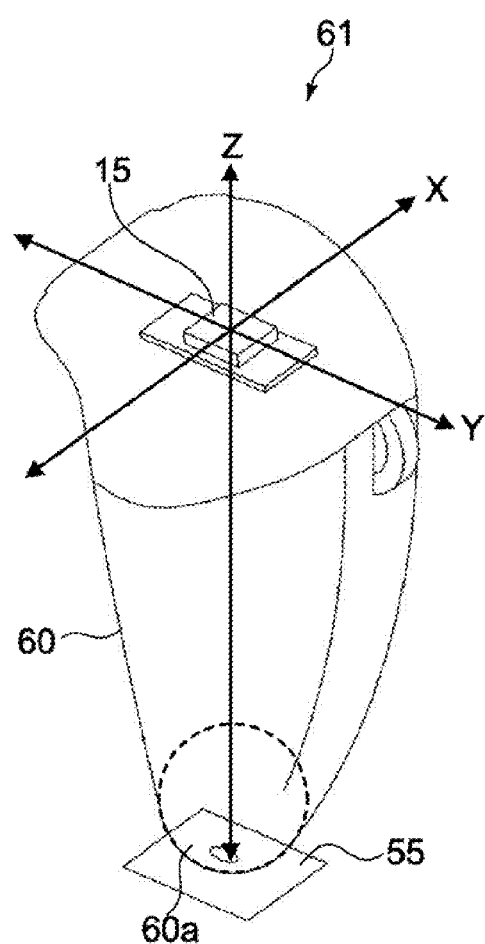
[FIG. 29] A perspective diagram showing an input apparatus according to another embodiment.

FIG. 29 is a perspective diagram of an input apparatus according to still another embodiment.

A casing 60 of an input apparatus 61 includes, similar to the input apparatus 51 shown in FIGS. 26 and 27, a lower curved surface 60a constituted of a partial sphere. A plane that is perpendicular to a maximum length direction (Z'-axis direction) of the casing 60 of the input apparatus 61 and is in contact with the lower curved surface 60a (hereinafter, referred to as "lower end plane 55" for convenience) is substantially parallel to a plane formed by the X axis and the Y axis (see FIG. 8) as the detection axes of the angular velocity sensor unit 15 (X-Y plane).

With the structure of the input apparatus 61 as described above, in a case where an operation is made by the user while the lower curved surface 60a is abutted on the lower end plane 55, angular velocities applied to the input apparatus 61 are input to the angular velocity sensor unit 15 as they are. Thus, an amount of calculation required to obtain detection values from the detection signals from the angular velocity sensor unit 15 can be reduced.

Figure 30:
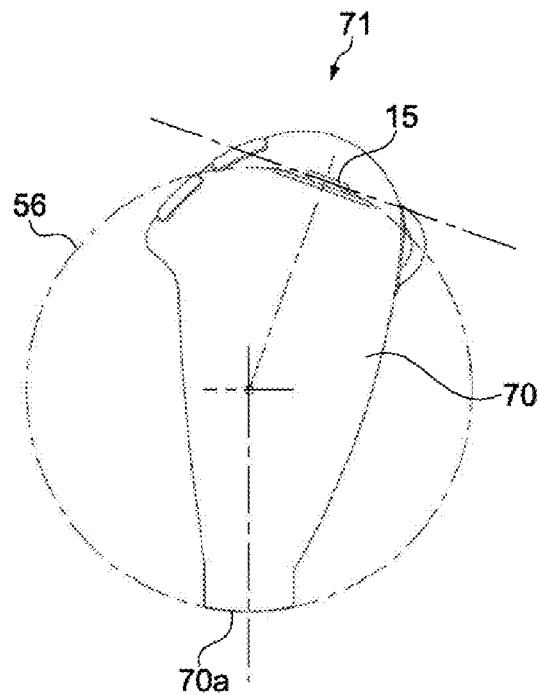
[FIG. 30] A front view showing an input apparatus according to another embodiment.
Figure 31:
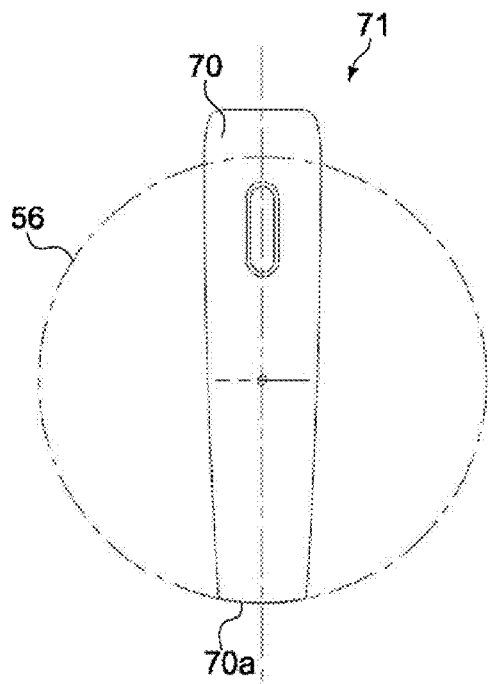
[FIG. 31] A side view showing the input apparatus shown in FIG. 30.

FIG. 30 is a front view showing an input apparatus according to yet another embodiment. FIG. 31 is a side view showing the input apparatus.

A lower curved surface 70a of a casing 70 of an input apparatus 71 is, for example, a partial sphere. The lower curved surface 70a is set with a larger curvature radius than the lower curved surfaces 50a and 60a of the input apparatuses 51 and 61 respectively shown in FIGS. 26 and 29. The angular velocity sensor unit 15 is provided at a position at which a straight line contained in the X-Y plane formed by the X axis and the Y axis as the detection axes of the angular velocity sensor unit 15 corresponds to a tangent line of a virtually-drawn circle 56 that passes the partial sphere when seen from the X- and Y-axis directions. As long as the conditions as described above are satisfied, the angular velocity sensor unit 15 may be arranged in the casing 70 such that the X-Y plane of the angular velocity sensor unit 15 is tilted with respect to a longitudinal direction of the input apparatus 71 (see FIG. 30).

Accordingly, because a direction of the vector of the angular velocity generated when the user operates the input apparatus 71 while abutting the lower curved surface 70*a* thereof on the abutment target object 49 and the detection direction of the angular velocity sensor unit 15 match, a linear input is thus enabled.

Figure 32:
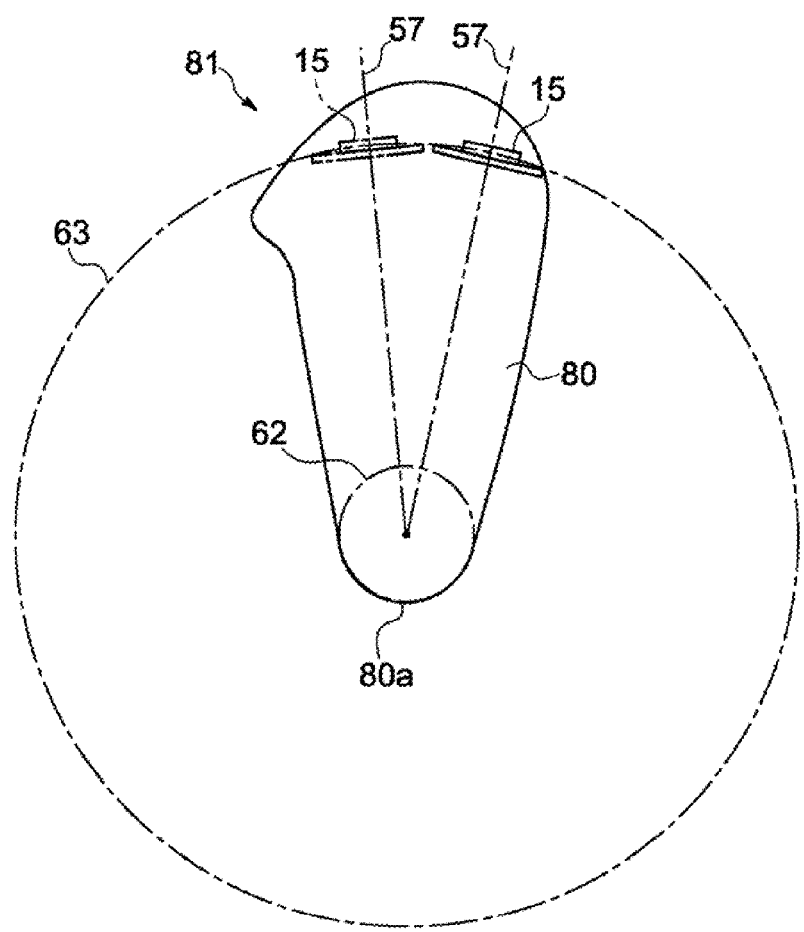
[FIG. 32] A front view of an input apparatus according to another embodiment.

FIG. 32 is a front view of an input apparatus according to still another embodiment.

A sphere as a lower curved surface 80*a* of a casing 80 of an input apparatus 81 has a curvature radius the same as or close to that shown in FIG. 29, for example. Regarding the angular velocity sensor unit 15, a virtual straight line that passes an intersection of the X axis and the Y axis, which is a center point of the angular velocity sensor unit 15, and is orthogonal to the X axis and the Y axis passes a center point O of a first sphere 62 including the lower curved surface 80*a*. With the structure as described above, the first sphere 62 including the lower curved surface 80*a* and a second sphere 63 in which the straight line contained in the X-Y plane of the angular velocity sensor unit 15 becomes a tangent line are arranged concentrically. Therefore, the input apparatus 81 bears the same effect as the input apparatus 71 shown in FIG. 30.

It should be noted that the input apparatus 51, 61, 71, or 81 including the partial sphere or the partial quadric surface described above does not necessarily need to be operated by the user while the lower curved surface 50*a*, 60*a*, 70*a*, or 80*a* thereof is abutted against the abutment target object 49, and may of course be operated in air.

The input apparatus 51, 61, 71, or 81 shown in FIGS. 26 to 32 may be applied to the input apparatus 141 shown in FIG. 21 and the processing executed by the input apparatus 141, or may be applied to the input apparatus 201 having the structure shown in FIG. 23 and the processing executed by the input apparatus 201.

Various other embodiments are also possible.

Figure 35:
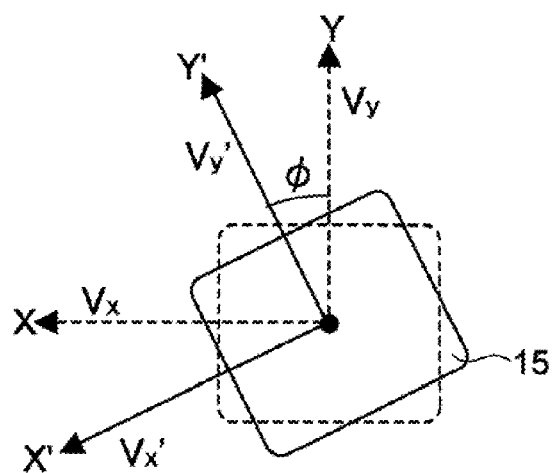
[FIG. 35] An expression and an explanatory diagram of the rotational coordinate conversion.
Figure 54:
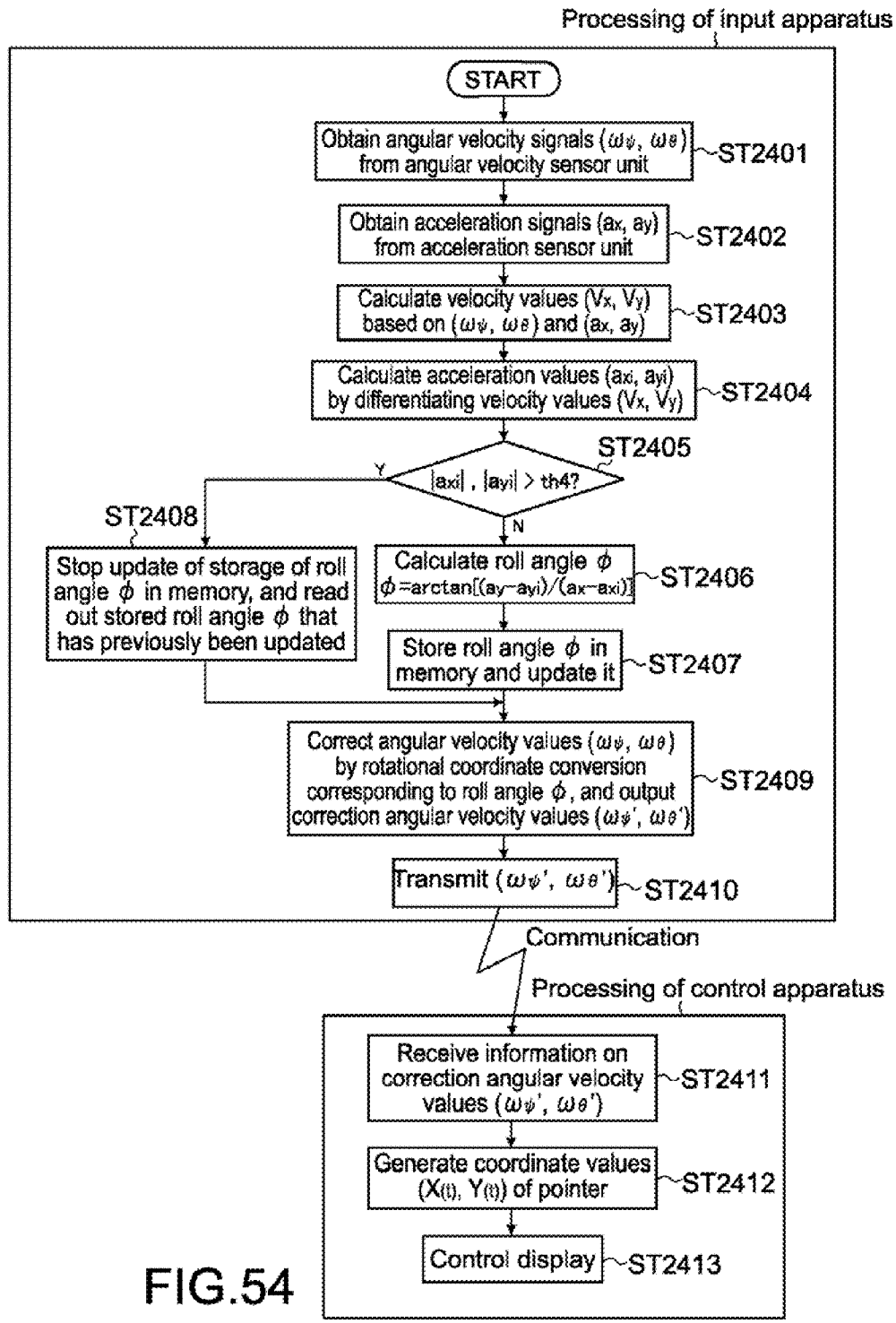
[FIG. 54] A flowchart showing a modification of the processing shown in FIG. 44 in a case where "angular velocity values" are corrected by the rotational coordinate conversion.

When obtaining the operational acceleration values ($a_{xi}$, $a_{yi}$) as shown in the embodiments corresponding to FIGS. 44, 45, and 48 to 52, the "velocity values" have been corrected by the rotational coordinate conversion using Equation (5) shown in FIG. 35, for example. However, even when obtaining the operational acceleration values ($a_{xi}$, $a_{yi}$), it is also possible to correct the "angular velocity values" by the rotational coordinate conversion using Equation (3) shown in FIG. 11 and convert those correction angular velocity values into the velocity values, as described in FIGS. 10, 12, and the like. FIG. 54 is a flowchart showing a modification of the processing shown in FIG. 44, and shows a case where the "angular velocity values" are corrected by the rotational coordinate conversion (see Step 2409 in particular). This is not limited to FIG. 44, and the same holds true for the processing shown in FIGS. 45 and 48 to 52.

Regarding the sensor unit 17 described in the above embodiments, the descriptions have been given on the case where the detection axes of the X' axis and the Y' axis of the angular velocity sensor unit 15 and the detection axes of the X' axis and the Y' axis of the acceleration sensor unit 16 respectively match each other. However, the detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses a trigonometric function.

In FIG. 14, the accelerations have been the target of the judgment processing in Step 304, and the predetermined processing has been stopped when the absolute value of the accelerations is equal to or smaller than the threshold value Th1. Instead, a switch for the user to make a switch between stop and resumption of the predetermined processing may be provided to the input apparatus 1, for example. Examples of the switch include a mechanical DIP switch, a push-button-type switch, and a switch that uses a sensor. An electric sensor, a magnetic sensor, an optical sensor, and the like are conceivable as the sensor. For example, when the switch is an ON/OFF-type push button, it is also possible that the processing carried out by the information output means is stopped when the user presses the button, and the processing is resumed when the user presses the button again. Alternatively, a form in which the processing is stopped (or the processing is executed) while the user is pressing the button is also possible.

Alternatively, as means for switching stop and resumption of the predetermined processing, the input apparatus or the control apparatus may include software that uses a GUI. For example, the stop and resumption of the predetermined processing may be switched by using a switch displayed on the screen, or other GUIs.

The detection axes of each of the angular velocity sensor unit 15 and the acceleration sensor unit 16 of the sensor unit 17 do not necessarily need to be mutually orthogonal like the X' axis and the Y' axis above. In this case, the accelerations respectively projected in the mutually-orthogonal axial directions can be obtained by the calculation that uses the trigonometric function. Similarly, the angular velocities about the mutually-orthogonal axes can be obtained by the calculation that uses the trigonometric function.

In the flowcharts shown in FIGS. 10, 12, 14, 20, 22, 24, 25, 44, 45, and 48 to 52, a part of the processing of the input apparatus 1 may be carried out by the control apparatus or a part of the processing of the control apparatus may be carried out by the input apparatus while the input apparatus and the control apparatus are communicating with each other.

The input apparatus 1 described above includes the acceleration sensor unit 16 and the angular velocity sensor unit 15. However, an input apparatus that includes an angle sensor and an angular velocity sensor for realizing the processing shown in FIGS. 22, 24, and 25 is also possible. The angle sensor includes two angle sensors for detecting an angle (first angle) θ about the X' axis (first axis) shown in FIG. 33A and an angle (third angle) φ about the Z' axis shown in FIG. 33B. θ is an angle of the X'-Y' plane from the vertical axis. As a matter of course, the input apparatus may include triaxial angle sensors for also detecting an angle (second angle) about the Y' axis (second axis).

Figure 33A:
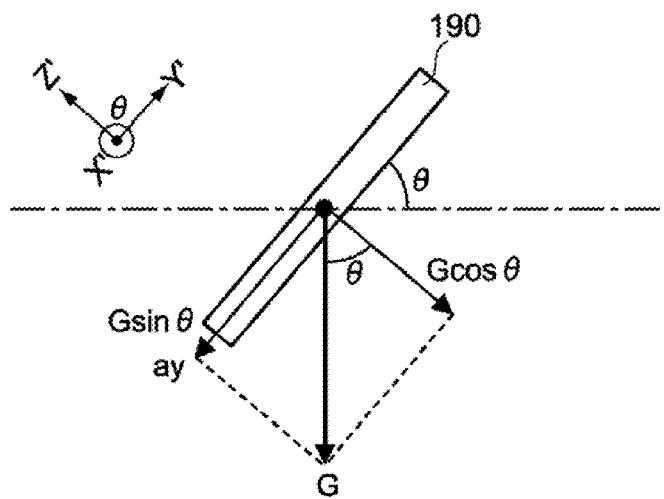
[FIG. 33] Diagrams for illustrating a principle of an angle sensor.
Figure 33B:
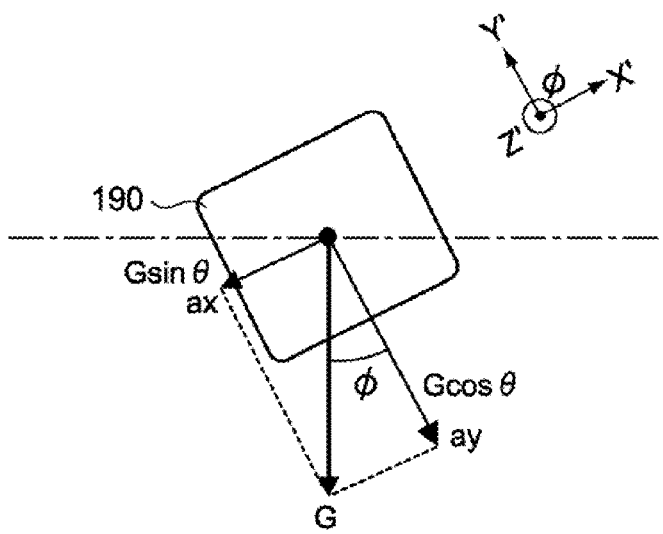

The angle sensor is constituted of the acceleration sensor unit 16 in the case of two axes. As shown in FIG. 33A G*sin θ as a Y'-direction component of the gravity acceleration G is an acceleration value $a_y$ in the Y'-axis direction, which is used to obtain θ. Moreover, as shown in FIG. 33B, regarding the angle about the Z' axis, φ can be obtained from G*cos φ=$a_y$ or G*sin φ=$a_x$ (acceleration value of X'-direction component). Thus, by calculating the angles θ and φ, $\omega_\theta$ and $\omega_\phi$ are calculated through the differential operation (differential means). In this case, the angular velocity ψ about the Y'-axis can be obtained directly from the angular velocity sensor.

Alternatively, it is also possible to calculate only one of the angles θ and φ by the angle sensor, like only the angle θ (or φ), and calculate $\omega_\theta$ (or $\omega_\phi$) by the differential operation. In this case, $\omega_\phi$ (or $\omega_\theta$) and $\omega_\psi$ can be obtained directly from the angular velocity sensors.

Even when the input apparatus includes the angle sensor as described above, it is possible for the input apparatus or the control apparatus to carry out the rotational coordinate conversion processing corresponding to the roll angle φ, the multiplication processing using the migration coefficients α and β, and the combination operation processing of the two angular velocities obtained accordingly.

Instead of or in addition to the acceleration sensor, the angle sensor may be constituted of a geomagnetic sensor (uniaxial or biaxial) or an image sensor.

The angle sensor or the angular acceleration sensor may be used instead of the angular velocity sensor unit 15. Change amounts of the angle values are detected when using, for example, a triaxial geomagnetic sensor as the angle sensor. Thus, in this case, a differential operation is performed on the angle values to thus obtain the angular velocity values. The angular acceleration sensor is constituted as a combination of a plurality of acceleration sensors, and the angular velocity values are obtained by performing an integration operation on the angular acceleration values obtained by the angular acceleration sensor.

As the method of calculating the velocity values ($V_x$, $V_y$), there is a method in which the MPU 19 obtains the velocity values by integrating the acceleration values ($a_x$, $a_y$), and uses the angular velocity values ($\omega_\psi$, $\omega_\theta$) as an adjunct of the integration operation, for example. In contrast, there is a method in which the MPU 19 obtains the velocity values corresponding to the angular velocity values ($\omega_\psi$, $\omega_\theta$) by an operation or a lookup table, and uses the acceleration values as an adjunct of that operation, for example.

Alternatively, the MPU 19 obtains the radius gyrations ($R_\psi$, $R_\theta$) of the movement of the casing 10 by dividing the acceleration values ($a_x$, $a_y$) by the differential values ($\Delta\omega_\psi$, $\Delta\omega_\theta$) of the angular velocity values ($\omega_\psi$, $\omega_\theta$), respectively. The velocity values ($V_x$, $V_y$) are obtained by multiplying the radius gyrations ($R_\psi$, $R_\theta$) by the angular velocity values ($\omega_\psi$, $\omega_\theta$).

Alternatively, it is also possible to provide, as the movement sensor, the acceleration sensor unit 16 while excluding the angular velocity sensor unit 15, and calculate the velocity values ($V_x$, $V_y$) by simply integrating the acceleration values ($a_x$, $a_y$). On the contrary, it is also possible to provide, as the movement sensor, the angular velocity sensor unit 15 while excluding the acceleration sensor unit 16, and calculate the velocity values ($V_x$, $V_y$) corresponding to the angular velocity values ($\omega_\psi$, $\omega_\theta$) by an operation or a lookup table.

The input apparatuses according to the above embodiments have transmitted the input information to the control apparatus wirelessly. However, the input information may be transmitted by wire.

The embodiments may be applied to a handheld information processing apparatus (handheld apparatus) that includes a display section, for example. In this case, the pointer displayed on the display section moves when the user moves a main body of the handheld apparatus. Examples of the handheld apparatus include a PDA (Personal Digital Assistance), a cellular phone, a portable music player, and a digital camera.

In the above embodiments, the pointer 2 that moves on the screen in accordance with the movement of each of the input apparatuses and the like has been represented as an image of an arrow. However, the image of the pointer 2 is not limited to the arrow and may be a simple circle, square, or the like, or a character image or any other images.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An input apparatus comprising:
   a first acceleration sensor to detect a first acceleration in a direction along a first axis;
   a second acceleration sensor to detect a second acceleration in a direction along a second axis different from the direction along the first axis;
   a first angular velocity sensor to detect a first angular velocity about the second axis;
   a second angular velocity sensor to detect a second angular velocity about the first axis;
   an angle calculation means for calculating, based on the first acceleration and the second acceleration, an angle about a third axis that has a predetermined angle with respect to an acceleration detection surface including the first axis and the second axis, the angle being formed between a combined acceleration vector of the first acceleration and the second acceleration and the second axis; and
   an information output means for correcting the first angular velocity and the second angular velocity by rotational coordinate conversion corresponding to the calculated angle, and outputting information on a first correction angular velocity and a second correction angular velocity obtained by the correction.

2. A control apparatus for controlling a UI displayed on a screen in accordance with input information output from an input apparatus including a first acceleration sensor to detect a first acceleration in a direction along a first axis, a second acceleration sensor to detect a second acceleration in a direction along a second axis different from the direction along the first axis, a first angular velocity sensor to detect a first angular velocity about the second axis, and a second angular velocity sensor to detect a second angular velocity about the first axis, the control apparatus comprising:
   a reception means for receiving, as the input information, information on the first acceleration, the second acceleration, the first angular velocity, and the second angular velocity;
   an angle calculation means for calculating, based on the received first acceleration and the second acceleration, an angle about a third axis that has a predetermined angle with respect to an acceleration detection surface including the first axis and the second axis, the angle being formed between a combined acceleration vector of the first acceleration and the second acceleration and the second axis;
   an information output means for correcting the received first angular velocity and second angular velocity by rotational coordinate conversion corresponding to the calculated angle, and outputting information on a first correction angular velocity and a second correction angular velocity obtained by the correction; and a coordinate information generation means for generating coordinate information of the UI on the screen that corresponds to the first correction angular velocity and the second correction angular velocity.

3. A method for controlling a UI on a screen in accordance with a movement of an input apparatus, the method comprising:

detecting a first acceleration of the input apparatus in a direction along a first axis;

detecting a second acceleration of the input apparatus in a direction along a second axis different from the direction along the first axis;

detecting a first angular velocity of the input apparatus about the second axis;

detecting a second angular velocity of the input apparatus about the first axis;

calculating, as an angle, based on the first acceleration and the second acceleration, an angle about a third axis that has a predetermined angle with respect to an acceleration detection surface including the first axis and the second axis, the angle being formed between a combined acceleration vector of the first acceleration and the second acceleration and the second axis;

correcting the first angular velocity and the second angular velocity by rotational coordinate conversion corresponding to the calculated angle, and outputting information on a first correction angular velocity and a second correction angular velocity obtained by the correction; and generating coordinate information of the UI on the screen that corresponds to the first correction angular velocity and the second correction angular velocity.

4. An input apparatus comprising:

a first acceleration sensor to detect a first acceleration in a direction along a first axis;

a second acceleration sensor to detect a second acceleration in a direction along a second axis different from the direction along the first axis;

a first angular velocity sensor to detect a first angular velocity about the second axis;

a second angular velocity sensor to detect a second angular velocity about the first axis;

a velocity calculation means for calculating, based on the first acceleration value, the second acceleration value, the first angular velocity value, and the second angular velocity value, a first velocity value in the direction along the first axis and a second velocity value in the direction along the second axis;

a differential operation means for calculating a first operational acceleration value and a second operational acceleration value by differentiating the first velocity value and the second velocity value, respectively;

an angle calculation means for calculating, based on a value obtained by subtracting the first operational acceleration value from the first acceleration value and a value obtained by subtracting the second operational acceleration value from the second acceleration value, an angle about a third axis that has a predetermined angle with respect to an acceleration detection surface including the first axis and the second axis, the angle being formed between a combined acceleration vector of the first acceleration and the second acceleration and the second axis; and an information output means for correcting the first velocity value and the second velocity value by rotational coordinate conversion corresponding to the calculated angle, and outputting information on a first correction velocity value and a second correction velocity value obtained by the correction.

5. A control apparatus controlling a UI displayed on a screen in accordance with input information transmitted from an input apparatus including a first acceleration sensor to detect a first acceleration in a direction along a first axis, a second acceleration sensor to detect a second acceleration in a direction along a second axis different from the direction along the first axis, a first angular velocity sensor to detect a first angular velocity about the second axis, and a second angular velocity sensor to detect a second angular velocity about the first axis, the control apparatus comprising:

a reception means for receiving, as the input information, information on the first acceleration value, the second acceleration value, the first angular velocity value, and the second angular velocity value;

a velocity calculation means for calculating, based on the first acceleration value, the second acceleration value, the first angular velocity value, and the second angular velocity value that have been received, a first velocity value in the direction along the first axis and a second velocity value in the direction along the second axis;

a differential operation means for calculating a first operational acceleration value and a second operational acceleration value by differentiating the first velocity value and the second velocity value, respectively;

an angle calculation means for calculating, based on a value obtained by subtracting the first operational acceleration value from the first acceleration value and a value obtained by subtracting the second operational acceleration value from the second acceleration value, an angle about a third axis that has a predetermined angle with respect to an acceleration detection surface including the first axis and the second axis, the angle being formed between a combined acceleration vector of the first acceleration and the second acceleration and the second axis;

an information output means for correcting the first velocity value and the second velocity value by rotational coordinate conversion corresponding to the calculated angle, and outputting information on a first correction velocity value and a second correction velocity value obtained by the correction; and a coordinate information generation means for generating coordinate information of the UI on the screen that corresponds to the first correction velocity value and the second correction velocity value.

6. A control method comprising:

detecting a first acceleration of an input apparatus in a direction along a first axis;

detecting a second acceleration of the input apparatus in a direction along a second axis different from the direction along the first axis;

detecting a first angular velocity of the input apparatus about the second axis;

detecting a second angular velocity of the input apparatus about the first axis;

calculating, based on the first acceleration value, the second acceleration value, the first angular velocity value, and the second angular velocity value, a first velocity value in the direction along the first axis and a second velocity value in the direction along the second axis;

calculating a first operational acceleration value and a second operational acceleration value by differentiating the first velocity value and the second velocity value, respectively;

calculating, based on a value obtained by subtracting the first operational acceleration value from the first acceleration value and a value obtained by subtracting the second operational acceleration value from the second acceleration value, an angle about a third axis that has a predetermined angle with respect to an acceleration detection surface including the first axis and the second axis, the angle being formed between a combined acceleration vector of the first acceleration and the second acceleration and the second axis;

correcting the first velocity value and the second velocity value by rotational coordinate conversion corresponding to the calculated angle;

outputting information on a first correction velocity value and a second correction velocity value obtained by the correction; and generating coordinate information of a UI on a screen that corresponds to the first correction velocity value and the second correction velocity value.

7. An input apparatus comprising:

an acceleration output means including an acceleration sensor, for outputting a first acceleration of the input apparatus in a direction along a first axis and a second acceleration of the input apparatus in a direction along a second axis different from the direction along the first axis using the acceleration sensor;

an angular velocity output means for outputting a first angular velocity of the input apparatus about a third axis and a second angular velocity of the input apparatus about a fourth axis different from the third axis;

an information output means for calculating, based on the first acceleration and the second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, correcting the first angular velocity and the second angular velocity by rotational coordinate conversion corresponding to the calculated angle, and outputting at least first information containing a first correction angular velocity and a second correction angular velocity obtained by the correction; and a suppression means for suppressing, when at least one of the first acceleration and the second acceleration includes a gravity acceleration component and an inertial acceleration component generated by a movement of the input apparatus, a fluctuation of the calculated angle attributable to the inertial acceleration component.

8. A control apparatus for controlling a pointer displayed on a screen in accordance with input information output from an input apparatus including an acceleration output means including an acceleration sensor, for outputting a first acceleration of the input apparatus in a direction along a first axis and a second acceleration of the input apparatus in a direction along a second axis different from the direction along the first axis using the acceleration sensor, and an angular velocity output means for outputting a first angular velocity of the input apparatus about a third axis and a second angular velocity of the input apparatus about a fourth axis different from the third axis, the control apparatus comprising:

a reception means for receiving, as the input information, information on the first acceleration, the second acceleration, the first angular velocity, and the second angular velocity;

an information output means for calculating, based on the received first acceleration and second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, correcting the received first angular velocity and second angular velocity by rotational coordinate conversion corresponding to the calculated angle, and outputting information on a first correction angular velocity and a second correction angular velocity obtained by the correction;

a suppression means for suppressing, when at least one of the first acceleration and the second acceleration includes a gravity acceleration component and an inertial acceleration component generated by a movement of the input apparatus, a fluctuation of the calculated angle attributable to the inertial acceleration component; and a coordinate information generation means for generating coordinate information of the pointer on the screen that corresponds to the first correction angular velocity and the second correction angular velocity.

9. A control system comprising:

an input apparatus including an acceleration output means including an acceleration sensor, for outputting a first acceleration of the input apparatus in a direction along a first axis and a second acceleration of the input apparatus in a direction along a second axis different from the direction along the first axis using the acceleration sensor, an angular velocity output means for outputting a first angular velocity of the input apparatus about a third axis and a second angular velocity of the input apparatus about a fourth axis different from the third axis, an information output means for calculating, based on the first acceleration and the second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, correcting the first angular velocity and the second angular velocity by rotational coordinate conversion corresponding to the calculated angle, and outputting at least first information containing a first correction angular velocity and a second correction angular velocity obtained by the correction, and a suppression means for suppressing, when at least one of the first acceleration and the second acceleration includes a gravity acceleration component and an inertial acceleration component generated by a movement of the input apparatus, a fluctuation of the calculated angle attributable to the inertial acceleration component; and a control apparatus including a reception means for receiving the first information, and a coordinate information generation means for generating coordinate information of a pointer displayed on a screen, on the screen that corresponds to the received first correction angular velocity and second correction angular velocity.

10. A control system comprising:
an input apparatus including
an acceleration output means including an acceleration sensor, for outputting a first acceleration of the input apparatus in a direction along a first axis and a second acceleration of the input apparatus in a direction along a second axis different from the direction along the first axis using the acceleration sensor, and
an angular velocity output means for outputting a first angular velocity of the input apparatus about a third axis and a second angular velocity of the input apparatus about a fourth axis different from the third axis; and
a control apparatus including
a reception means for receiving information on the first acceleration, the second acceleration, the first angular velocity, and the second angular velocity,
an information output means for calculating, based on the first acceleration and the second acceleration, an angle about a fifth axis that has a predetermined angle with respect to an acceleration detection surface of the acceleration sensor including the first axis and the second axis, the angle being formed between a combined acceleration vector of the received first acceleration and second acceleration and a reference axis within the acceleration detection surface, correcting the first angular velocity and the second angular velocity by rotational coordinate conversion corresponding to the calculated angle, and outputting at least first information containing a first correction angular velocity and a second correction angular velocity obtained by the correction,
a suppression means for suppressing, when at least one of the first acceleration and the second acceleration includes a gravity acceleration component and an inertial acceleration component generated by a movement of the input apparatus, a fluctuation of the calculated angle attributable to the inertial acceleration component, and
a coordinate information generation means for generating coordinate information of a pointer displayed on a screen, on the screen that corresponds to the output first correction angular velocity and second correction angular velocity.

11. A handheld apparatus comprising:
an acceleration output means for outputting a first acceleration of the handheld apparatus in a direction along a first axis and a second acceleration of the handheld apparatus in a direction along a second axis different from the direction along the first axis;
an angular velocity output means for outputting a first angular velocity of the handheld apparatus about a third axis and a second angular velocity of the handheld apparatus about a fourth axis different from the third axis;
an information output means for calculating, based on the first acceleration and the second acceleration, an angle about a fifth axis that has a predetermined angle with respect to an acceleration detection surface including the first axis and the second axis, the angle being formed between a combined acceleration vector of the received first acceleration and second acceleration and a reference axis within the acceleration detection surface, correcting the first angular velocity and the second angular velocity by rotational coordinate conversion corresponding to the calculated angle, and outputting at least first information containing a first correction angular velocity and a second correction angular velocity obtained by the correction;
a suppression means for suppressing, when at least one of the first acceleration and the second acceleration includes a gravity acceleration component and an inertial acceleration component generated by a movement of the handheld apparatus, a fluctuation of the calculated angle attributable to the inertial acceleration component; and
a coordinate information generation means for generating coordinate information of a pointer displayed on a screen, on the screen that corresponds to the output first correction angular velocity and second correction angular velocity.

12. A control method comprising:
outputting, using an acceleration sensor, a first acceleration of an input apparatus in a direction along a first axis and a second acceleration of the input apparatus in a direction along a second axis different from the direction along the first axis;
outputting a first angular velocity of the input apparatus about a third axis and a second angular velocity of the input apparatus about a fourth axis different from the third axis;
calculating, based on the first acceleration and the second acceleration, an angle about a fifth axis that has a predetermined angle with respect to an acceleration detection surface of the acceleration sensor including the first axis and the second axis, the angle being formed between a combined acceleration vector of the received first acceleration and second acceleration and a reference axis within the acceleration detection surface;
correcting the first angular velocity and the second angular velocity by rotational coordinate conversion corresponding to the calculated angle;
suppressing, when at least one of the first acceleration and the second acceleration includes a gravity acceleration component and an inertial acceleration component generated by a movement of the input apparatus, a fluctuation of the calculated angle attributable to the inertial acceleration component; and
generating coordinate information of a pointer on a screen that corresponds to a first correction angular velocity and a second correction angular velocity obtained by the correction.

13. An input apparatus comprising:
an acceleration output means including an acceleration sensor, for outputting a first acceleration of the input apparatus in a direction along a first axis and a second acceleration of the input apparatus in a direction along a second axis different from the direction along the first axis using the acceleration sensor;
an angular velocity output means for outputting a first angular velocity of the input apparatus about a third axis and a second angular velocity of the input apparatus about a fourth axis different from the third axis;
a calculation means for calculating, based on the first acceleration, the second acceleration, the first angular velocity, and the second angular velocity, a first velocity of the input apparatus in the direction along the first axis and a second velocity of the input apparatus in the direction along the second axis;
an information output means for calculating, based on the first acceleration and the second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, correcting the calculated first velocity and second velocity by rotational coordinate conversion corresponding to the calculated angle, and outputting at least first information containing a first correction velocity and a second correction velocity obtained by the correction; and a suppression means for suppressing, when at least one of the first acceleration and the second acceleration includes a gravity acceleration component and an inertial acceleration component generated by a movement of the input apparatus, a fluctuation of the calculated angle attributable to the inertial acceleration component.

14. A control apparatus for controlling a pointer displayed on a screen in accordance with input information output from an input apparatus including an acceleration output means including an acceleration sensor, for outputting a first acceleration of the input apparatus in a direction along a first axis and a second acceleration of the input apparatus in a direction along a second axis different from the direction along the first axis using the acceleration sensor, an angular velocity output means for outputting a first angular velocity of the input apparatus about a third axis and a second angular velocity of the input apparatus about a fourth axis different from the third axis, and a calculation means for calculating, based on the first acceleration, the second acceleration, the first angular velocity, and the second angular velocity, a first velocity of the input apparatus in the direction along the first axis and a second velocity of the input apparatus in the direction along the second axis, the control apparatus comprising:
 a reception means for receiving, as the input information, information on the first acceleration, the second acceleration, the first velocity, and the second velocity;
 an information output means for calculating, based on the received first acceleration and second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, correcting the received first velocity and second velocity by rotational coordinate conversion corresponding to the calculated angle, and outputting information on a first correction velocity and a second correction velocity obtained by the correction;
 a suppression means for suppressing, when at least one of the first acceleration and the second acceleration includes a gravity acceleration component and an inertial acceleration component generated by a movement of the input apparatus, a fluctuation of the calculated angle attributable to the inertial acceleration component; and
 a coordinate information generation means for generating coordinate information of the pointer on the screen that corresponds to the first correction velocity and the second correction velocity.

15. A handheld apparatus comprising:
 an acceleration output means including an acceleration sensor, for outputting a first acceleration of the handheld apparatus in a direction along a first axis and a second acceleration of the handheld apparatus in a direction along a second axis different from the direction along the first axis using the acceleration sensor;
 an angular velocity output means for outputting a first angular velocity of the handheld apparatus about a third axis and a second angular velocity of the handheld apparatus about a fourth axis different from the third axis;
 a calculation means for calculating, based on the first acceleration, the second acceleration, the first angular velocity, and the second angular velocity, a first velocity of the handheld apparatus in the direction along the first axis and a second velocity of the handheld apparatus in the direction along the second axis;
 an information output means for calculating, based on the first acceleration and the second acceleration, an angle about a fifth axis that has a predetermined angle with respect to an acceleration detection surface including the first axis and the second axis, the angle being formed between a combined acceleration vector of the received first acceleration and second acceleration and a reference axis within the acceleration detection surface, correcting the calculated first velocity and second velocity by rotational coordinate conversion corresponding to the calculated angle, and outputting at least first information containing a first correction velocity and a second correction velocity obtained by the correction;
 a suppression means for suppressing, when at least one of the first acceleration and the second acceleration includes a gravity acceleration component and an inertial acceleration component generated by a movement of the handheld apparatus, a fluctuation of the calculated angle attributable to the inertial acceleration component; and
 a coordinate information generation means for generating coordinate information of a pointer displayed on a screen, on the screen that corresponds to the output first correction velocity and second correction velocity.

16. A control method comprising:
 outputting, using an acceleration sensor, a first acceleration of an input apparatus in a direction along a first axis and a second acceleration of the input apparatus in a direction along a second axis different from the direction along the first axis;
 outputting a first angular velocity of the input apparatus about a third axis and a second angular velocity of the input apparatus about a fourth axis different from the third axis;
 calculating, based on the first acceleration, the second acceleration, the first angular velocity, and the second angular velocity, a first velocity of the input apparatus in the direction along the first axis and a second velocity of the input apparatus in the direction along the second axis;
 calculating, based on the first acceleration and the second acceleration, an angle about a fifth axis that has a predetermined angle with respect to an acceleration detection surface of the acceleration sensor including the first axis and the second axis, the angle being formed between a combined acceleration vector of the received first acceleration and second acceleration and a reference axis within the acceleration detection surface;
 correcting the calculated first velocity and second velocity by rotational coordinate conversion corresponding to the calculated angle;
 suppressing, when at least one of the first acceleration and the second acceleration includes a gravity acceleration component and an inertial acceleration component generated by a movement of the input apparatus, a fluctuation of the calculated angle attributable to the inertial acceleration component; and
 generating coordinate information of a pointer on a screen that corresponds to a first correction velocity and a second correction velocity obtained by the correction.

17. An input apparatus comprising:
 an acceleration output means including an acceleration sensor, for outputting a first acceleration of the input apparatus in a direction along a first axis and a second acceleration of the input apparatus in a direction along a second axis different from the direction along the first axis using the acceleration sensor;

an angular velocity output means for outputting a first angular velocity of the input apparatus about a third axis and a second angular velocity of the input apparatus about a fourth axis different from the third axis;

an information output means for calculating, based on the first acceleration and the second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, correcting the first angular velocity and the second angular velocity by rotational coordinate conversion corresponding to the calculated angle, and outputting at least first information containing a first correction angular velocity and a second correction angular velocity obtained by the correction; and a stop means capable of stopping predetermined processing carried out by the information output means, the stop means causing the information output means to output second information different from the first information when the predetermined processing is stopped.

18. A control apparatus controlling a pointer displayed on a screen in accordance with input information output from an input apparatus including an acceleration output means including an acceleration sensor, for outputting a first acceleration of the input apparatus in a direction along a first axis and a second acceleration of the input apparatus in a direction along a second axis different from the direction along the first axis using the acceleration sensor, and an angular velocity output means for outputting a first angular velocity of the input apparatus about a third axis and a second angular velocity of the input apparatus about a fourth axis different from the third axis, the control apparatus comprising:

a reception means for receiving, as the input information, information on the first acceleration, the second acceleration, the first angular velocity, and the second angular velocity;

an information output means for calculating, based on the first acceleration and the second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, correcting the first angular velocity and the second angular velocity by rotational coordinate conversion corresponding to the calculated angle, and outputting at least first information containing a first correction angular velocity and a second correction angular velocity obtained by the correction;

a coordinate information generation means for generating coordinate information of the pointer on the screen that corresponds to the first correction angular velocity and the second correction angular velocity; and a stop means capable of stopping predetermined processing carried out by the information output means, the stop means causing the information output means to output second information different from the first information when the predetermined processing is stopped.

19. A handheld apparatus comprising:

an acceleration output means including an acceleration sensor, for outputting a first acceleration of the handheld apparatus in a direction along a first axis and a second acceleration of the handheld apparatus in a direction along a second axis different from the direction along the first axis using the acceleration sensor;

an angular velocity output means for outputting a first angular velocity of the handheld apparatus about a third axis and a second angular velocity of the handheld apparatus about a fourth axis different from the third axis;

an information output means for calculating, based on the first acceleration and the second acceleration, an angle about a fifth axis that has a predetermined angle with respect to an acceleration detection surface of the acceleration sensor including the first axis and the second axis, the angle being formed between a combined acceleration vector of the first acceleration and the second acceleration and a reference axis within the acceleration detection surface, correcting the first angular velocity and the second angular velocity by rotational coordinate conversion corresponding to the calculated angle, and outputting at least first information containing a first correction angular velocity and a second correction angular velocity obtained by the correction;

a stop means capable of stopping predetermined processing carried out by the information output means, the stop means causing the information output means to output second information different from the first information when the predetermined processing is stopped; and a coordinate information generation means for generating coordinate information of a pointer displayed on a screen, on the screen that corresponds to the first correction angular velocity and the second correction angular velocity.

20. An input apparatus, comprising:

a movement information output means for outputting movement information of the input apparatus in a direction along a first axis and a direction along a second axis different from the first axis;

an angular velocity output means for outputting a first angular velocity of the input apparatus about a third axis and a second angular velocity of the input apparatus about a fourth axis different from the third axis;

an information output means for calculating, based on a first acceleration of the input apparatus in the direction along the first axis and a second acceleration of the input apparatus in the direction along the second axis that are contained in the movement information, an angle about a fifth axis that has a predetermined angle with respect to an acceleration detection surface including the first axis and the second axis, the angle being formed between a combined acceleration vector of the first acceleration and the second acceleration and a reference axis within the acceleration detection surface, the acceleration detection surface being a detection surface of the first acceleration and the second acceleration, correcting the first angular velocity and the second angular velocity by rotational coordinate conversion corresponding to the calculated angle, and outputting at least first information containing a first correction angular velocity and a second correction angular velocity obtained by the correction; and a suppression means for suppressing, when the output movement information includes a gravity acceleration component and an inertial acceleration component generated by a movement of the input apparatus, a fluctuation of the calculated angle attributable to the inertial acceleration component.

* * * * *